(12) United States Patent
He et al.

(10) Patent No.: US 11,405,780 B2
(45) Date of Patent: Aug. 2, 2022

(54) METHOD FOR PERFORMING VERIFICATION BY USING SHARED KEY, METHOD FOR PERFORMING VERIFICATION BY USING PUBLIC KEY AND PRIVATE KEY, AND APPARATUS

(71) Applicant: HUAWEI TECHNOLOGIES CO., LTD., Guangdong (CN)

(72) Inventors: Chengdong He, Shenzhen (CN); Hua Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 16/924,412

(22) Filed: Jul. 9, 2020

(65) Prior Publication Data

US 2020/0344604 A1   Oct. 29, 2020

Related U.S. Application Data

(63) Continuation of application No. PCT/CN2019/071414, filed on Jan. 11, 2019.

(30) Foreign Application Priority Data

Jan. 11, 2018 (CN) .......................... 201810028282.4
Mar. 2, 2018 (CN) .......................... 201810174626.2
Sep. 17, 2018 (CN) .......................... 201811082476.9

(51) Int. Cl.
*H04L 9/08* (2006.01)
*H04L 9/30* (2006.01)
(Continued)

(52) U.S. Cl.
CPC ......... *H04W 12/0433* (2021.01); *H04L 9/085* (2013.01); *H04L 9/30* (2013.01);
(Continued)

(58) Field of Classification Search
CPC ......... H04L 9/30; H04L 9/3271; H04L 9/085; H04L 9/3247; H04L 9/3242;
(Continued)

(56) References Cited

U.S. PATENT DOCUMENTS 10,797,894 B2 * 10/2020 Qiao ..................... H04W 72/04
11,038,923 B2 *  6/2021 Bykampadi ............. H04L 67/30
(Continued)

FOREIGN PATENT DOCUMENTS

| CN | 101026454 A | 8/2007 |
|----|-------------|--------|
| CN | 101873298 A | 10/2010 |
| CN | 105813084 A | 7/2016 |

OTHER PUBLICATIONS

3GPP TS 23.501 V15.0.0 (Dec. 2017), "3rd Generation Partnership Project; Technical Specification Group Services and System Aspects; System Architecture for the 5G System; Stage 2 (Release 15)," Dec. 2017, 181 pages.
(Continued)

*Primary Examiner* — Mohammad A Siddiqi
(74) *Attorney, Agent, or Firm* — Fish & Richardson P.C.

(57) ABSTRACT

A method and an apparatus for performing verification using a shared key are disclosed. The method includes: receiving, by a first network element, a registration request message from a second network element, where the registration request message includes a user identifier, first network identifier information, and second network identifier information, the second network identifier information is obtained by processing the first network identifier information by using a shared key, and the shared key is a key used between the first network element and the second network element; verifying, by the first network element, the registration request message by using the shared key; and sending, by the first network element, a registration response message to the second network element. When receiving a
(Continued)

registration request from a visited network, a home network verifies the registration request message by using a shared key, to avoid a spoofing attack from the visited network.

20 Claims, 33 Drawing Sheets

(51) Int. Cl.
| | |
|---|---|
| *H04W 12/00* | (2021.01) |
| *H04W 12/04* | (2021.01) |
| *H04W 12/08* | (2021.01) |
| *H04W 60/00* | (2009.01) |
| *H04W 12/0433* | (2021.01) |
| *H04W 12/037* | (2021.01) |
| *H04W 12/40* | (2021.01) |
| *H04W 84/04* | (2009.01) |

(52) U.S. Cl.
CPC ......... *H04W 12/037* (2021.01); *H04W 12/08* (2013.01); *H04W 12/40* (2021.01); *H04W 60/00* (2013.01); *H04W 84/042* (2013.01)

(58) Field of Classification Search
CPC .............. H04L 2209/76; H04W 12/108; H04W 60/00; H04W 12/08; H04W 12/0433; H04W 12/088; H04W 8/12; H04W 12/40; H04W 12/037; H04W 12/72; H04W 84/042; H04W 12/06
See application file for complete search history.

(56) References Cited

U.S. PATENT DOCUMENTS

| | | | | |
|---|---|---|---|---|
| 2012/0164979 | A1* | 6/2012 | Bachmann | H04W 12/062 455/411 |
| 2017/0041866 | A1 | 2/2017 | Sharma et al. | |
| 2018/0234469 | A1* | 8/2018 | Kim | H04W 8/06 |
| 2021/0203643 | A1* | 7/2021 | Jost | H04W 80/10 |
| 2021/0321303 | A1* | 10/2021 | Nair | H04M 15/00 |

OTHER PUBLICATIONS

3GPP TS 23.502 V15.0.0 (Dec. 2017), "3rd Generation Partnership Project; Technical Specification Group Services and System Aspects; Procedures for the 5G System; Stage 2 (Release 15)," Dec. 2017, 257 pages.
3GPP TS 29.500 V0.3.0 (Dec. 2017), "3rd Generation Partnership Project; Technical Specification Group Core Network and Terminals; 5G System;Technical Realization of Service Based Architecture; Stage 3 (Release 15)," Dec. 2017, 11 pages.
3GPP TS 33.401 V15.2.0 (Jan. 2018), "3rd Generation Partnership Project; Technical Specification Group Services and System Aspects; 3GPP System Architecture Evolution (SAE); Security architecture (Release 15)," Jan. 2018, 163 pages.
3GPP TS 33.501 V0.4.0 (Oct. 2017), "3rd Generation Partnership Project; Technical Specification Group Services and System Aspects; Security Architecture and Procedures for 5G System (Release 15)," Oct. 2017, 70 pages.
3GPP TS 33.501 V0.6.0 (Dec. 2017), "3rd Generation Partnership Project;Technical Specification Group Services and System Aspects; Security Architecture and Procedures for 5G System (Release 15)," Dec. 2017, 79 pages.
China Mobile, "Living Document: Security of Service Based Architecture of 5G phase 1," 3GPP TSG SA WG3 (Security) Meeting #91, S3-181474, Belgrade(RS), Apr. 16-20, 2018, 23 pages.
Deutsche Telekom AG, "LS on inclusion of the SEPP into the 5G architecture," 3GPP TSG-SA3 Meeting #89, S3-173053, Reno, USA, Nov.-Dec. 1, 2017, 1 page.
Office Action issued in Chinese Application No. 201910107969.1 dated Oct. 10, 2019, 5 pages.
PCT International Search Report and Written Opinion issued in International Application No. PCT/CN2019/071414 dated Feb. 27, 2019, 17 pages (with English translation).
TSG-SA WG3, "LS on inclusion of the Security Edge Protection Proxy into the 5G architecture," 3GPP TSG-SA3 Meeting #89, S3-173437, Reno, USA, Nov. 27-Dec. 1, 2017, 1 page.
ETSI TS 133 501 V15.1.0 (Jul. 2018), "5G; Security architecture and procedures for 5G System (3GPP TS 33.501 version 15.1.0 Release 15)," Jul. 2018, 150 pages.
Extended European Search Report issued in European Application No. 1973848601 dated Jan. 27, 2021, 10 pages.
Nokia, Deutsche Telekom AG, Security architecture for Service based Interfaces over IPX Interconnects, d3GPP TSG SA WG3 (Security) Meeting #89, S3-173221, Reno (US), Nov. 27- Dec. 1, 2017, 2 pages.

* cited by examiner

METHOD FOR PERFORMING VERIFICATION BY USING SHARED KEY, METHOD FOR PERFORMING VERIFICATION BY USING PUBLIC KEY AND PRIVATE KEY, AND APPARATUS

CROSS-REFERENCE TO RELATED APPLICATIONS

This application is a continuation of International Patent Application No. PCT/CN2019/071414, filed on Jan. 11, 2019, which claims priority to Chinese Patent Application No. 201811082476.9, filed on Sep. 17, 2018 and Chinese Patent Application No. 201810174626.2, filed on Mar. 2, 2018 and Chinese Patent Application No. 201810028282.4, filed on Jan. 11, 2018. All of the aforementioned patent applications are hereby incorporated by reference in their entireties.

TECHNICAL FIELD

This application relates to the field of communications technologies, and in particular, to a method for performing verification by using a shared key, a method for performing verification by using a public key and a private key, and an apparatus.

BACKGROUND

As shown in FIG. 1a and FIG. 1b, a roaming scenario in an architecture of a 5th generation (5G) mobile communications system is defined. When a terminal device registers with a visited network, an access and mobility management function (AMF) entity in the visited network sends an authentication initiation request to an authentication server function (AUSF) entity in a home network. After receiving the authentication initiation request sent by the AMF, the AUSF sends an authentication request message to a unified data management (UDM) entity in the home network, to request an authentication vector. After receiving the authentication request message sent by the AUSF, the UDM selects an authentication method. The UDM generates a corresponding authentication vector based on the authentication method, and sends the authentication vector to the AUSF. After receiving the authentication vector sent by the UDM, the AUSF sends the authentication vector to the AMF. The AMF receives the authentication vector sent by the AUSF, and completes authentication on the terminal device in the visited network.

After the authentication on the terminal device succeeds, the AMF may further send an authentication confirmation message to the AUSF. After receiving the authentication confirmation message sent by the AMF, the AUSF further completes authentication confirmation for the terminal device in the home network, and the AUSF sends an authentication confirmation result to the UDM.

After the authentication and the authentication confirmation succeed, the AMF initiates a registration message to the UDM. After the UDM receives the registration message from the AMF, the UDM records related information of the AMF. If the UDM stores an address of an old AMF, the UDM further sends a deregistration message to the old AMF, to request the old AMF to delete user-related context information.

However, a 5G key architecture shown in FIG. 2 lacks a mechanism for performing verification between the AMF in a serving network and the UDM in the home network. Consequently, communication between the AMF in the serving network and the UDM in the home network may be subject to a spoofing attack.

SUMMARY

This application provides a method for performing verification by using a shared key and an apparatus, to protect a network from a spoofing attack.

According to an aspect of this application, a method for performing verification by using a shared key is provided, including: receiving, by a first network element, a registration request message from a second network element, where the registration request message includes a user identifier, first network identifier information, and second network identifier information, the second network identifier information is obtained by processing the first network identifier information by using a shared key, the shared key is a key used between the first network element and the second network element, the first network element is a data management network element or a first security edge protection proxy, and the second network element is a mobility management network element or a second security edge protection proxy; verifying, by the first network element, the registration request message by using the shared key; and sending, by the first network element, a registration response message to the second network element. In this aspect, when receiving a registration request message from a visited network, a home network verifies the registration request message by using a shared key, to avoid a spoofing attack from the visited network.

In a possible implementation, the processing the first network identifier information by using a shared key includes any one type of the following processing: performing a message authentication code operation on the first network identifier information and the shared key, performing a message authentication code operation on the first network identifier information, a random number, and the shared key, performing a hash operation on the first network identifier information and the shared key, and performing a hash operation on the first network identifier information, a random number, and the shared key. In this implementation, a plurality of manners of processing network identifier information by using the shared key are provided. If the second network element does not have the shared key or processes the network identifier information by using an incorrect shared key, the verification performed by the first network element on the registration request message does not succeed.

In another possible implementation, the verifying, by the first network element, the registration request message by using the shared key includes: obtaining, by the first network element, third network identifier information based on the first network identifier information by using the shared key; and verifying, by the first network element, the second network identifier information by using the third network identifier information. In this implementation, a ciphertext-based verification manner is provided.

In still another possible implementation, the verifying, by the first network element, the second network identifier information by using the third network identifier information includes: verifying, by the first network element, whether the third network identifier information is consistent with the second network identifier information.

In still another possible implementation, the processing the first network identifier information by using a shared key includes: encrypting the first network identifier information by using the shared key, or encrypting the first network identifier information and a random number by using the shared key.

In still another possible implementation, the verifying, by the first network element, the registration request message by using the shared key includes: obtaining, by the first network element, fourth network identifier information based on the second network identifier information by using the shared key; and verifying, by the first network element, the first network identifier information by using the fourth network identifier information. In this implementation, a plaintext-based verification manner is provided.

In still another possible implementation, the verifying, by the first network element, the first network identifier information by using the fourth network identifier information includes: verifying, by the first network element, whether the fourth network identifier information is consistent with the first network identifier information.

In still another possible implementation, the registration response message is a registration success response message or a registration failure response message, and the sending, by the first network element, a registration response message to the second network element includes: if the verification succeeds, sending, by the first network element, the registration success response message to the second network element; or if the verification fails, sending, by the first network element, the registration failure response message to the second network element.

In still another possible implementation, that the verification succeeds includes: the third network identifier information is consistent with the second network identifier information, or the fourth network identifier information is consistent with the first network identifier information; or that the verification fails includes: the third network identifier information is inconsistent with the second network identifier information, or the fourth network identifier information is inconsistent with the first network identifier information.

In still another possible implementation, before the verifying, by the first network element, the registration request message by using the shared key, the method further includes: searching for, by the first network element based on a correspondence between a shared key and at least one of a user identifier and network identifier information, the shared key corresponding to at least one of the user identifier and the first network identifier information that are included in the registration request message.

Correspondingly, according to another aspect of this application, a first network element is provided. The first network element has a function of implementing behavior of the first network element in the foregoing method. The function may be implemented by using hardware, or may be implemented by executing corresponding software by hardware. The hardware or the software includes one or more modules corresponding to the function.

In a possible implementation, the first network element includes: a communications unit, configured to receive a registration request message from a second network element, where the registration request message includes a user identifier, first network identifier information, and second network identifier information, the second network identifier information is obtained by processing the first network identifier information by using a shared key, the shared key is a key used between the first network element and the second network element, the first network element is a data management network element or a first security edge protection proxy, and the second network element is a mobility management network element or a second security edge protection proxy; and a processing unit, configured to verify the registration request message by using the shared key. The communications unit is further configured to send a registration response message to the second network element.

In another possible implementation, the first network element includes a communications interface, a memory, and a processor. The memory stores a group of program code, and the processor is configured to invoke the program code stored in the memory, to perform the following operations: receiving a registration request message from a second network element through the communications interface, where the registration request message includes a user identifier, first network identifier information, and second network identifier information, the second network identifier information is obtained by processing the first network identifier information by using a shared key, the shared key is a key used between the first network element and the second network element, the first network element is a data management network element or a first security edge protection proxy, and the second network element is a mobility management network element or a second security edge protection proxy; verifying the registration request message by using the shared key; and controlling the communications interface to send a registration response message to the second network element.

Based on a same invention concept, for problem-resolving principles and beneficial effects of the apparatus, refer to the foregoing possible method implementations of the first network element and the brought beneficial effects. Therefore, for implementation of the apparatus, refer to implementation of the method. No repeated description is provided herein.

According to still another aspect of this application, another method for performing verification by using a shared key is provided, including: processing, by a first network element, first network identifier information by using a shared key, to obtain second network identifier information; sending, by the first network element, a deregistration message to a second network element, where the deregistration message includes the first network identifier information and the second network identifier information, the first network element is a data management network element or a first security edge protection proxy, and the second network element is a mobility management network element or a second security edge protection proxy; and receiving, by the first network element, a deregistration response message from the second network element. In this implementation, when receiving a deregistration message from a home network, a visited network verifies the deregistration message by using a shared key, to avoid a spoofing attack from the home network.

In a possible implementation, the processing first network identifier information by using a shared key includes any one type of the following processing: encrypting the first network identifier information by using the shared key, encrypting the first network identifier information and a random number by using the shared key, performing a message authentication code operation on the first network identifier information and the shared key, performing a message authentication code operation on the first network identifier information, a random number, and the shared key, performing a hash operation on the first network identifier information and the shared key, and performing a hash operation on the first network identifier information, a random number, and the shared key. In this implementation, a plurality of manners of processing network identifier information by using the shared key are provided. If the first network element does not have the shared key or processes the network identifier information by using an incorrect shared key, the verification performed by the second network element on the deregistration message does not succeed.

In another possible implementation, the deregistration response message is a deregistration success response message or a deregistration failure response message.

Correspondingly, according to still another aspect of this application, a first network element is provided. The first network element has a function of implementing behavior of the first network element in the foregoing method. The function may be implemented by using hardware, or may be implemented by executing corresponding software by hardware. The hardware or the software includes one or more modules corresponding to the function.

In a possible implementation, the first network element includes: a processing unit, configured to process first network identifier information by using a shared key, to obtain second network identifier information; and a communications unit, configured to send a deregistration message to a second network element, where the deregistration message includes the first network identifier information and the second network identifier information, the first network element is a data management network element or a first security edge protection proxy, and the second network element is a mobility management network element or a second security edge protection proxy. The communications unit is further configured to receive a deregistration response message from the second network element.

In another possible implementation, the first network element includes a communications interface, a memory, and a processor. The memory stores a group of program code, and the processor is configured to invoke the program code stored in the memory, to perform the following operations: processing first network identifier information by using a shared key, to obtain second network identifier information; controlling the communications interface to send a deregistration message to a second network element, where the deregistration message includes the first network identifier information and the second network identifier information, the first network element is a data management network element or a first security edge protection proxy, and the second network element is a mobility management network element or a second security edge protection proxy; and receiving a deregistration response message from the second network element through the communications interface.

Based on a same invention concept, for problem-resolving principles and beneficial effects of the apparatus, refer to the foregoing possible method implementations of the first network element and the brought beneficial effects. Therefore, for implementation of the apparatus, refer to implementation of the method. No repeated description is provided herein.

With reference to the foregoing aspects, in a possible implementation, if the first network element is a data management network element, the method further includes: receiving, by the first network element, the shared key from an authentication server network element; or if the first network element is a first security edge protection proxy, the method further includes: receiving, by the first network element, the shared key from an authentication server network element or a data management network element. In this implementation, the shared key may be generated by an AUSF, and the AUSF transfers the shared key to a UDM or the first security edge protection proxy.

With reference to the foregoing two aspects, in another possible implementation, the first network element is a data management network element, and the receiving, by the first network element, the shared key from an authentication server network element includes: receiving, by the first network element, an authentication confirmation notification response message from the authentication server network element, where the authentication confirmation notification response message includes the shared key, and the shared key is generated by the authentication server network element, or the shared key is generated and sent to the authentication server network element by a security anchor network element, or the shared key is generated and sent to the authentication server network element by the second network element, and the second network element is the mobility management network element.

With reference to the foregoing two aspects, in still another possible implementation, if the first network element is a data management network element, the method further includes: receiving, by the first network element, an authentication information request from the authentication server network element, where the authentication information request includes at least one of a user identifier and the first network identifier information; and sending, by the first network element, an authentication vector to the authentication server network element; and the receiving, by the first network element, the shared key from an authentication server network element includes: receiving, by the first network element, an authentication confirmation notification response message from the authentication server network element, where the authentication confirmation notification response message includes the shared key, and the shared key is determined by the authentication server network element based on the authentication vector.

With reference to the foregoing two aspects, in still another possible implementation, the method further includes: receiving, by the first network element, an authentication information request from the authentication server network element, where the authentication information request includes at least one of the user identifier and the first network identifier information; and sending, by the first network element, an authentication vector to the authentication server network element, so that the authentication server network element sends the authentication vector to a security anchor network element; and the receiving, by the first network element, the shared key from an authentication server network element includes: receiving, by the first network element, an authentication confirmation notification response message from the authentication server network element, where the authentication confirmation notification response message includes the shared key, and the shared key is determined by the security anchor network element based on the authentication vector and sent by the security anchor network element to the authentication server network element. In this implementation, an SEAF generates the shared key, and transfers the shared key to a UDM by using an AUSF.

With reference to the foregoing two aspects, in still another possible implementation, the method further includes: receiving, by the first network element, an authentication information request from the authentication server network element, where the authentication information request includes at least one of the user identifier and the first network identifier information; and sending, by the first network element, an authentication vector to the authentication server network element, so that the authentication server network element sends the authentication vector to the second network element; and the receiving, by the first network element, the shared key from an authentication server network element includes: receiving, by the first network element, an authentication confirmation notification response message from the authentication server network element, where the authentication confirmation notification response message includes the shared key, and the shared key is determined by the second network element based on the authentication vector and sent by the second network element to the authentication server network element. In this implementation, an AMF generates the shared key, and transfers the shared key to a UDM by using an AUSF.

With reference to the foregoing two aspects, in still another possible implementation, the authentication confirmation notification response message further includes an authentication result obtained by the authentication server network element by performing authentication on a terminal device.

With reference to the foregoing two aspects, in still another possible implementation, the method further includes: storing, by the first network element, a correspondence between the shared key and at least one of the user identifier and the first network identifier information.

With reference to the foregoing two aspects, in still another possible implementation, the first network identifier information is carried in a public land mobile network identifier parameter or a mobility management network element identifier parameter.

According to still another aspect of this application, still another method for performing verification by using a shared key is provided, including: processing, by a second network element, first network identifier information by using a first shared key, to obtain second network identifier information, where the first shared key is a key used between a first network element and the second network element, the first network element is a data management network element or a first security edge protection proxy, and the second network element is a first mobility management network element or a second security edge protection proxy; sending, by the second network element, a registration request message to the first network element, where the registration request message includes a user identifier, the first network identifier information, and the second network identifier information; and receiving, by the second network element, a registration response message from the first network element. In this aspect, according to the method for performing verification by using a shared key provided in this embodiment of this application, a visited network processes network identifier information in a registration request message by using a shared key. When receiving the registration request from message the visited network, a home network verifies the registration request message by using the shared key, to avoid a spoofing attack from the visited network.

In a possible implementation, the processing, by a second network element, first network identifier information by using a first shared key includes: encrypting, by the second network element, the first network identifier information by using the shared key; or encrypting, by the second network element, the first network identifier information and a first random number by using the first shared key; or performing, by the second network element, a message authentication code operation on the first network identifier information and the first shared key; or performing, by the second network element, a message authentication code operation on the first network identifier information, a first random number, and the first shared key; or performing, by the second network element, a hash operation on the first network identifier information and the first shared key; or performing, by the second network element, a hash operation on the first network identifier information, a first random number, and the first shared key.

In another possible implementation, if the second network element is the first mobility management network element, the method further includes: receiving, by the second network element, the first shared key from a second mobility management network element.

In still another possible implementation, the method further includes: sending, by the second network element, a context obtaining request to the second mobility management network element; and the receiving, by the second network element, the first shared key from a second mobility management network element includes: receiving, by the second network element, a context obtaining response from the second mobility management network element, where the context obtaining response includes the first shared key.

In still another possible implementation, the first shared key is generated based on a second shared key and at least one of a second random number and a third random number, the second shared key is a key used between the second mobility management network element and the first network element, the second random number is carried in the context obtaining request, and the third random number is generated by the second mobility management network element.

Correspondingly, according to still another aspect of this application, a second network element is provided. The second network element has a function of implementing behavior of the second network element in the foregoing method. The function may be implemented by using hardware, or may be implemented by executing corresponding software by hardware. The hardware or the software includes one or more modules corresponding to the function.

In a possible implementation, the second network element includes: a processing unit, configured to process first network identifier information by using a first shared key, to obtain second network identifier information, where the first shared key is a key used between a first network element and the second network element, the first network element is a data management network element or a first security edge protection proxy, and the second network element is a first mobility management network element or a second security edge protection proxy; and a communications unit, configured to send a registration request message to the first network element, where the registration request message includes a user identifier, the first network identifier information, and the second network identifier information. The communications unit is further configured to receive a registration response message from the first network element.

In another possible implementation, the second network element includes a communications interface, a memory, and a processor. The memory stores a group of program code, and the processor is configured to invoke the program code stored in the memory, to perform the following operations: processing first network identifier information by using a first shared key, to obtain second network identifier information, where the first shared key is a key used between a first network element and the second network element, the first network element is a data management network element or a first security edge protection proxy, and the second network element is a first mobility management network element or a second security edge protection proxy; controlling the communications interface to send a registration request message to the first network element, where the registration request message includes a user identifier, the first network identifier information, and the second network identifier information; and receiving a registration response message from the first network element through the communications interface.

Based on a same invention concept, for problem-resolving principles and beneficial effects of the apparatus, refer to the foregoing possible method implementations of the second network element and the brought beneficial effects. Therefore, for implementation of the apparatus, refer to implementation of the method. No repeated description is provided herein.

According to still another aspect of this application, still another method for performing verification by using a shared key is provided, where the method includes: receiving, by a second network element, a deregistration message from a first network element, where the deregistration message includes first network identifier information and second network identifier information, the second network identifier information is obtained by processing the first network identifier information by using a shared key, the shared key is a key used between the first network element and the second network element, the first network element is a data management network element or a first security edge protection proxy, and the second network element is a mobility management network element or a second security edge protection proxy; verifying, by the second network element, the deregistration message by using the shared key; and sending, by the second network element, a deregistration response message to the first network element. In this aspect, a network element in a home network processes network identifier information in a deregistration message by using a shared key. When receiving the deregistration message from the home network, a visited network verifies the deregistration message by using the shared key, to avoid a spoofing attack from the home network.

In a possible implementation, the processing the first network identifier information by using a shared key includes any one type of the following processing: performing a message authentication code operation on the first network identifier information and the shared key, performing a message authentication code operation on the first network identifier information, a random number, and the shared key, performing a hash operation on the first network identifier information and the shared key, and performing a hash operation on the first network identifier information, a random number, and the shared key.

In another possible implementation, the verifying, by the second network element, the deregistration message by using the shared key includes: obtaining, by the second network element, third network identifier information based on the first network identifier information by using the shared key; and verifying, by the second network element, the second network identifier information by using the third network identifier information.

In still another possible implementation, the verifying, by the second network element, the second network identifier information by using the third network identifier information includes: verifying, by the second network element, whether the third network identifier information is consistent with the second network identifier information.

In still another possible implementation, the processing the first network identifier information by using a shared key includes: encrypting the first network identifier information by using the shared key, or encrypting the first network identifier information and a random number by using the shared key.

In still another possible implementation, the verifying, by the second network element, the deregistration message by using the shared key includes: obtaining, by the second network element, fourth network identifier information based on the second network identifier information by using the shared key; and verifying, by the second network element, the first network identifier information by using the fourth network identifier information.

In still another possible implementation, the verifying, by the second network element, the first network identifier information by using the fourth network identifier information includes: verifying, by the second network element, whether the fourth network identifier information is consistent with the first network identifier information.

In still another possible implementation, the deregistration response message is a deregistration success response message or a deregistration failure response message, and the sending, by the second network element, a deregistration response message to the first network element includes: if the verification succeeds, sending, by the second network element, the deregistration success response message to the first network element; or if the verification fails, sending, by the second network element, the deregistration failure response message to the first network element.

In still another possible implementation, that the verification succeeds includes: the third network identifier information is consistent with the second network identifier information, or the fourth network identifier information is consistent with the first network identifier information; or that the verification fails includes: the third network identifier information is inconsistent with the second network identifier information, or the fourth network identifier information is inconsistent with the first network identifier information.

In still another possible implementation, before the verifying, by the second network element, the deregistration message by using the shared key, the method further includes: searching for, by the second network element based on a stored correspondence between a shared key and at least one of a user identifier and network identifier information, the shared key corresponding to at least one of a user identifier and the first network identifier information that are included in the deregistration message.

In still another possible implementation, if the second network element is the mobility management network element, the method further includes: generating, by the second network element, the shared key, and sending the shared key to an authentication server network element, so that the authentication server network element sends the shared key to the first network element; or the method further includes: receiving, by the second network element, the shared key from a security anchor network element or an authentication server network element.

In still another possible implementation, the method further includes: sending, by the second network element, an authentication initiation request to the authentication server network element, where the authentication initiation request includes at least one of the user identifier and the first network identifier information; receiving, by the second network element, an authentication vector from the authentication server network element; and generating, by the second network element, the shared key based on the authentication vector; and the sending, by the second network element, the shared key to an authentication server network element includes: sending, by the second network element, an authentication confirmation message to the authentication server network element, where the authentication confirmation message includes the shared key.

In still another possible implementation, if the second network element is the second security edge protection proxy, the method further includes: receiving, by the second network element, the shared key from a mobility management network element, a security anchor network element, or an authentication server network element.

Correspondingly, according to still another aspect of this application, a second network element is provided. The second network element has a function of implementing behavior of the second network element in the foregoing method. The function may be implemented by using hardware, or may be implemented by executing corresponding software by hardware. The hardware or the software includes one or more modules corresponding to the function.

In a possible implementation, the second network element includes: a communications unit, configured to receive a deregistration message from a first network element, where the deregistration message includes first network identifier information and second network identifier information, the second network identifier information is obtained by processing the first network identifier information by using a shared key, the shared key is a key used between the first network element and the second network element, the first network element is a data management network element or a first security edge protection proxy, and the second network element is a mobility management network element or a second security edge protection proxy; and a processing unit, configured to verify the deregistration message by using the shared key. The communications unit is further configured to send a deregistration response message to the first network element.

In another possible implementation, the second network element includes a communications interface, a memory, and a processor. The memory stores a group of program code, and the processor is configured to invoke the program code stored in the memory, to perform the following operations: receiving a deregistration message from a first network element through the communications interface, where the deregistration message includes first network identifier information and second network identifier information, the second network identifier information is obtained by processing the first network identifier information by using a shared key, the shared key is a key used between the first network element and the second network element, the first network element is a data management network element or a first security edge protection proxy, and the second network element is a mobility management network element or a second security edge protection proxy; verifying the deregistration message by using the shared key; and controlling the communications interface to send a deregistration response message to the first network element.

Based on a same invention concept, for problem-resolving principles and beneficial effects of the apparatus, refer to the foregoing possible method implementations of the second network element and the brought beneficial effects. Therefore, for implementation of the apparatus, refer to implementation of the method. No repeated description is provided herein.

According to still another aspect of this application, a method for performing verification by using a public key and a private key is provided, including: receiving, by a first network element, a request message from a second network element, where the request message includes first network identifier information and second network identifier information, the second network identifier information is obtained based on the first network identifier information by using a private key, the first network element is a data management network element or a first security edge protection proxy, and the second network element is a mobility management network element or a second security edge protection proxy; verifying, by the first network element, the second network identifier information by using a public key corresponding to the private key; and sending, by the first network element, a response message to the second network element. In this aspect, when a home network receives a request message sent by a visited network, where network identifier information in the request message is signed by a network element in the visited network by using a private key, a network element in the home network verifies the network identifier information in the request message by using a preset public key corresponding to the private key, to protect the network from an attack from the visited network.

In a possible implementation, the method further includes: searching for, by the first network element, the public key based on the first network identifier information.

In another possible implementation, the second network identifier information is obtained by signing the first network identifier information and at least one of a random number and a session identifier by using the private key.

In still another possible implementation, the method further includes: receiving, by the first network element, a registration request message from the second network element; and sending, by the first network element, a registration response message to the second network element, where the registration response message includes the random number.

Correspondingly, according to still another aspect of this application, a first network element is provided. The first network element has a function of implementing behavior of the first network element in the foregoing method. The function may be implemented by using hardware, or may be implemented by executing corresponding software by hardware. The hardware or the software includes one or more modules corresponding to the function.

In a possible implementation, the first network element includes: a communications unit, configured to receive a request message from a second network element, where the request message includes first network identifier information and second network identifier information, the second network identifier information is obtained based on the first network identifier information by using a private key, the first network element is a data management network element or a first security edge protection proxy, and the second network element is a mobility management network element or a second security edge protection proxy; and a processing unit, configured to verify the second network identifier information by using a public key corresponding to the private key. The communications unit is further configured to send a response message to the second network element.

In another possible implementation, the first network element includes a communications interface, a memory, and a processor. The memory stores a group of program code, and the processor is configured to invoke the program code stored in the memory, to perform the following operations: receiving a request message from a second network element through the communications interface, where the request message includes first network identifier information and second network identifier information, the second network identifier information is obtained based on the first network identifier information by using a private key, the first network element is a data management network element or a first security edge protection proxy, and the second network element is a mobility management network element or a second security edge protection proxy; verifying the second network identifier information by using a public key corresponding to the private key; and controlling the communications interface to send a response message to the second network element.

Based on a same invention concept, for problem-resolving principles and beneficial effects of the apparatus, refer to the foregoing possible method implementations of the first network element and the brought beneficial effects. Therefore, for implementation of the apparatus, refer to implementation of the method. No repeated description is provided herein.

In the foregoing two aspects, that the second network identifier information is obtained based on the first network identifier information by using the private key includes one of the following cases:

Case 1: The second network identifier information is obtained based on the first network identifier information only by using the private key. For example, only the private key is used to sign, encrypt, or perform integrity protection on the first network identifier information, or to encrypt and perform integrity protection on the first network identifier information, so as to obtain the second network identifier information. For another example, only the private key is used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

Case 2: The second network identifier information is obtained based on the first network identifier information by using the private key and other content. For example, the private key and the other content are used to sign, encrypt, or perform integrity protection on the first network identifier information, or to encrypt and perform integrity protection on the first network identifier information, so as to obtain the second network identifier information. For another example, the private key and the other content are used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

In the foregoing case 2, the "other content" may be at least one of the following: a public key preset in the first network element, a public key in a private-public key pair generated by the first network element, and another parameter that is generated by the first network element and that participates in subsequent key calculation.

According to still another aspect of this application, a method for performing verification by using a public key and a private key is provided, including: obtaining, by a first network element, second network identifier information based on first network identifier information by using a private key, where the first network element is a data management network element or a first security edge protection proxy; sending, by the first network element, a deregistration message to a second network element, where the deregistration message includes the second network identifier information, so that the second network element verifies the second network identifier information by using a public key corresponding to the private key, and the second network element is a mobility management network element or a second security edge protection proxy; and receiving, by the first network element, a deregistration response message from the second network element. In this aspect, when a visited network receives a deregistration message sent by a home network, where network identifier information in the deregistration message is signed by a network element in the home network by using a private key, a network element in the visited network verifies the network identifier information in the deregistration message by using a preset public key corresponding to the private key, to protect the network from an attack from the home network.

In a possible implementation, the obtaining, by a first network element, second network identifier information based on first network identifier information by using a private key includes: obtaining, by the first network element, the second network identifier information by signing the first network identifier information and at least one of a random number and a session identifier by using the private key.

Correspondingly, according to still another aspect of this application, a first network element is provided. The first network element has a function of implementing behavior of the first network element in the foregoing method. The function may be implemented by using hardware, or may be implemented by executing corresponding software by hardware. The hardware or the software includes one or more modules corresponding to the function.

In a possible implementation, the first network element includes: a processing unit, configured to obtain second network identifier information based on first network identifier information by using a private key, where the first network element is a data management network element or a first security edge protection proxy; and a communications unit, configured to send a deregistration message to a second network element, where the deregistration message includes the second network identifier information, so that the second network element verifies the second network identifier information by using a public key corresponding to the private key, and the second network element is a mobility management network element or a second security edge protection proxy. The communications unit is further configured to receive a deregistration response message from the second network element.

In another possible implementation, the first network element includes a communications interface, a memory, and a processor. The memory stores a group of program code, and the processor is configured to invoke the program code stored in the memory, to perform the following operations: obtaining second network identifier information based on first network identifier information by using a private key, where the first network element is a data management network element or a first security edge protection proxy; sending a deregistration message to a second network element through the communications interface, where the deregistration message includes the second network identifier information, so that the second network element verifies the second network identifier information by using a public key corresponding to the private key, and the second network element is a mobility management network element or a second security edge protection proxy; and receiving a deregistration response message from the second network element through the communications interface.

Based on a same invention concept, for problem-resolving principles and beneficial effects of the apparatus, refer to the foregoing possible method implementations of the first network element and the brought beneficial effects. Therefore, for implementation of the apparatus, refer to implementation of the method. No repeated description is provided herein.

In the foregoing two aspects, that the second network identifier information is obtained based on the first network identifier information by using the private key includes one of the following cases:

Case 1: The second network identifier information is obtained based on the first network identifier information only by using the private key. For example, only the private key is used to sign, encrypt, or perform integrity protection on the first network identifier information, or to encrypt and perform integrity protection on the first network identifier information, so as to obtain the second network identifier information. For another example, only the private key is used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

Case 2: The second network identifier information is obtained based on the first network identifier information by using the private key and other content. For example, the private key and the other content are used to sign, encrypt, or perform integrity protection on the first network identifier information, or to encrypt and perform integrity protection on the first network identifier information, so as to obtain the second network identifier information. For another example, the private key and the other content are used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

In the foregoing case 2, the "other content" may be at least one of the following: a public key preset in the first network element, a public key in a private-public key pair generated by the first network element, and another parameter that is generated by the first network element and that participates in subsequent key calculation.

According to still another aspect of this application, a method for performing verification by using a public key and a private key is provided, including: obtaining, by a second network element, second network identifier information based on first network identifier information by using a private key, where the second network element is a mobility management network element or a second security edge protection proxy; sending, by the second network element, a request message to a first network element, where the request message includes the first network identifier information and the second network identifier information, so that the first network element verifies the second network identifier information by using a public key corresponding to the private key, and the first network element is a data management network element or a first security edge protection proxy; and receiving, by the second network element, a response message from the first network element. In this aspect, when a home network receives a request message sent by a visited network, where network identifier information in the request message is signed by a network element in the visited network by using a private key, a network element in the home network verifies the network identifier information in the request message by using a preset public key corresponding to the private key, to protect the network from an attack from the visited network.

In a possible implementation, the obtaining, by a second network element, second network identifier information based on first network identifier information by using a private key includes: obtaining, by the second network element, the second network identifier information by signing the first network identifier information and at least one of a random number and a session identifier by using the private key.

In another possible implementation, the method further includes: sending, by the second network element, a registration request message to the first network element; and receiving, by the second network element, a registration response message from the first network element, where the registration response message includes the random number.

According to still another aspect of this application, a second network element is provided. The second network element has a function of implementing behavior of the second network element in the foregoing method. The function may be implemented by using hardware, or may be implemented by executing corresponding software by hardware. The hardware or the software includes one or more modules corresponding to the function.

In a possible implementation, the second network element includes: a processing unit, configured to obtain second network identifier information based on first network identifier information by using a private key, where the second network element is a mobility management network element or a second security edge protection proxy; and a communications unit, configured to send a request message to a first network element, where the request message includes the first network identifier information and the second network identifier information, so that the first network element verifies the second network identifier information by using a public key corresponding to the private key, and the first network element is a data management network element or a first security edge protection proxy. The communications unit is further configured to receive a response message from the first network element.

In another possible implementation, the second network element includes a communications interface, a memory, and a processor. The memory stores a group of program code, and the processor is configured to invoke the program code stored in the memory, to perform the following operations: obtaining second network identifier information based on first network identifier information by using a private key, where the second network element is a mobility management network element or a second security edge protection proxy; sending a request message to a first network element through the communications interface, where the request message includes the first network identifier information and the second network identifier information, so that the first network element verifies the second network identifier information by using a public key corresponding to the private key, and the first network element is a data management network element or a first security edge protection proxy; and receiving a response message from the first network element through the communications interface.

Based on a same invention concept, for problem-resolving principles and beneficial effects of the apparatus, refer to the foregoing possible method implementations of the second network element and the brought beneficial effects. Therefore, for implementation of the apparatus, refer to implementation of the method. No repeated description is provided herein.

In the foregoing two aspects, that the second network identifier information is obtained based on the first network identifier information by using the private key includes one of the following cases:

Case 1: The second network identifier information is obtained based on the first network identifier information only by using the private key. For example, only the private key is used to sign, encrypt, or perform integrity protection on the first network identifier information, or to encrypt and perform integrity protection on the first network identifier information, so as to obtain the second network identifier information. For another example, only the private key is used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

Case 2: The second network identifier information is obtained based on the first network identifier information by using the private key and other content. For example, the private key and the other content are used to sign, encrypt, or perform integrity protection on the first network identifier information, or to encrypt and perform integrity protection on the first network identifier information, so as to obtain the second network identifier information. For another example, the private key and the other content are used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

In the foregoing case 2, the "other content" may be at least one of the following: a public key preset in the first network element, a public key in a private-public key pair generated by the first network element, and another parameter that is generated by the first network element and that participates in subsequent key calculation.

According to still another aspect of this application, a method for performing verification by using a public key and a private key is provided, including: receiving, by a second network element, a deregistration message from a first network element, where the deregistration message includes second network identifier information, the second network identifier information is obtained based on first network identifier information by using a private key, the first network element is a data management network element or a first security edge protection proxy, and the second network element is a mobility management network element or a second security edge protection proxy; verifying, by the second network element, the second network identifier information by using a public key corresponding to the private key; and sending, by the second network element, a deregistration response message to the first network element based on a verification result of the second network identifier information. In this aspect, when a visited network receives a deregistration message sent by a home network, where network identifier information in the deregistration message is signed by a network element in the home network by using a private key, a network element in the visited network verifies the network identifier information in the deregistration message by using a preset public key corresponding to the private key, to protect the network from an attack from the home network.

According to still another aspect of this application, a second network element is provided. The second network element has a function of implementing behavior of the second network element in the foregoing method. The function may be implemented by using hardware, or may be implemented by executing corresponding software by hardware. The hardware or the software includes one or more modules corresponding to the function.

In a possible implementation, the second network element includes: a communications unit, configured to receive a deregistration message from a first network element, where the deregistration message includes second network identifier information, the second network identifier information is obtained based on first network identifier information by using a private key, the first network element is a data management network element or a first security edge protection proxy, and the second network element is a mobility management network element or a second security edge protection proxy; and a processing unit, configured to verify the second network identifier information by using a public key corresponding to the private key. The communications unit is further configured to send a deregistration response message to the first network element based on a verification result of the second network identifier information.

In another possible implementation, the second network element includes a communications interface, a memory, and a processor. The memory stores a group of program code, and the processor is configured to invoke the program code stored in the memory, to perform the following operations: receiving a deregistration message from a first network element through the communications interface, where the deregistration message includes second network identifier information, the second network identifier information is obtained based on first network identifier information by using a private key, the first network element is a data management network element or a first security edge protection proxy, and the second network element is a mobility management network element or a second security edge protection proxy; verifying the second network identifier information by using a public key corresponding to the private key; and sending, through the communications interface, a deregistration response message to the first network element based on a verification result of the second network identifier information.

Based on a same invention concept, for problem-resolving principles and beneficial effects of the apparatus, refer to the foregoing possible method implementations of the second network element and the brought beneficial effects. Therefore, for implementation of the apparatus, refer to implementation of the method. No repeated description is provided herein.

In the foregoing two aspects, that the second network identifier information is obtained based on the first network identifier information by using the private key includes one of the following cases:

Case 1: The second network identifier information is obtained based on the first network identifier information only by using the private key. For example, only the private key is used to sign, encrypt, or perform integrity protection on the first network identifier information, or to encrypt and perform integrity protection on the first network identifier information, so as to obtain the second network identifier information. For another example, only the private key is used to sign, encrypt, or perform integrity protection on the first network identifier information and at least one of a random number and a session identifier, or to encrypt and perform integrity protection on the first network identifier information and at least one of a random number and a session identifier, so as to obtain the second network identifier information.

Case 2: The second network identifier information is obtained based on the first network identifier information by using the private key and other content. For example, the private key and the other content are used to sign, encrypt, or perform integrity protection on the first network identifier information, or to encrypt and perform integrity protection on the first network identifier information, so as to obtain the second network identifier information. For another example, the private key and the other content are used to sign, encrypt, or perform integrity protection on the first network identifier information and at least one of a random number and a session identifier, or to encrypt and perform integrity protection on the first network identifier information and at least one of a random number and a session identifier, so as to obtain the second network identifier information.

In the foregoing case 2, the "other content" may be at least one of the following: a public key preset in the first network element, a public key in a private-public key pair generated by the first network element, and another parameter that is generated by the first network element and that participates in subsequent key calculation.

According to still another aspect of this application, a method for performing verification by using encryption information is provided, including: receiving, by a first network element, a registration request message from a second network element, where the registration request message includes a user identifier, first network identifier information, and encryption information, the encryption information is information obtained by encrypting, signing, performing MAC processing on, or performing hash processing on the first network identifier information, or the encryption information is random information, the first network element is a data management network element or a first security edge protection proxy, and the second network element is a mobility management network element or a second security edge protection proxy: verifying, by the first network element, the registration request message by using the encryption information; and sending, by the first network element, a registration response message to the second network element. In this aspect, when receiving a registration request message from a visited network, a home network verifies the registration request message by using encryption information, to avoid a spoofing attack from the visited network.

Correspondingly, according to still another aspect of this application, a first network element is provided. The first network element has a function of implementing behavior of the first network element in the foregoing method. The function may be implemented by using hardware, or may be implemented by executing corresponding software by hardware. The hardware or the software includes one or more modules corresponding to the function.

In a possible implementation, the first network element includes: a communications unit, configured to receive a registration request message from a second network element, where the registration request message includes a user identifier, first network identifier information, and encryption information, the encryption information is information obtained by encrypting, signing, performing MAC processing on, or performing hash processing on the first network identifier information, or the encryption information is random information, the first network element is a data management network element or a first security edge protection proxy, and the second network element is a mobility management network element or a second security edge protection proxy; and a processing unit, configured to verify the registration request message by using the encryption information. The communications unit is further configured to send a registration response message to the second network element.

In another possible implementation, the first network element includes a communications interface, a memory, and a processor. The memory stores a group of program code, and the processor is configured to invoke the program code stored in the memory, to perform the following operations: receiving a registration request message from a second network element through the communications interface, where the registration request message includes a user identifier, first network identifier information, and encryption information, the encryption information is information obtained by encrypting, signing, performing MAC processing on, or performing hash processing on the first network identifier information, or the encryption information is random information, the first network element is a data management network element or a first security edge protection proxy, and the second network element is a mobility management network element or a second security edge protection proxy; verifying the registration request message by using the encryption information; and controlling the communications interface to send a registration response message to the second network element.

Based on a same invention concept, for problem-resolving principles and beneficial effects of the apparatus, refer to the foregoing possible method implementations of the first network element and the brought beneficial effects. Therefore, for implementation of the apparatus, refer to implementation of the method. No repeated description is provided herein.

According to still another aspect of this application, another method for performing verification by using encryption information is provided, including: obtaining, by a first network element, encryption information by encrypting, signing, performing MAC processing on, or performing hash processing on first network identifier information, or generating, by a first network element, random information as encryption information; sending, by the first network element, a deregistration message to a second network element, where the deregistration message includes the first network identifier information and the encryption information, the first network element is a data management network element or a first security edge protection proxy, and the second network element is a mobility management network element or a second security edge protection proxy; and receiving, by the first network element, a deregistration response message from the second network element. In this aspect, when sending a deregistration message to a visited network, a home network adds encryption information into the deregistration message, so that the visited network can verify the deregistration message by using the encryption information, to avoid a spoofing attack from the home network.

Correspondingly, according to still another aspect of this application, a first network element is provided. The first network element has a function of implementing behavior of the first network element in the foregoing method. The function may be implemented by using hardware, or may be implemented by executing corresponding software by hardware. The hardware or the software includes one or more modules corresponding to the function.

In a possible implementation, the first network element includes: a processing unit, configured to: obtain encryption information by encrypting, signing, performing MAC processing on, or performing hash processing on first network identifier information, or generate random information as encryption information; and a communications unit, configured to send deregistration message to a second network element, where the deregistration message includes the first network identifier information and the encryption information, the first network element is a data management network element or a first security edge protection proxy, and the second network element is a mobility management network element or a second security edge protection proxy. The communications unit is further configured to receive a deregistration response message from the second network element.

In another possible implementation, the first network element includes a communications interface, a memory, and a processor. The memory stores a group of program code, and the processor is configured to invoke the program code stored in the memory, to perform the following operations: obtaining encryption information by encrypting, signing, performing MAC processing on, or performing hash processing on first network identifier information, or generating random information as encryption information; controlling the communications interface to send deregistration message to a second network element, where the deregistration message includes the first network identifier information and the encryption information, the first network element is a data management network element or a first security edge protection proxy, and the second network element is a mobility management network element or a second security edge protection proxy; and receiving a deregistration response message from the second network element through the communications interface.

Based on a same invention concept, for problem-resolving principles and beneficial effects of the apparatus, refer to the foregoing possible method implementations of the first network element and the brought beneficial effects. Therefore, for implementation of the apparatus, refer to implementation of the method. No repeated description is provided herein.

According to still another aspect of this application, still another method for performing verification by using encryption information is provided, including: obtaining, by a second network element, encryption information by encrypting, signing, performing MAC processing on, or performing hash processing on first network identifier information, or generating, by a second network element, random information as encryption information; sending, by the second network element, a registration request message to a first network element, where the registration request message includes the first network identifier information and the encryption information, the first network element is a data management network element or a first security edge protection proxy, and the second network element is a first mobility management network element or a second security edge protection proxy; and receiving, by the second network element, a registration response message from the first network element. In this aspect, when sending a registration request message to a home network, a visited network adds encryption information into the registration request message, so that the home network can verify the registration request message by using the encryption information, to avoid a spoofing attack from the visited network.

Correspondingly, according to still another aspect of this application, a second network element is provided. The second network element has a function of implementing behavior of the second network element in the foregoing method. The function may be implemented by using hardware, or may be implemented by executing corresponding software by hardware. The hardware or the software includes one or more modules corresponding to the function.

In a possible implementation, the second network element includes: a processing unit, configured to: obtain encryption information by encrypting, signing, performing MAC processing on, or performing hash processing on first network identifier information, or generate random information as encryption information; and a communications unit, configured to send a registration request message to a first network element, where the registration request message includes the first network identifier information and the encryption information, the first network element is a data management network element or a first security edge protection proxy, and the second network element is a first mobility management network element or a second security edge protection proxy. The communications unit is further configured to receive a registration response message from the first network element.

In another possible implementation, the second network element includes a communications interface, a memory, and a processor. The memory stores a group of program code, and the processor is configured to invoke the program code stored in the memory, to perform the following operations: obtaining encryption information by encrypting, signing, performing MAC processing on, or performing hash processing on first network identifier information, or generating random information as encryption information; controlling the communications interface to send a registration request message to a first network element, where the registration request message includes the first network identifier information and the encryption information, the first network element is a data management network element or a first security edge protection proxy, and the second network element is a first mobility management network element or a second security edge protection proxy; and receiving a registration response message from the first network element through the communications interface.

Based on a same invention concept, for problem-resolving principles and beneficial effects of the apparatus, refer to the foregoing possible method implementations of the second network element and the brought beneficial effects. Therefore, for implementation of the apparatus, refer to implementation of the method. No repeated description is provided herein.

According to still another aspect of this application, still another method for performing verification by using encryption information is provided, including: receiving, by a second network element, a deregistration message from a first network element, where the deregistration message includes first network identifier information and encryption information, the encryption information is information obtained by encrypting, signing, performing MAC processing on, or performing hash processing on the first network identifier information, or the encryption information is random information, the first network element is a data management network element or a first security edge protection proxy, and the second network element is a mobility management network element or a second security edge protection proxy; verifying, by the second network element, the deregistration message by using the encryption information; and sending, by the second network element, a deregistration response message to the first network element. In this aspect, when receiving a deregistration message from a home network, a visited network verifies the deregistration message by using encryption information, to avoid a spoofing attack from the home network.

Correspondingly, according to still another aspect of this application, a second network element is provided. The second network element has a function of implementing behavior of the second network element in the foregoing method. The function may be implemented by using hardware, or may be implemented by executing corresponding software by hardware. The hardware or the software includes one or more modules corresponding to the function.

In a possible implementation, the second network element includes: a communications unit, configured to receive a deregistration message from a first network element, where the deregistration message includes first network identifier information and encryption information, the encryption information is information obtained by encrypting, signing, performing MAC processing on, or performing hash processing on the first network identifier information, or the encryption information is random information, the first network element is a data management network element or a first security edge protection proxy, and the second network element is a mobility management network element or a second security edge protection proxy; and a processing unit, configured to verify the deregistration message by using the encryption information. The communications unit is further configured to send a deregistration response message to the first network element.

In another possible implementation, the second network element includes a communications interface, a memory, and a processor. The memory stores a group of program code, and the processor is configured to invoke the program code stored in the memory, to perform the following operations: receiving a deregistration message from a first network element through the communications interface, where the deregistration message includes first network identifier information and encryption information, the encryption information is information obtained by encrypting, signing, performing MAC processing on, or performing hash processing on the first network identifier information, or the encryption information is random information, the first network element is a data management network element or a first security edge protection proxy, and the second network element is a mobility management network element or a second security edge protection proxy; verifying the deregistration message by using the encryption information; and controlling the communications interface to send a deregistration response message to the first network element.

For problem-resolving principles and beneficial effects of the apparatus, refer to the foregoing possible method implementations of the second network element and the brought beneficial effects. Therefore, for implementation of the apparatus, refer to implementation of the method. No repeated description is herein.

According to still another aspect of this application, a computer readable storage medium is provided. The computer readable storage medium stores an instruction. When the instruction is run on a computer, the computer is enabled to perform the methods in the foregoing aspects.

According to still another aspect of this application, a computer program product including an instruction is provided. When the computer program product is run on a computer, the computer is enabled to perform the methods in the foregoing aspects.

BRIEF DESCRIPTION OF DRAWINGS

FIG. 3a-1 and FIG. 3a-2 are a schematic diagram of a spoofing attack from an AMF in a serving network;

FIG. 3b-1 and FIG. 3b-2 are a schematic diagram of a spoofing attack from a UDM in a home network;

FIG. 12-1A and FIG. 12-1B are a schematic interaction flowchart of generating a shared key by an AMF according to an embodiment of this application;

FIG. 12-2A and FIG. 12-2B are a schematic interaction flowchart of generating a shared key by a UDM according to an embodiment of this application;

FIG. 12-3A and FIG. 12-3B are a schematic interaction flowchart of generating encryption information by an AUSF according to an embodiment of this application;

FIG. 12-4A and FIG. 12-4B are a schematic interaction flowchart of generating encryption information by a UDM according to an embodiment of this application;

DESCRIPTION OF EMBODIMENTS

The following describes the embodiments of this application with reference to the accompanying drawings in the embodiments of this application.

First, an authentication procedure and a registration procedure of UE are described.

When the UE roams to a serving network, the UE registers with a visited network. As shown in FIG. 3a-1 and FIG. 3a-2 or FIG. 3b-1 and FIG. 3b-2, the authentication procedure and the registration procedure of the UE are as follows:

S301. The UE sends a registration request message (registration request) to an AMF, where the registration request includes a user identifier (for example, a SubID or an SUPI).

S302. After receiving the registration request message from the UE, the AMF sends an authentication initiation request (authentication initiation request) to an AUSF, where the authentication initiation request includes the user identifier and an identifier (for example, a PLMN ID or an AMF ID) related to the serving network.

S303. After receiving the authentication initiation request, the AUSF sends an authentication information request (authentication information request) to a UDM, where the authentication information request includes the user identifier and the identifier (for example, the PLMN ID or the AMF ID) related to the serving network.

S304. After receiving the authentication information request message, the UDM selects an authentication method based on configuration, and delivers an authentication vector.

S305. The UE, the AMF, and the AUSF complete a bidirectional authentication process based on a process defined in 3GPP 33.501.

S306. The AUSF performs authentication confirmation in the home network according to an algorithm defined in 3GPP 33.501, and notifies the UDM of an authentication confirmation result, where a message sent by the AUSF to the UDM includes the SUPI, the identifier (for example, the PLMN ID or the AMF ID) related to the serving network, and an authentication result.

S307. The AMF sends a registration message, where the message carries the SUPI and the identifier related to the serving network.

S308. The UDM/ARPF returns a registration result to the AMF.

S309. If the UDM/ARPF has a record of an old AMF, the UDM instructs the old AMF to deregister a user corresponding to the SUPI.

S310. The old AMF deletes an MM context of the user corresponding to the SUPI, and instructs a related SMF to release a PDU session.

Figure 4:
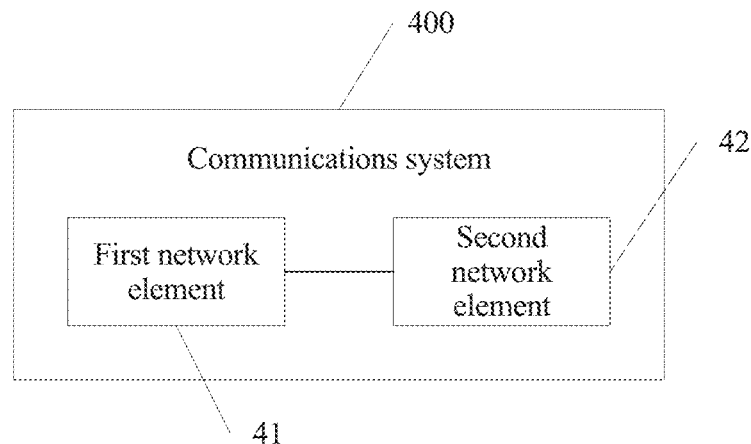
FIG. 4 is a schematic structural diagram of a communications system according to an embodiment of this application.

This application provides a communications system. FIG. 4 is a schematic structural diagram of a communications system 400 according to an embodiment of this application. The communications system 400 may include a first network element 41 and a second network element 42. The first network element 41 is a network element in a visited network, and the second network element 42 is a network element in a home network. Further, the communications system 400 may further include a terminal device (not shown). The first network element 41 may be an access and mobility management network element or a security edge proxy gateway in the visited network. The second network element 42 may be a unified data management network element or a security edge proxy gateway in the home network. It should be noted that, the access and mobility management network element and the unified data management network element each are only a name, and the name imposes no limitation on the network element. For example, the access and mobility management network element may be replaced with an "access and mobility management function" or have another name. In addition, the access and mobility management network element may also be corresponding to a network element that includes another function in addition to the access and mobility management function. The unified data management network element may be replaced with a "unified data management function" or have another name. In addition, the unified data management network element may also be corresponding to a network element that includes another function in addition to the unified data management function. Descriptions are centrally provided herein, and details are not described below again.

In this application, when receiving a registration request message from a visited network, a home network verifies the registration request message by using a shared key, to avoid a spoofing attack from the visited network and avoid a spoofing attack from a network. When receiving a deregistration message from the home network, the visited network verifies the deregistration message by using a shared key, to avoid a spoofing attack from the home network.

Figure 1A:
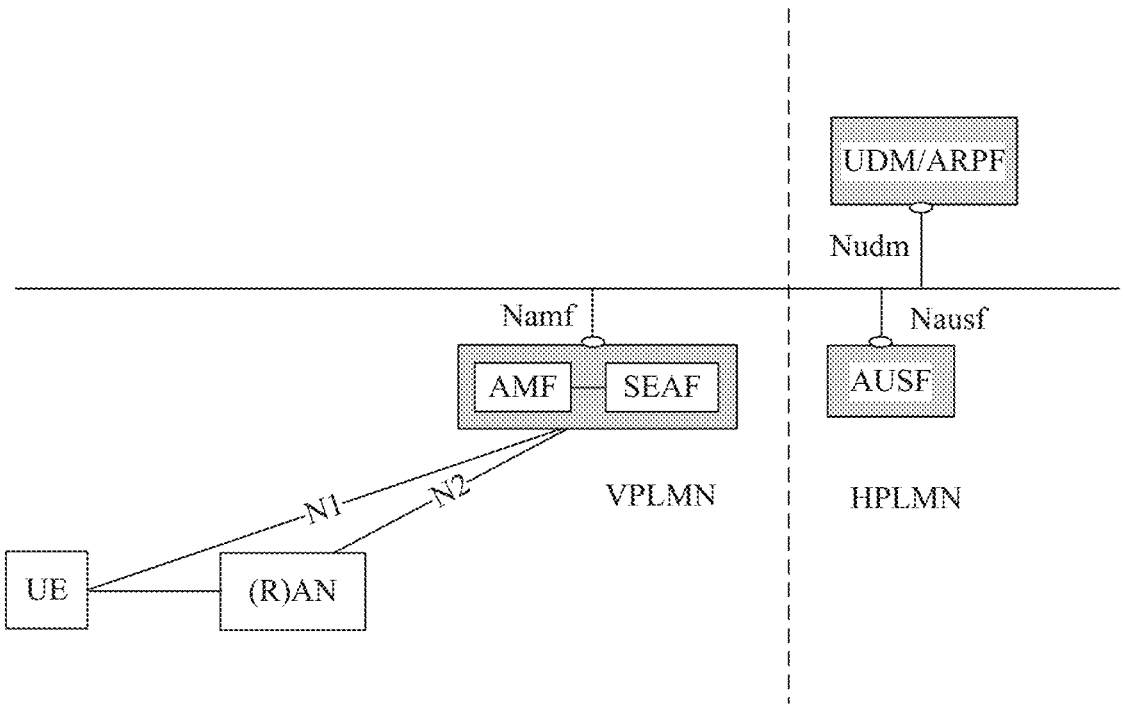
FIG. 1a and FIG. 1b are schematic architectural diagrams of a 5th generation mobile communications system.
Figure 1B:
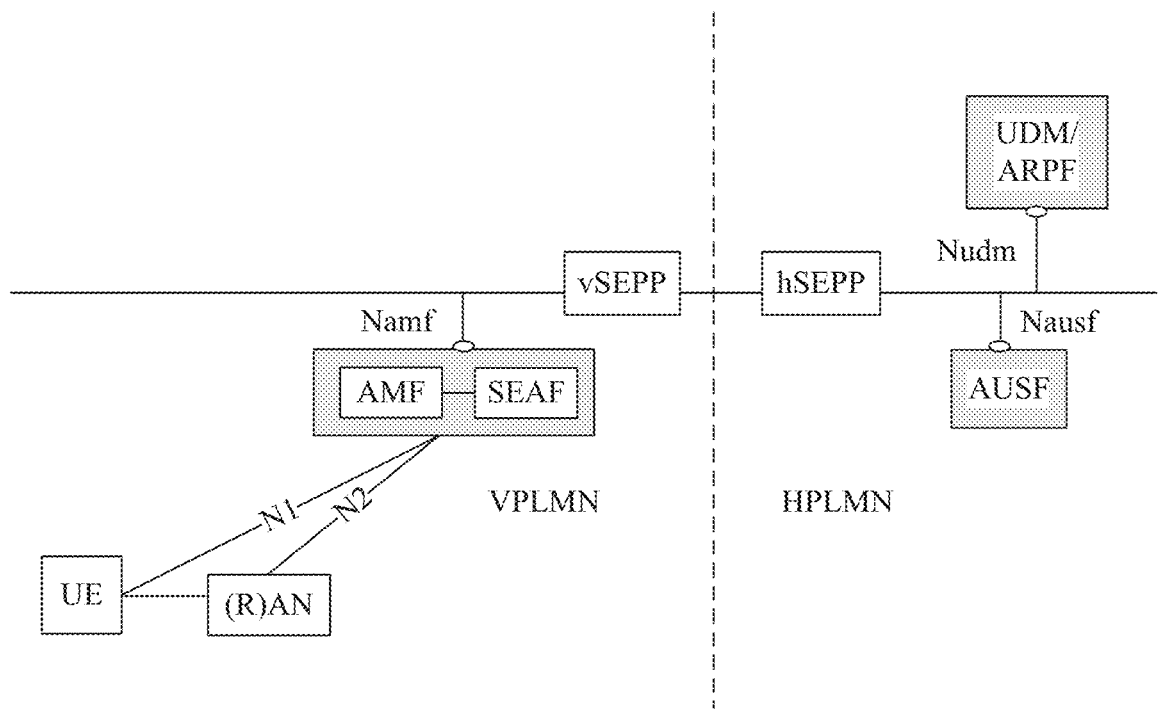

As shown in FIG. 1a and FIG. 1b, a next generation communications system is used as an example. As shown in FIG. 1a, the communications system may include an AMF and a UDM. As shown in FIG. 1b, the communications system includes an AMF and a UDM, and further includes a security edge protection proxy hSEPP in a home network and a security edge protection proxy vSEPP in a visited network. If the first network element 41 in FIG. 4 is an access and mobility management network element, the first network element 41 may be an AMF herein. If the first network element 41 in FIG. 4 is a security edge proxy gateway, the first network element 41 may be a security anchor function (SEAF) entity herein. The second network element 42 in FIG. 4 may be a UDM/authentication credential repository and processing function (ARPF) entity herein. The AMF is mainly responsible for access management of a terminal device. The UDM is responsible for centrally managing subscription data of the terminal device. It should be noted that, the AMF and the SEAF may be separately disposed, and in this case, communication between the AMF and the home network needs to be forwarded by the SEAF, or the AMF and the SEAF may be integrated. The ARPF may be a function entity that is a part of the UDM. The communications system may further include an access network (AN) device or a radio access network (RAN) device (radio), an AUSF, and the like.

In FIG. 1a and FIG. 1b, another function entity may be further included, and only several function entities in this application are mainly described herein. The entities are connected to each other through an Nx interface (for example, N1 or N2 in the figure). It should be noted that, the access and mobility management function entity and the unified data management function entity each are only a name, and the name imposes no limitation on the entity. For example, the access and mobility management function entity may be replaced with an "access and mobility management function" or have another name. In addition, the access and mobility management function entity may also be corresponding to an entity that includes another function in addition to the access and mobility management function. The unified data management function entity may be replaced with a "unified data management function" or have another name. In addition, the unified data management function entity may also be corresponding to an entity that includes another function in addition to the unified data management function. Descriptions are centrally provided herein, and details are not described below again.

In a specific implementation, any function entity or network element in the system shown in FIG. 1a, FIG. 1b, or FIG. 4 may be implemented by one entity device, or may be jointly implemented by a plurality of entity devices. This is not specifically limited in the embodiments of the present disclosure. To be specific, it may be understood that the any function entity or network element in the system may be a logical function module in an entity device or a logical function module including a plurality of entity devices. This is not specifically limited in the embodiments of the present disclosure.

The terminal device shown in FIG. 1a, FIG. 1b, or FIG. 4 is a device with a wireless receiving/sending function. The terminal device may be deployed on land, and includes an indoor device, an outdoor device, a hand-held device, a wearable device, or a vehicle-mounted device; or may be deployed on the water (for example, on a ship); or may be deployed in the air (for example, on an airplane, a balloon, or a satellite). The terminal device may be a mobile phone), a tablet computer, a computer with a wireless receiving/sending function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. The terminal device may be sometimes referred to as user equipment (UE), an access terminal device, a UE unit, a UE station, a mobile station a remote station, a remote terminal device, a mobile device, a UE terminal device, a terminal, a wireless communications device, a UE agent, a UE apparatus, or the like.

Network architectures and service scenarios that are described in the embodiments of this application are intended to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application are also applicable to a similar technical problem.

It should be noted that, the terms "system" and "network" may be used interchangeably in the embodiments of this application. "A plurality of" means two or more than two, and therefore, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless otherwise specified. In addition, to clearly describe the technical solutions in the embodiments of this application, terms such as "first" and "second" are used in the embodiments of this application to distinguish between same items or similar items with basically same functions and purposes. A person skilled in the art may understand that the terms such as "first" and "second" do not limit a quantity or an execution sequence, and the terms such as "first" and "second" do not mean that objects are definitely different.

Figure 2:
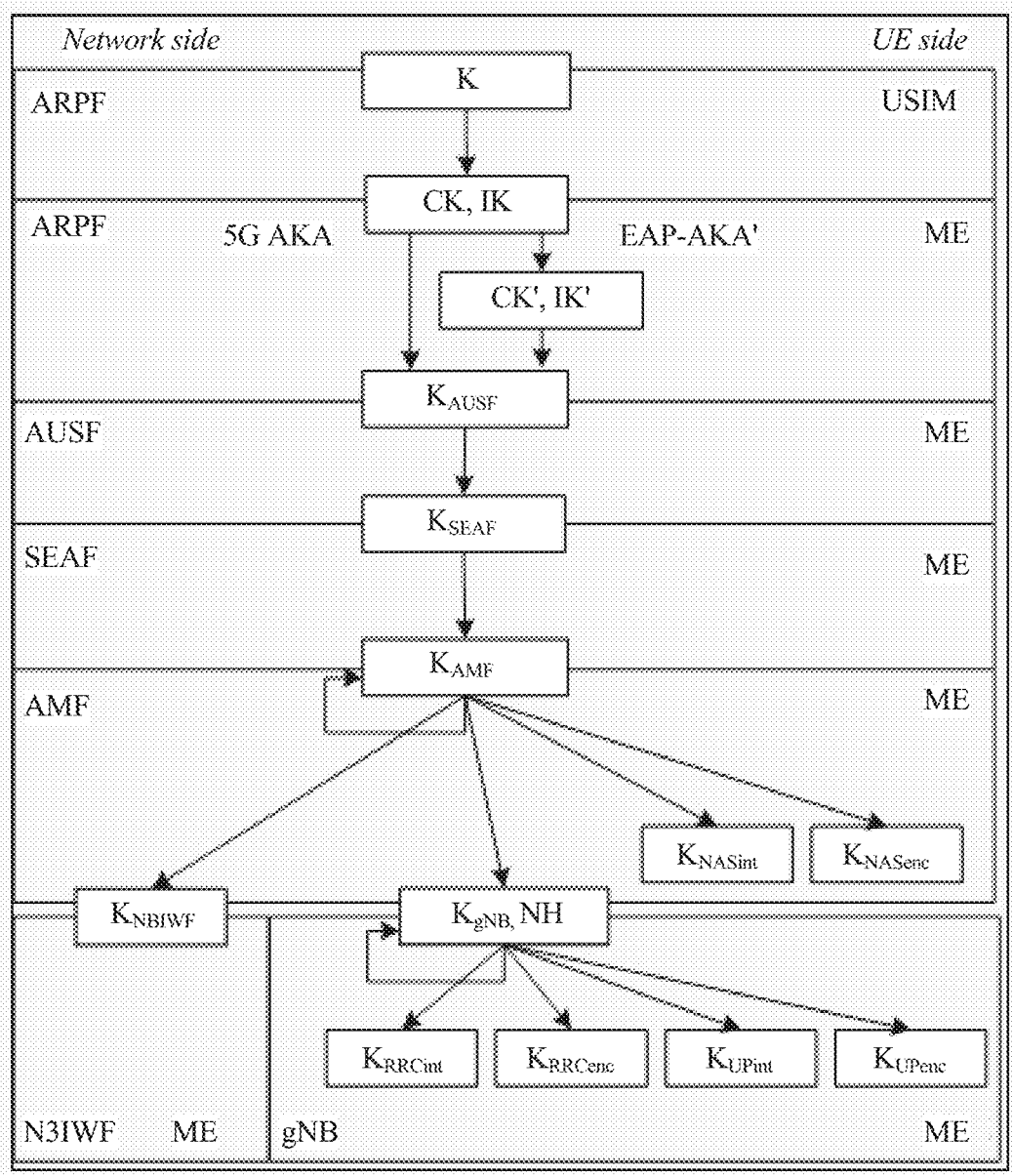
FIG. 2 is a schematic diagram of a key architecture of a 5th generation mobile communications system.
Figures 1, 3A:
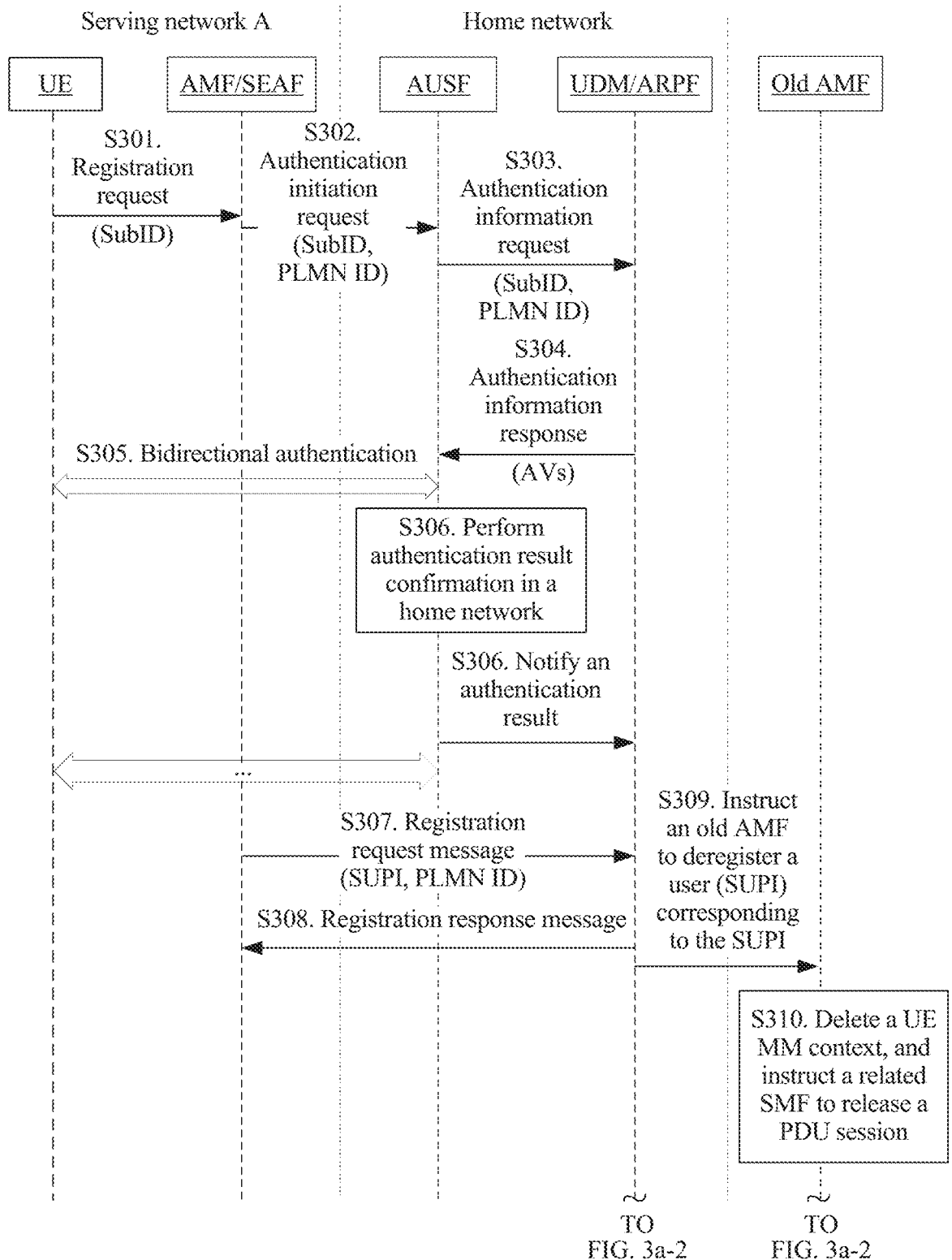
Figures 2, 3A:
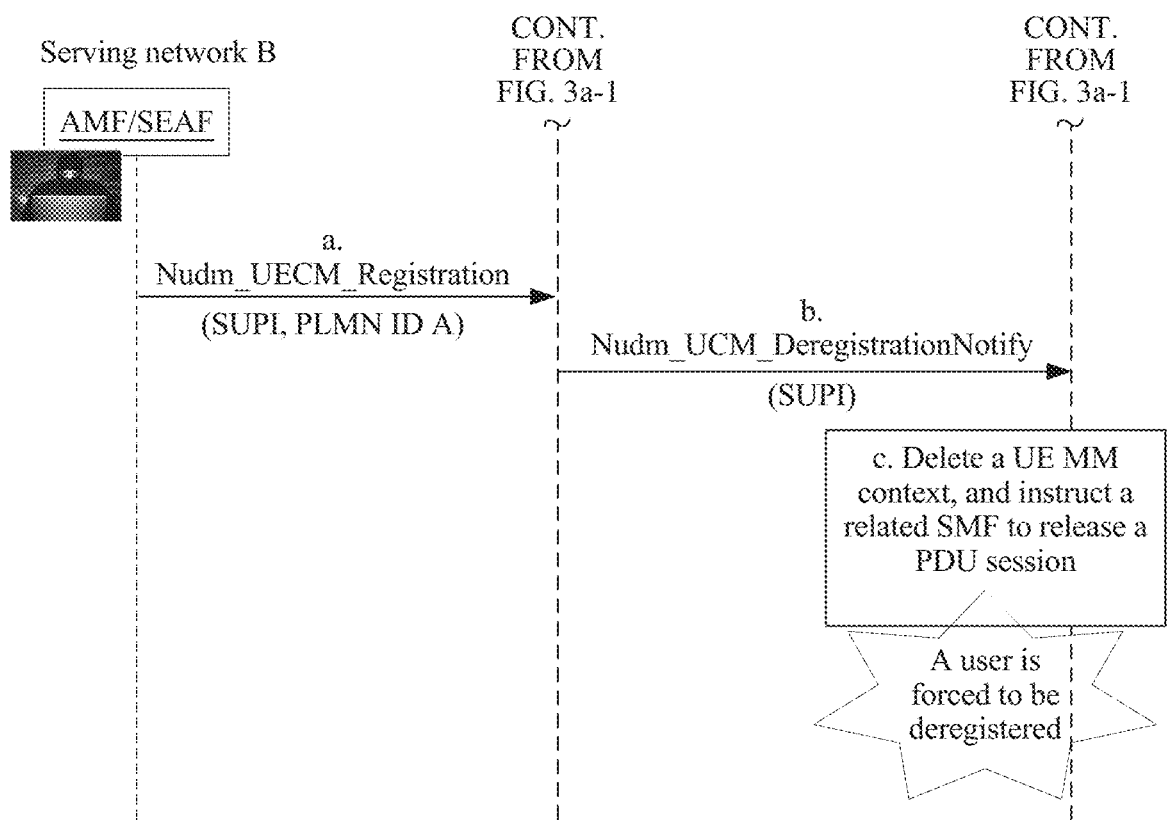

FIG. 3a-1 and FIG. 3a-2 are a schematic diagram of a spoofing attack from an AMF in a serving network. A malicious AMF in a serving network B may send a registration message to a UDM in a home network at any time (scenario 1). The message carries an SUPI and a PLMN ID A of a serving network A. The UDM finds, by using a table, that authentication on the SUPI succeeds in the serving network A corresponding to the PLMN ID A. Therefore, the UDM instructs an old AMF to deregister a user corresponding to the SUPI. The old AMF deletes an MM context of the user corresponding to the SUPI, and instructs a related SMF to release a PDU session. Consequently, the user is forced to be deregistered. This is equivalent to a denial of service DOS attack. Further, an attacker may send a large quantity of spoofed registration messages, to enable a large quantity of users to be deregistered.

The embodiments of this application provide a method for performing verification by using a shared key and an apparatus. When receiving a registration request message from a visited network, a home network verifies the registration request message by using a shared key, to avoid a spoofing attack from the visited network.

Figure 5:
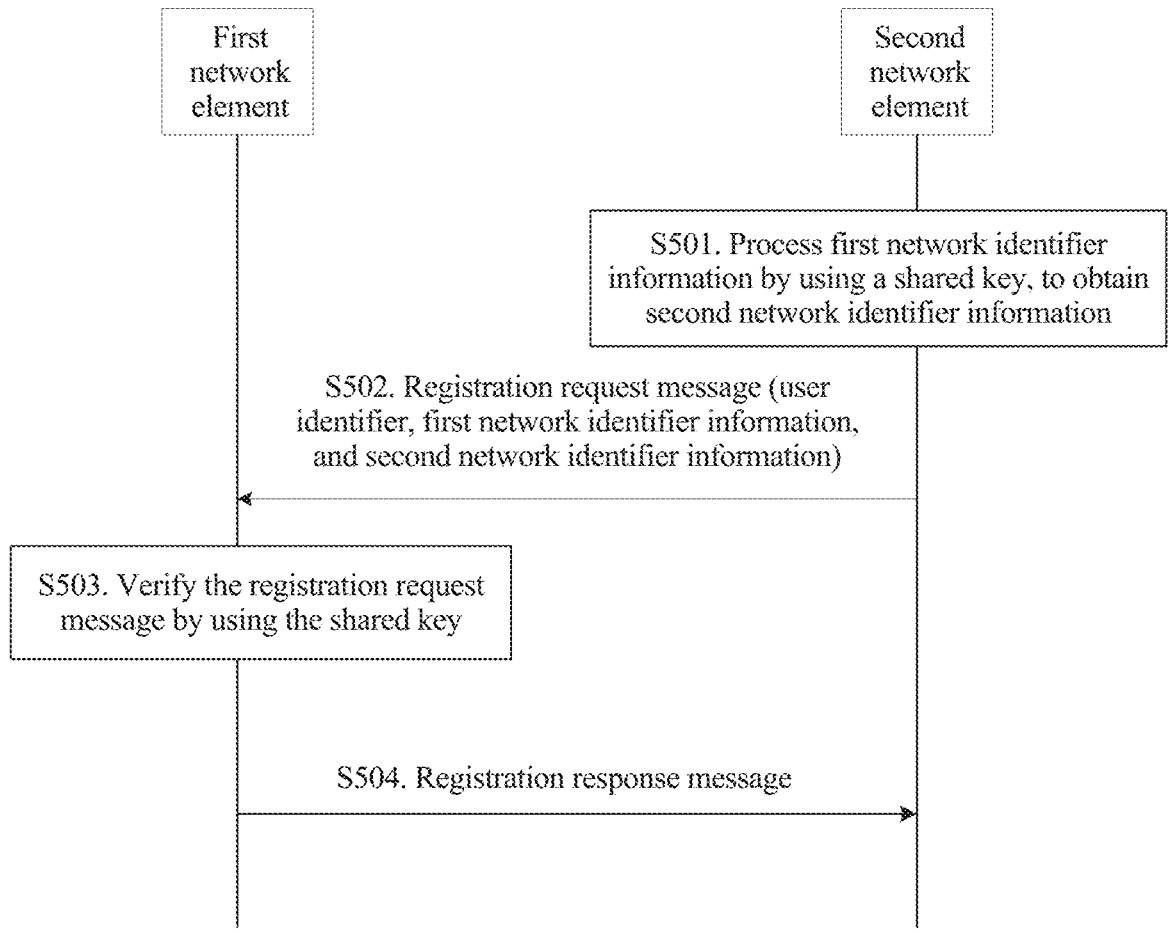
FIG. 5 is a schematic interaction flowchart of a method for performing verification by using a shared key according to an embodiment of this application.

FIG. 5 is a schematic interaction flowchart of a method for performing verification by using a shared key according to an embodiment of this application. The method is applied to the scenario 1, and the method may include the following steps.

S501. A second network element processes first network identifier information by using a shared key, to obtain second network identifier information, where the shared key is a key used between a first network element and the second network element, the first network element is a data management network element or a first security edge protection proxy, and the second network element is a first mobility management network element or a second security edge protection proxy.

S502. The second network element sends a registration request message to the first network element, where the registration request message includes a user identifier, the first network identifier information, and the second network identifier information; and the first network element receives the registration request message from the second network element, where the registration request message includes the user identifier, the first network identifier information, and the second network identifier information, and the second network identifier information is obtained by processing the first network identifier information by using the shared key, and the shared key is a key used between the first network element and the second network element.

S503. The first network element verifies the registration request message by using the shared key.

S504. The first network element sends a registration response message to the second network element, and the second network element receives the registration response message from the first network element.

In this embodiment, the first network element may be a data management network element such as a UDM, or the first network element may be a first security edge protection proxy. The second network element is a mobility management network element such as an AMF, or the second network element may be a second security edge protection proxy. For example, the following case may exist: The first network element may be a UDM, and the second network element may be an AMF; or the first network element may be a UDM, and the second network element may be a second security edge protection proxy; or the first network element may be a first security edge protection proxy, and the second network element may be an AMF; or the first network element may be a first security edge protection proxy, and the second network element may be a second security edge protection proxy. The security edge protection proxy is described in detail below. In descriptions of this embodiment, an example in which the first network element is a UDM and the second network element is an AMF is used for description.

To avoid a spoofed registration attack from an AMF in the scenario 1, when UE initially registers with a serving network, a key Kamf-udm is shared between an AMF in the serving network and a UDM in a home network, and the shared key is a key used between the AMF and the UDM. When the AMF subsequently sends a registration request message to the UDM, the AMF calculates a key material by using the shared key and a PLMN ID of the AMF, and sends the key material to the UDM. The UDM verifies the key material based on the shared Kamf-udm. Only after the verification succeeds, a subsequent step can continue to be performed. If the verification fails, a registration procedure is directly terminated, or the AMF is instructed to perform an AKA procedure again. Because an attacker does not know the shared key Kamf-udm, this type of spoofing attack from a network can be effectively prevented.

In specific implementation, before the AMF sends the registration request message to the UDM, the AMF needs to process the first network identifier information by using the shared key. The first network identifier information may be an AMF ID or a PLMN ID.

Therefore, before S501, the AMF needs to obtain the shared key.

In an implementation, the AMF generates the shared key.

In another implementation, if the AMF and an SEAF are separately disposed, and the second network element is the first mobility management network element (namely, the AMF), the method further includes the following: The second network element receives the shared key from a second security anchor function network element (namely, the SEAF).

In still another implementation, the AMF obtains the shared key generated by an AUSF.

Generation and transfer of the shared key are described in detail below.

After obtaining the shared key, the AMF processes the first network identifier information by using the shared key, to obtain the second network identifier information. The first network identifier information may be a PLMN ID or an AMF ID, and the second network identifier information is information obtained by processing the first network identifier information by using the shared key.

Specifically, that a second network element processes first network identifier information by using a first shared key includes the following:

The second network element encrypts the first network identifier information by using the shared key; or the second network element encrypts the first network identifier information and a first random number by using the shared key; or the second network element performs a message authentication code operation on the first network identifier information and the first shared key; or the second network element performs a message authentication code operation on the first network identifier information, a first random number, and the first shared key; or the second network element performs a hash operation on the first network identifier information and the first shared key; or the second network element performs a hash operation on the first network identifier information, a first random number, and the first shared key.

For example, the AMF optionally generates a random number nonce, and uses Kamf-udm and the optional nonce to generate a key Kamf-udm* for one-time use, to protect the PLMN ID. There may be the following three processing methods:

encryption protection: ENC (Kamf-udm*, plmnid, NONCE), where nonce herein is optional;

message authentication code operation (also referred to as "verification information protection"): MAC (Kamf-udm*, plmnid, NONCE), where nonce herein is optional; and hash operation (also referred to as "digest value protection"): hash (Kamf-udm*, plmnid, NONCE), where nonce herein is optional.

The AMF stores Kamf-udm* as Kamf-udm.

The UDM receives the registration request message sent by the AMF. In S503, the UDM verifies the registration request message by using the shared key.

Before performing verification, the UDM needs to obtain the shared key. Further, the UDM pre-stores a correspondence between a shared key and a user identifier and/or network identifier information based on a user identifier and/or network identifier information. In this case, before S503, the method further includes the following:

The first network element searches for, based on the correspondence between a shared key and at least one of a user identifier and network identifier information, the shared key corresponding to at least one of the user identifier and the first network identifier information that are included in the registration request message.

Further, the correspondence further includes the authentication result in FIG. 3a-1 and FIG. 3a-2 or FIG. 3b-1 and FIG. 3b-2. If the UDM finds, based on the user identifier and/or the network identifier information, that the authentication result indicates that authentication fails, the UDM does not need to perform the verification process in S503, but directly notifies the AMF that registration fails or instructs the AMF to perform AKA again.

The UDM obtains the shared key for storage in the following several implementations:

In an implementation, before S501, if the first network element is a data management network element, the method further includes the following:

The first network element receives the shared key from an authentication server network element, or the first network element generates the shared key; or if the first network element is a first security edge protection proxy, the method further includes the following:

The first network element receives the shared key from an authentication server network element or a data management network element.

Specifically, the first network element is a data management network element, and that the first network element receives the shared key from an authentication server network element includes the following:

The first network element receives an authentication confirmation notification response message from the authentication server network element, where the authentication confirmation notification response message includes the shared key, and the shared key is generated by the authentication server network element, or the shared key is generated and sent to the authentication server network element by a security anchor network element, or the shared key is generated and sent to the authentication server network element by the second network element, and the second network element is the mobility management network element.

If the shared key is generated by the AUSF, and the first network element is a data management network element, the method further includes the following:

The first network element receives an authentication information request from the authentication server network element, where the authentication information request includes at least one of the user identifier and the first network identifier information; and the first network element sends an authentication vector to the authentication server network element.

That the first network element receives the shared key from an authentication server network element includes the following:

The first network element receives an authentication confirmation notification response message from the authentication server network element, where the authentication confirmation notification response message includes the shared key, and the shared key is determined by the authentication server network element based on the authentication vector.

If the shared key is generated by the SEAF, the method further includes the following:

The first network element receives an authentication information request from the authentication server network element, where the authentication information request includes at least one of the user identifier and the first network identifier information; and the first network element sends an authentication vector to the authentication server network element, so that the authentication server network element sends the authentication vector to a security anchor network element.

That the first network element receives the shared key from an authentication server network element includes the following:

The first network element receives an authentication confirmation notification response message from the authentication server network element, where the authentication confirmation notification response message includes the shared key, and the shared key is determined by the security anchor network element based on the authentication vector and sent by the security anchor network element to the authentication server network element.

If the shared key is generated by the AMF, the method further includes the following:

The first network element receives an authentication information request from the authentication server network element, where the authentication information request includes at least one of the user identifier and the first network identifier information; and the first network element sends an authentication vector to the authentication server network element, so that the authentication server network element sends the authentication vector to the second network element.

That the first network element receives the shared key from an authentication server network element includes the following:

The first network element receives an authentication confirmation notification response message from the authentication server network element, where the authentication confirmation notification response message includes the shared key, and the shared key is determined by the second network element based on the authentication vector and sent by the second network element to the authentication server network element.

In the foregoing implementation, the authentication confirmation notification response message further includes a result obtained after the authentication server network element authenticates a terminal device.

Generation and transfer processes of the shared key are described in detail below.

Further, the method further includes the following:

The first network element stores a correspondence between the shared key and at least one of the user identifier and the first network identifier information, and adds the correspondence, between the shared key and at least one of the user identifier and the first network identifier information, to the correspondence between a shared key and at least one of a user identifier and network identifier information.

For the verification process, specifically, in an implementation, the processing the first network identifier information by using a shared key includes any one type of the following processing: encrypting the first network identifier information by using the shared key, encrypting the first network identifier information and a random number by using the shared key, performing a message authentication code operation on the first network identifier information and the shared key, performing a message authentication code operation on the first network identifier information, a random number, and the shared key, performing a hash operation on the first network identifier information and the shared key, and performing a hash operation on the first network identifier information, a random number, and the shared key.

In this case, S503 specifically includes the following: The first network element obtains third network identifier information based on the first network identifier information by using the shared key; and the first network element verifies the second network identifier information by using the third network identifier information.

This implementation is a ciphertext-based verification manner. If encryption processing is performed, the first network identifier information is plaintext information, the third network identifier information obtained by encrypting the first network identifier information by using the shared key is ciphertext information, and the second network identifier information carried in the registration request message is ciphertext information obtained by the AMF through encryption by using the shared key. If a MAC operation or a hash operation is performed, the third network identifier information is a MAC value or a hash value of the first network identifier information.

That the first network element verifies the second network identifier information by using the third network identifier information specifically includes the following:

The first network element verifies whether the third network identifier information is consistent with the second network identifier information.

If encryption processing is performed, the verification process is to determine, through comparison, whether the second network identifier information obtained by the AMF through encryption is the same as the third network identifier information obtained by the UDM through encryption. If a MAC operation is performed, the verification process is to determine, through comparison, whether the third network identifier information and the second network identifier information that are MAC values are the same. If a hash operation is performed, the verification process is to determine, through comparison, whether the third network identifier information and the second network identifier information that are hash values are the same.

In another implementation, S503 specifically includes the following: The first network element obtains fourth network identifier information based on the second network identifier information by using the shared key; and the first network element verifies the first network identifier information by using the fourth network identifier information.

To be specific, the UDM decrypts the second network identifier information (ciphertext information) by using the shared key, to obtain the fourth network identifier information (plaintext information), and compares the fourth network identifier information with the first network identifier information (plaintext information) sent by the AMF.

That the first network element verifies the first network identifier information by using the fourth network identifier information specifically includes the following:

The first network element verifies whether the fourth network identifier information is consistent with the first network identifier information.

To be specific, the verification succeeds if the fourth network identifier information obtained by the UDM through decryption is the same as the first network identifier information sent by the AMF.

After verifying the registration request message, the UDM needs to feed back a registration response message to the AMF. The registration response message is a registration success response message or a registration failure response message. In this case, S504 specifically includes the following:

If the verification succeeds, the first network element sends the registration success response message to the second network element; or if the verification fails, the first network element sends the registration failure response message to the second network element.

Specifically, that the verification succeeds includes: the third network identifier information is consistent with the second network identifier information, or the fourth network identifier information is consistent with the first network identifier information; or that the verification fails includes: the third network identifier information is inconsistent with the second network identifier information, or the fourth network identifier information is inconsistent with the first network identifier information.

If the AMF receives the registration failure response message, the AMF can perform the authentication procedure again.

The first network identifier information is carried in a public land mobile network identifier parameter or a mobility management network element identifier parameter, or the first network identifier information is carried in a public land mobile network identifier information element or a mobility management network element identifier information element.

The following describes, based on the scenario 1, a procedure of performing verification by using a shared key in case of a spoofing attack from a network.

For the scenario 1, a specific procedure is different according to whether an AMF changes when a registration message and an authentication message are processed. The following separately provides descriptions.

(1) The AMF does not change when a registration request message is processed.

Figure 6A:
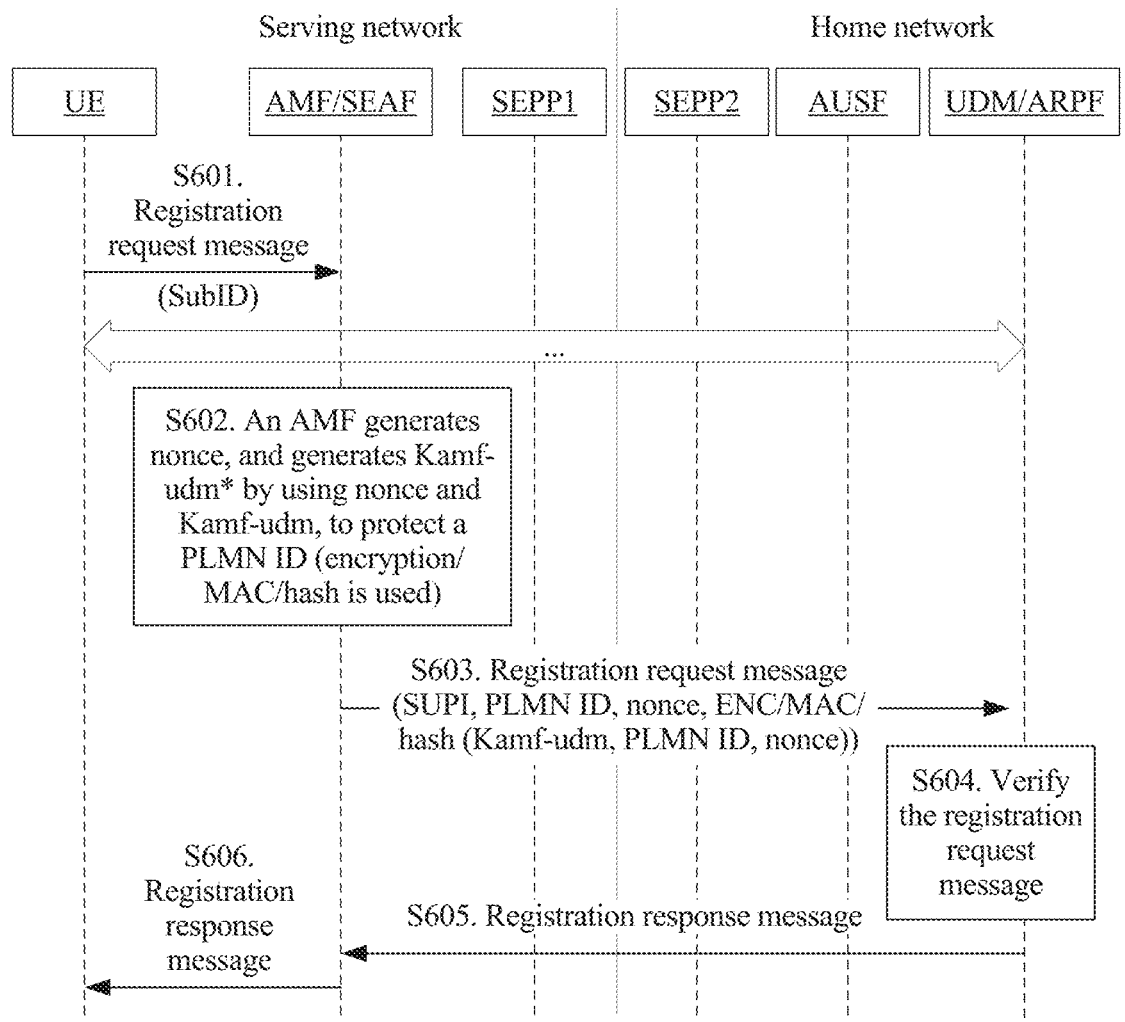
FIG. 6a is a schematic interaction flowchart of an example of a method for performing verification by using a shared key in a scenario in which an AMF does not change when a registration request message is processed according to an embodiment of this application.

As shown in FIG. 6a, a main procedure is as follows.

Figures 1, 3B:
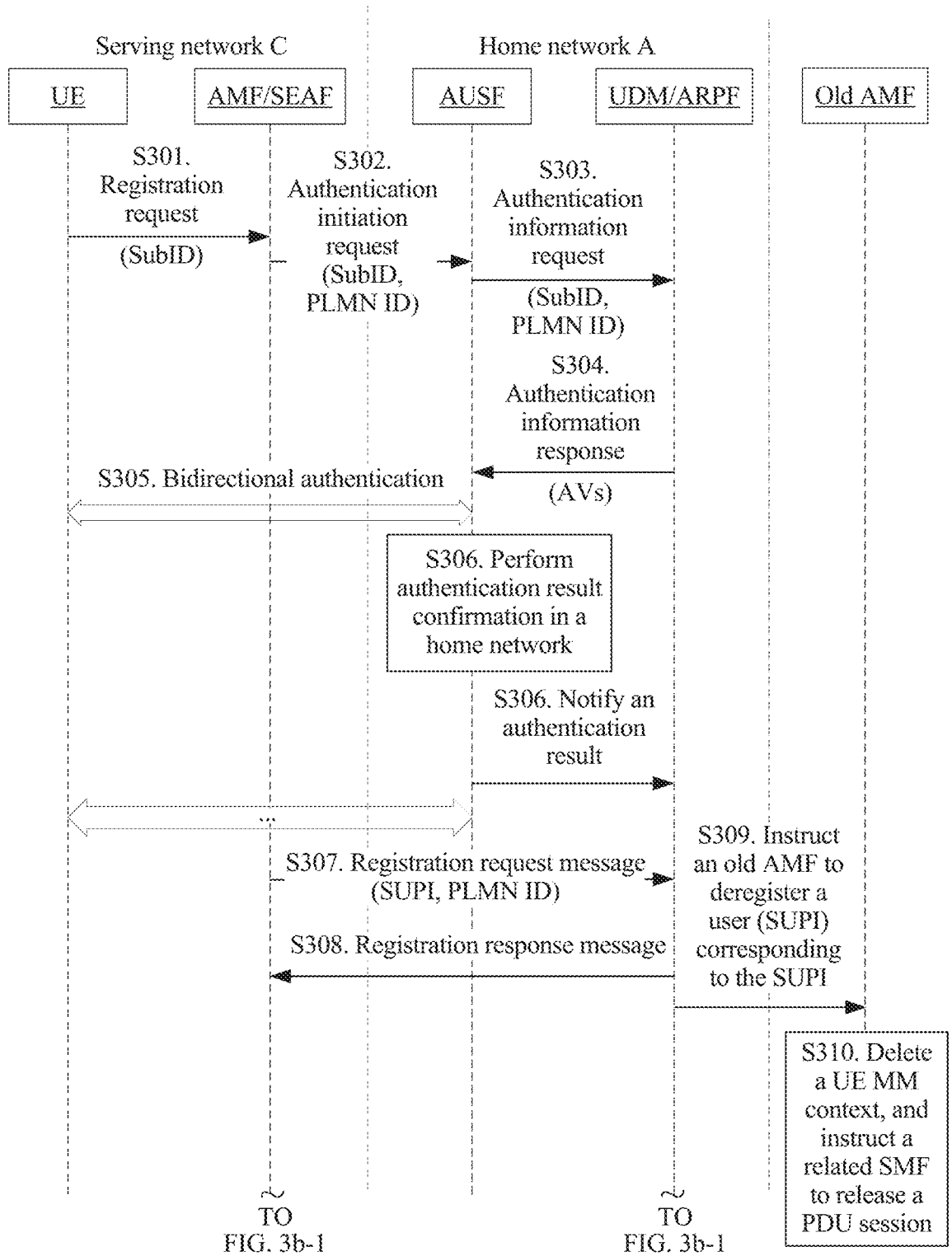
Figures 2, 3B:
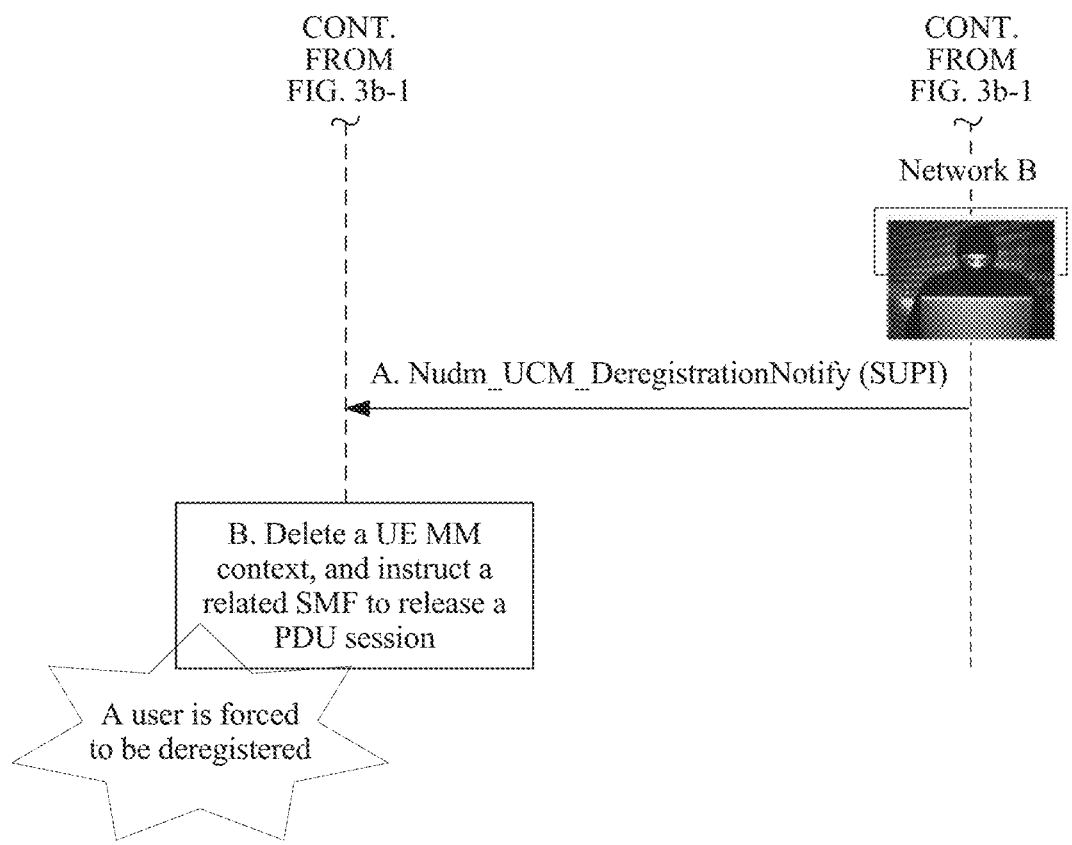

S601. UE sends a registration request message and a subsequent message to the AMF. For details, refer to S301 and S302 in the authentication procedure and the registration procedure of the UE that are shown in FIG. 3a-1 or FIG. 3b-1.

S602. The AMF optionally generates a random number nonce, and uses Kamf-udm and the optional nonce to generate a key Kamf-udm* for one-time use, to protect a PLMN ID. There may be the following three processing methods:

encryption protection: ENC (Kamf-udm*, plmnid, NONCE), where nonce herein is optional;

verification information protection: MAC (Kamf-udm*, plmnid, NONCE), where nonce herein is optional; and digest value protection: hash (Kamf-udm*, plmnid, NONCE), where nonce herein is optional.

The AMF stores Kamf-udm* as Kamf-udm.

S603. The AMF sends a registration request message (for example, Nudm_UECM_Registration) including the optional nonce and information about the protected PLMN ID to a UDM, where nonce may be alternatively a session ID of a random message, and the information about the protected PLMN ID is, for example, an encrypted PLMN ID, a MAC value of a PLMN ID, or a hash value of a PLMN ID.

S604. After receiving the registration request message, the UDM verifies the registration request message. Specifically, the UDM performs the following operations:

a. finding Kamf-udm based on an SUPI and the PLMN ID in the registration request message;

b. generating Kamf-udm* by using Kamf-udm and nonce;

c. if the registration request message carries the encrypted PLMN ID, the UDM obtains a PLMN ID through decryption by using Kamf-udm*; compares the obtained PLMN ID with the PLMN ID carried in the registration request message; and if the obtained PLMN ID is consistent with the PLMN ID carried in the registration request message, the UDM accepts the current registration request message; or if the obtained PLMN ID is inconsistent with the PLMN ID carried in the registration request message, the UDM gives a rejection response and a rejection cause, so that the AMF can re-initiate an authentication procedure or reject the current registration based on the configuration rejection cause; or d. if the registration request message carries the MAC value or the hash value, the UDM calculates a MAC/hash value by using Kamf-udm* and nonce according to a same algorithm, compares the calculated MAC/hash value with the MAC/hash value carried in the registration request message; and if the calculated MAC/hash value is consistent with the MAC/hash value carried in the registration request message, the UDM accepts the current registration message; or if the calculated MAC/hash value is inconsistent with the MAC/hash value carried in the registration request message, the UDM gives a rejection response and a rejection cause, so that the AMF can re-initiate an authentication procedure or reject the current registration based on the configuration rejection cause; and d. updating and storing Kamf-udm* as Kamf-udm.

S605. The UDM returns a registration response message (for example, Nudm_UECM_Registration response) to the SEAF/AMF.

S606. The SEAF/AMF returns a registration response message to the UE.

It should be noted that, when the AMF performs calculation through ENC/MAC/hash in the second step, the PLMN ID may be alternatively replaced with an AMF ID. In this case, when the UDM performing verification through ENC/MAC/hash in the fourth step, the UDM also needs to perform verification based on the AMF ID.

(2) The AMF changes when a registration request message is processed.

After the AMF changes during authentication, a new AMF does not have Kamf-udm, and therefore needs to negotiate with the old AMF about Kamf-udm*. In this case, the method further includes the following:

The second network element sends a context obtaining request to the second mobility management network element.

That the second network element receives the first shared key from a second mobility management network element includes the following:

The second network element receives a context obtaining response from the second mobility management network element, where the context obtaining response includes the first shared key.

The first shared key is generated based on a second shared key and at least one of a second random number and a third random number. The second shared key is a key used between the second mobility management network element and the first network element.

The second random number is generated by the second mobility management network element, or the second random number is carried in the context obtaining request.

Figure 6B:
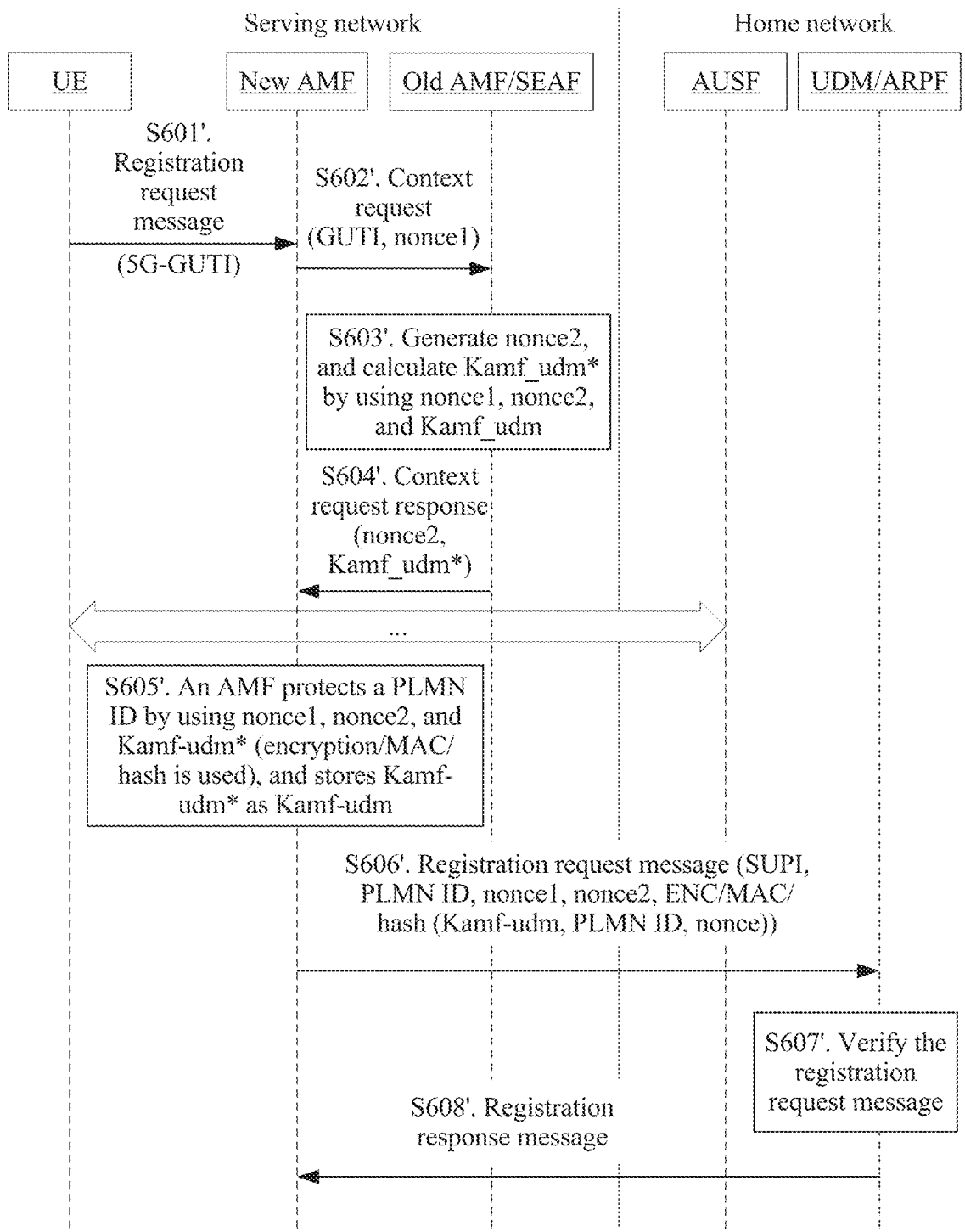
FIG. 6b is a schematic interaction flowchart of an example of a method for performing verification by using a shared key in a scenario in which an AMF changes when a registration request message is processed according to an embodiment of this application.

Specifically, as shown in FIG. 6b, a main procedure is as follows.

S601'. UE initiates a registration request message (Registration Request) and a subsequent message to the AMF. For details, refer to the first step to the seventh step in the prior art.

S602'. The new AMF requests a UE context from the old AMF, where the message optionally carries a random number nonce1.

S603'. The old AMF optionally generates nonce2, and the old AMF calculates Kamf-udm* by using nonce1, nonce2, and Kamf-udm, where Kamf-udm*=KDF (Kamf-udm, Nonce1, Nonce2).

S604'. The old AMF returns a response message of a UE context request message to the new AMF, where the message carries Kamf-udm*.

S605' to S608'. Subsequent steps are the same as S602 to S606 existing when the AMF does not change. A difference lies in that a message sent by the AMF to the UDM carries nonce1 and nonce2. When calculating Kamf-udm*, the UDM uses Kamf-udm, nonce1, and nonce2.

It should be noted that, a random number nonce may be generated by both or either of the new AMF and the old AMF. To be specific, a method for generating Kamf-udm* in S603' includes the following:

Kamf-udm*=KDF (Kamf-udm, Nonce1, Nonce2);
Kamf-udm*=KDF (Kamf-udm, Nonce1); and
Kamf-udm*=KDF (Kamf-udm, Nonce2).

In conclusion, the AMF generates a key material of the PLMN ID by using Kamf-udm and the optional random number nonce. The UDM verifies the PLMN ID by using Kamf-udm and the key material, to avoid spoofed AMF registration.

In addition, a security edge protection proxy (SEPP) is introduced into a 5G network as a security edge proxy gateway, to implement topology hiding and message filtering. Functions of the AMF and the UDM may also be transferred to the security edge proxy gateway.

Figure 7A:
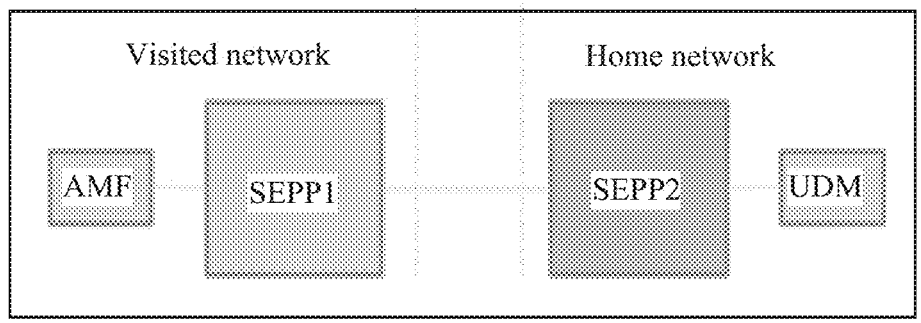
FIG. 7a to FIG. 7c are schematic structural diagrams of a security edge protection proxy.
Figure 7B:
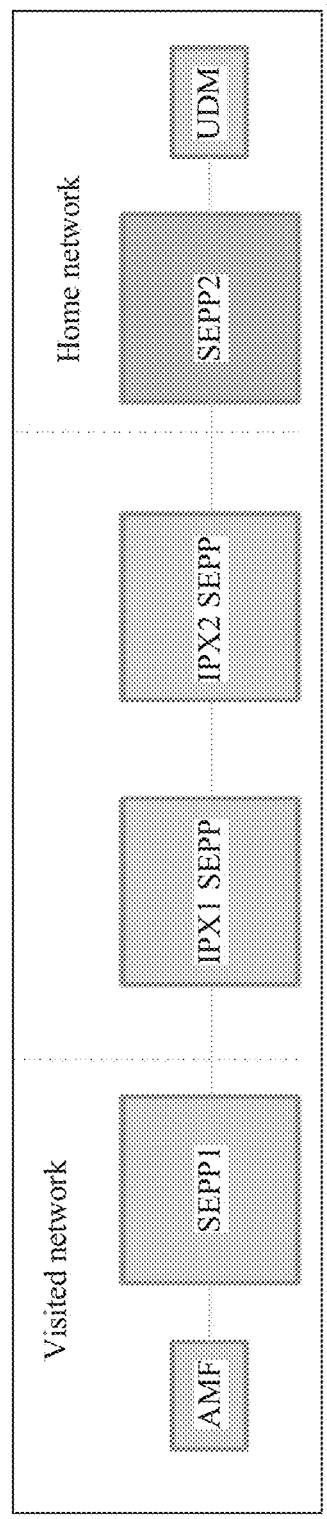
Figure 7C:
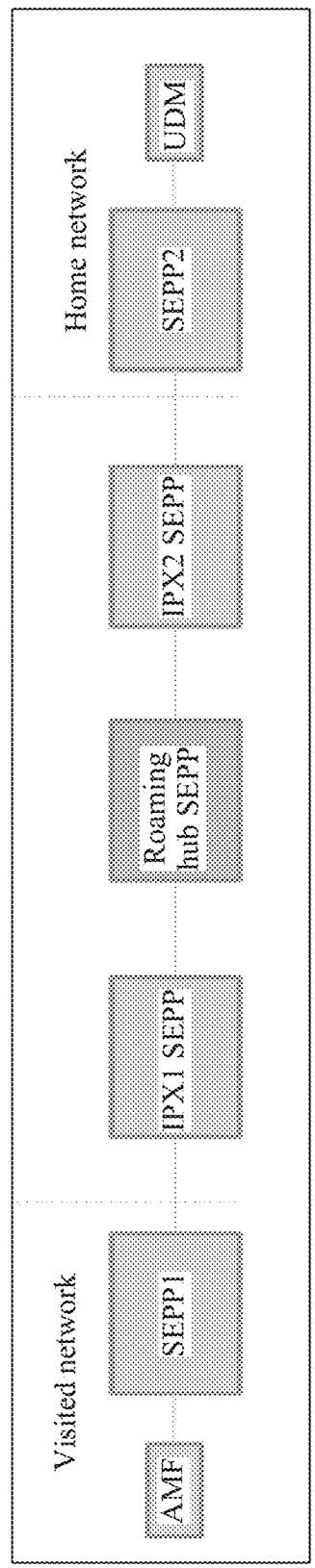

Because the SEPP has different deployment forms, for the attack scenario 1, as shown in FIG. 7a, a detection point may be placed at a SEPP2 in a home network, or as shown in FIG. 7b, a detection point may be placed at an IPX2 SEPP closest to a home network, or as shown in FIG. 7c, a detection point may be placed at a roaming hub SEPP closest to a home network. Therefore, before performing detection, the SEPP2, the IPX2 SEPP, or the roaming hub SEPP needs to obtain Kamf-udm from the UDM.

Therefore, in the foregoing embodiment, the second network element may be an AMF, or may be a SEPP1 in FIG. 7a, or an IPX1 SEPP closest to the home network in FIG. 7b, or the roaming hub SEPP in FIG. 7c. The first network element may be a UDM, or may be the SEPP2 in FIG. 7a, or the IPX2 SEPP closest to the serving network in FIG. 7b, or the roaming hub SEPP in FIG. 7c.

Figure 8A:
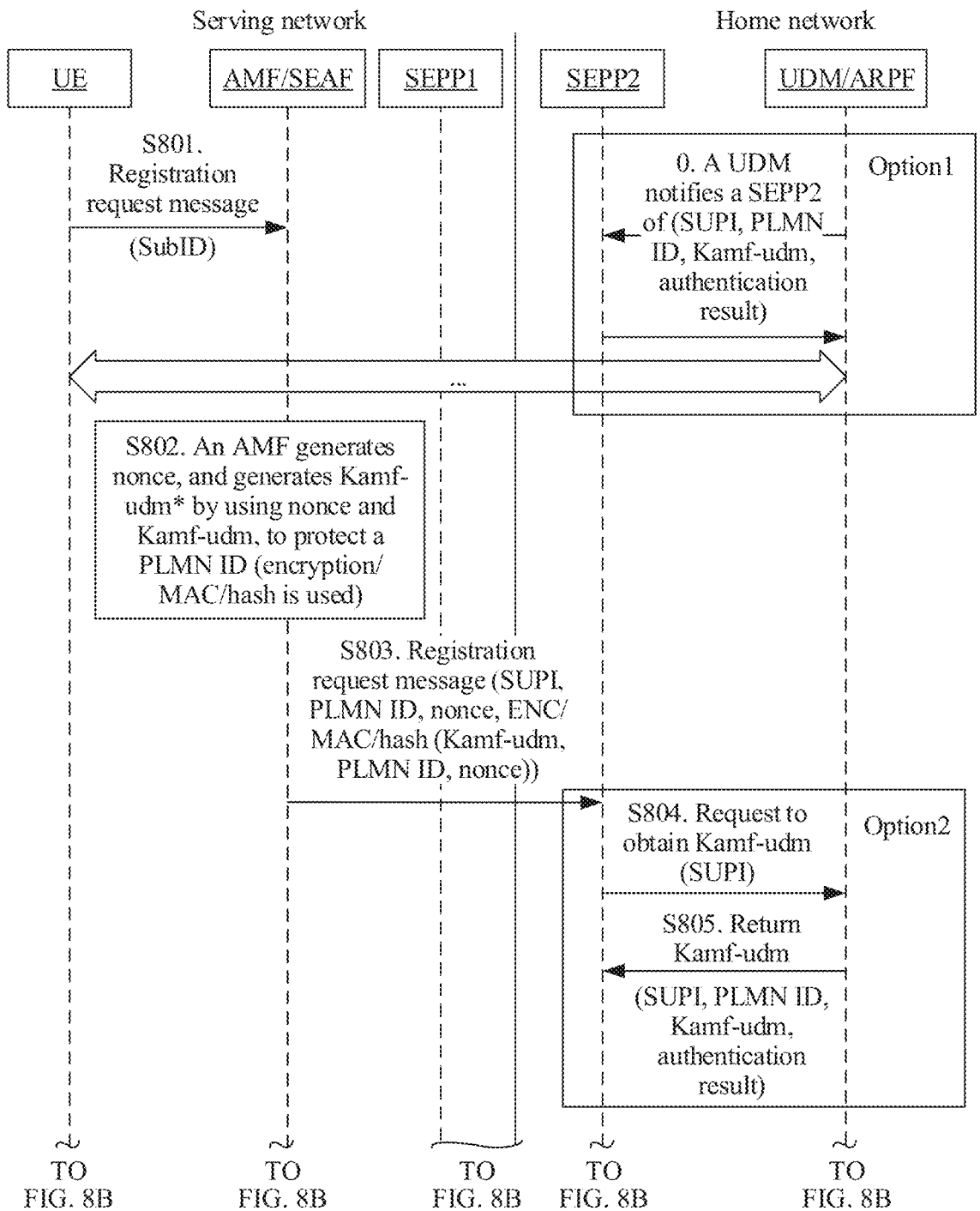
FIG. 8A and FIG. 8B are a schematic interaction flowchart of performing verification by a SEPP2 by using a shared key.
Figure 8B:
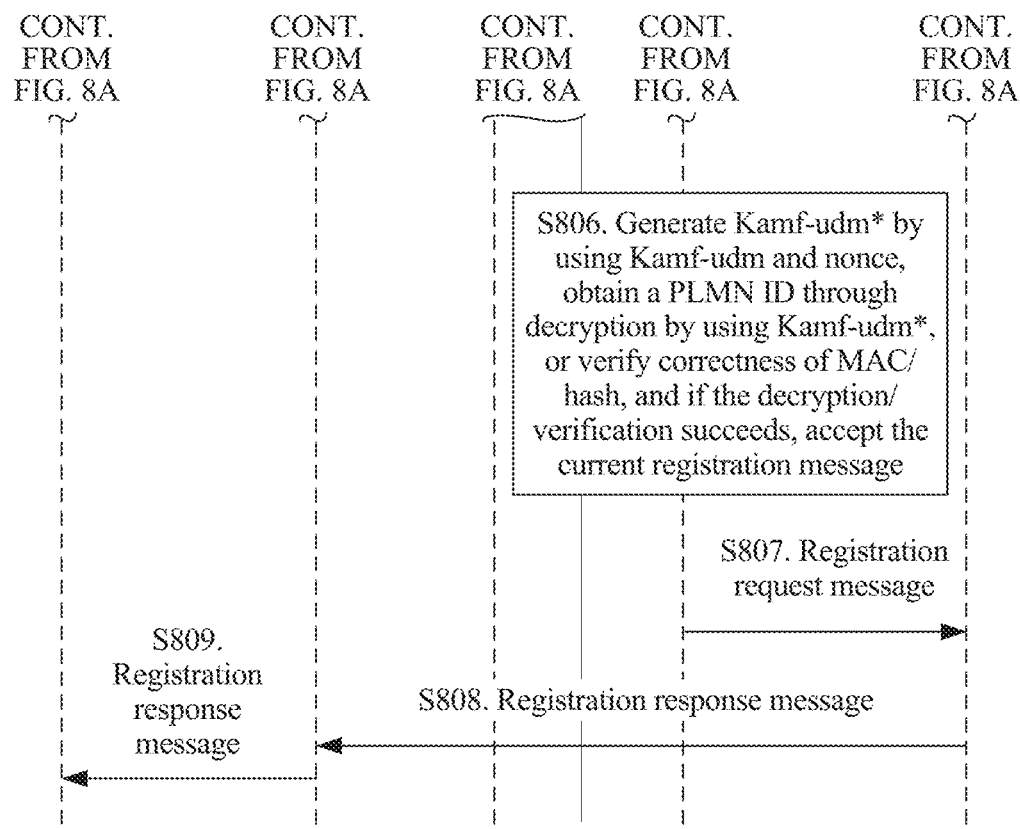

FIG. 8A and FIG. 8B are a schematic flowchart of performing detection by the SEPP2 for the attack scenario 1. A main procedure is as follows.

S801. UE initiates a registration request message (Registration Request) to an AMF.

S802. The AMF optionally generates a random number nonce, and uses Kamf-udm and the optional nonce to generate a key Kamf-udm* (Kamf-udm=KDF (Kamf-udm, Nonce)) for one-time use, to protect a PLMN ID.

S803. The AMF sends a registration request message (for example, Nudm_UECM_Registration) including the optional nonce and information about the protected PLMN ID to a UDM, where the information about the protected PLMN ID is, for example, an encrypted PLMN, a MAC value of a PLMN, or a hash value of a PLMN.

S804. After receiving the registration request message, the SEPP2 requests Kamf-udm from the UDM/ARPF, where the registration request message carries a user identifier SUPI and the PLMN ID.

S805. After receiving the registration request message, the UDM finds Kamf-udm based on the SUPI and the PLMN ID in the registration request message, and returns Kamf-udm to the SEPP2.

In addition, S804 and S805 are used as an implementation in which the SEPP2 obtains a shared key from the UDM. In an alternative manner of S804 and S805, as shown in step 0 in FIG. 8A, before receiving the registration request message from the AMF, the SEPP2 may actively obtain, from the UDM, a shared key corresponding to at least one of a plurality of user identifiers and/or network identifier information.

S806. After receiving the registration request message, the SEPP2 performs the following operations:

a. generating Kamf-udm* by using Kamf-udm and nonce; and b. if the registration request message carries the encrypted PLMN ID, the SEPP2 obtains a PLMN ID through decryption by using Kamf-udm*; compares the obtained PLMN ID with the PLMN ID carried in the registration request message; and if the obtained PLMN ID is consistent with the PLMN ID carried in the registration request message, the SEPP2 accepts the current registration message; or if the obtained PLMN ID is inconsistent with the PLMN ID carried in the registration request message, the SEPP2 gives a rejection response and a rejection cause, so that the AMF can re-initiate an authentication procedure or reject the current registration based on the configuration rejection cause; or c. if the registration request message carries the MAC value or the hash value, the SEPP2 calculates a MAC/hash value by using Kamf-udm* and nonce according to a same algorithm; compares the calculated MAC/hash value with the MAC/hash value carried in the registration request message; and if the calculated MAC/hash value is consistent with the MAC/hash value carried in the registration request message, the SEPP2 accepts the current registration message; or if the calculated MAC/hash value is inconsistent with the MAC/hash value carried in the registration request message, the SEPP2 gives a rejection response and a rejection cause, so that the AMF can re-initiate an authentication procedure or reject the current registration based on the configuration rejection cause.

S807. After completing PLMN ID verification, the SEPP2 transparently transmits the registration request message (for example, Nudm_UECM_Registration) of the AMF to the UDM.

S808. The UDM returns a registration response message (Nudm_UECM_Registration response) to the SEAF/AMF.

S809. The SEAF/AMF returns a registration response message to the UE.

According to the method for performing verification by using a shared key provided in this embodiment of this application, when receiving a registration request message from a visited network, a home network verifies the registration request message by using a shared key, to avoid a spoofing attack from the visited network.

FIG. 3b-1 and FIG. 3b-2 are a schematic diagram of a spoofing attack from a UDM in a home network. A malicious UDM in a network B directly sends a deregistration message to an AMF in a serving network (scenario 2). After the AMF receives the deregistration message, the AMF deletes an MM context of a user corresponding to an SUPI, and instructs a related SMF to release a PDU session. Consequently, the user is forced to be deregistered. This is equivalent to a denial of service DOS attack. Further, an attacker may send a large quantity of messages, to force a large quantity of users to be deregistered.

The embodiments of this application provide another method for performing verification by using a shared key and an apparatus. When receiving a deregistration message from a home network, a visited network verifies the deregistration message by using a shared key, to avoid a spoofing attack from the home network.

Figure 9:
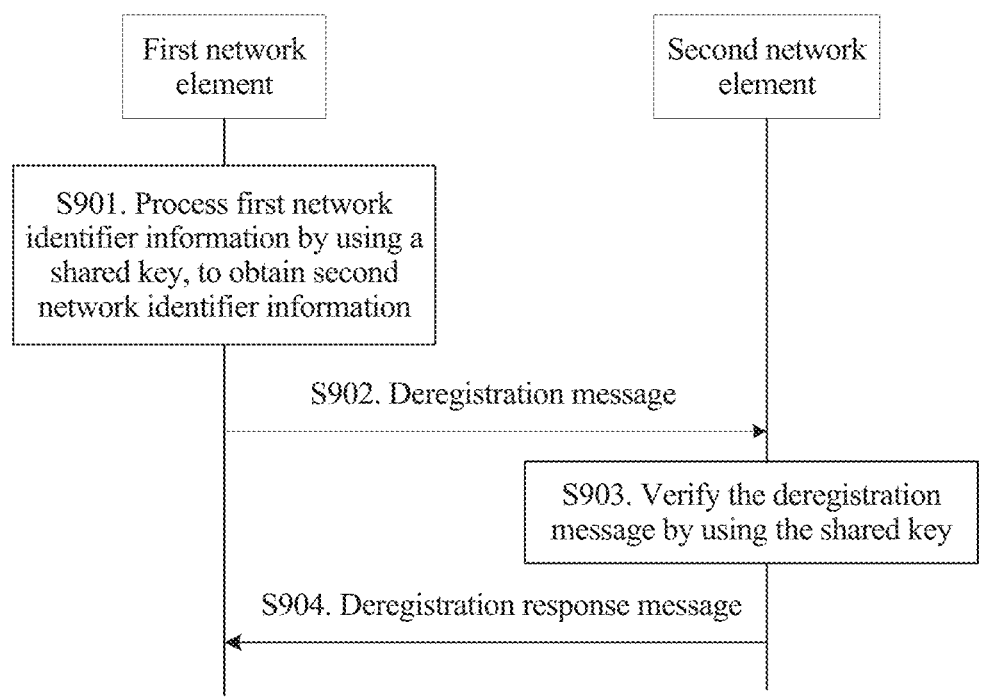
FIG. 9 is a schematic interaction flowchart of another method for performing verification by using a shared key according to an embodiment of this application.

FIG. 9 is a schematic interaction flowchart of another method for performing verification by using a shared key according to an embodiment of this application. The method is applied to the scenario 2, and the method may include the following steps.

S901. A first network element processes first network identifier information by using a shared key, to obtain second network identifier information.

S902. The first network element sends a deregistration message to a second network element, where the deregistration message includes the first network identifier information and the second network identifier information, the second network identifier information is obtained by processing the first network identifier information by using the shared key, the first network element is a data management network element or a first security edge protection proxy, and the second network element is a mobility management network element or a second security edge protection proxy; and the second network element receives the deregistration message from the first network element.

S903. The second network element verifies the deregistration message by using the shared key.

S904. The second network element sends a deregistration response message to the first network element, and the first network element receives the deregistration response message from the second network element.

In this embodiment, the first network element is a UDM or a first security edge protection proxy, and the second network element is an AMF or a second security edge protection proxy. To be specific, the first network element may be a UDM, and the second network element may be an AMF; or the first network element may be a UDM, and the second network element may be a second security edge protection proxy; or the first network element may be a first security edge protection proxy, and the second network element may be an AMF; or the first network element may be a first security edge protection proxy, and the second network element may be a second security edge protection proxy. The security edge protection proxy is described in detail below. In descriptions of this embodiment, an example in which the first network element is a UDM and the second network element is an AMF is used for description.

To avoid a spoofed deregistration attack from a UDM, when the UDM sends a deregistration message to the AMF, the UDM may calculate a key material by using the shared key and a UDM ID or a PLMN ID of the UDM, and send the key material to the AMF. The AMF verifies the key material based on the shared Kamf-udm. Only after the verification succeeds, a subsequent step can continue to be performed. If the verification fails, a deregistration procedure is directly terminated.

In specific implementation, before sending the deregistration message to the AMF, the UDM first obtains the shared key, and processes the first network identifier information by using the shared key, to obtain the second network identifier information. The first network identifier information may be a UDM ID, and the second network identifier information may be information obtained by processing the UDM ID by using the shared key.

The UDM obtains the shared key, and stores a correspondence between a shared key and at least one of a user identifier and/or network identifier information.

The UDM searches for, based on a user identifier or the first network identifier information that is included in the to-be-sent deregistration message, the shared key corresponding to the user identifier or the first network identifier information that is included in the deregistration message; and processes the first network identifier information in the deregistration message by using the shared key.

Specifically, the processing first network identifier information by using a shared key includes any one type of the following processing: encrypting the first network identifier information by using the shared key, encrypting the first network identifier information and a random number by using the shared key, performing a message authentication code operation on the first network identifier information and the shared key, performing a message authentication code operation on the first network identifier information, a random number, and the shared key, performing a hash operation on the first network identifier information and the shared key, and performing a hash operation on the first network identifier information, a random number, and the shared key. Specifically, the UDM uses Kamf-udm to encrypt the UDM ID or only encrypt a PLMN ID obtained based on the UDM ID, or calculates a MAC/hash value.

Then, the UDM sends the deregistration message to the AMF. The AMF receives the deregistration message. The AMF verifies the deregistration message by using the shared key. The message carries the foregoing encryption value or MAC/hash value.

Further, before S903, the method further includes the following:

The second network element searches for, based on the correspondence between a shared key and at least one of a user identifier and network identifier information, the shared key corresponding to at least one of the user identifier and the first network identifier information that are included in the deregistration message.

The AMF obtains the shared key in the following several implementations:

In an implementation, if the AMF generates the shared key, the method further includes the following:

The second network element generates the shared key, and sends the shared key to an authentication server network element, so that the authentication server network element sends the shared key to the first network element.

Specifically, the method further includes the following:

The second network element sends an authentication initiation request to the authentication server network element, where the authentication initiation request includes at least one of the user identifier and the first network identifier information;

the second network element receives an authentication vector from the authentication server network element; and the second network element generates the shared key based on the authentication vector.

That the second network element sends the shared key to an authentication server network element includes the following:

The second network element sends an authentication confirmation message to the authentication server network element, where the authentication confirmation message includes the shared key.

In another implementation, if an SEAF, an AUSF, or the UDM generates the shared key, and the SEAF, the AUSF, or the UDM transfers the shared key to the AMF, the method further includes the following:

The second network element receives the shared key from a security anchor network element or a data management network element.

Generation and transfer processes of the shared key are described in detail below.

In an implementation, S903 specifically includes the following:

The second network element obtains third network identifier information based on the first network identifier information by using the shared key; and the second network element verifies the second network identifier information by using the third network identifier information.

This implementation is a ciphertext-based verification manner. If encryption processing is performed, the first network identifier information is plaintext information, the third network identifier information obtained by encrypting the first network identifier information by using the shared key is ciphertext information, and the second network identifier information carried in the deregistration message is ciphertext information obtained by the UDM through encryption by using the shared key. If a MAC operation or a hash operation is performed, the third network identifier information is a MAC value or a hash value of the first network identifier information.

Further, that the second network element verifies the second network identifier information by using the third network identifier information includes the following:

The second network element verifies whether the third network identifier information is consistent with the second network identifier information.

If encryption processing is performed, the verification process is to determine, through comparison, whether the second network identifier information obtained by the UDM through encryption is the same as the third network identifier information obtained by the AMF through encryption. If a MAC operation is performed, the verification process is to determine, through comparison, whether the third network identifier information and the second network identifier information that are MAC values are the same. If a hash operation is performed, the verification process is to determine, through comparison, whether the third network identifier information and the second network identifier information that are hash values are the same.

Specifically, (a) the AMF obtains a UDM-ID or a PLMN ID through decryption based on Kamf-udm, or calculates a corresponding MAC or hash value based on Kamf-udm;

(b) the AMF compares the UDM ID (or the PLMNID obtained based on the UDM ID) in the message with the UDM ID (or a PLMN ID obtained based on the UDM ID) obtained through decryption, or compares the calculated MAC/hash value with the MAC/hash value carried in the message; and (c) if the UDM ID in the message is consistent with the UDM ID obtained through decryption or the calculated MAC/hash value is consistent with the MAC/hash value carried in the message, the AMF considers that deregistration succeeds and releases a related resource: or if the UDM ID in the message is inconsistent with the UDM ID obtained through decryption or the calculated MAC/hash value is inconsistent with the MAC/hash value carried in the message, the AMF considers that deregistration fails and does not release a related resource.

In another implementation, S903 specifically includes the following:

The second network element obtains fourth network identifier information based on the second network identifier information by using the shared key; and the second network element verifies the first network identifier information by using the fourth network identifier information.

To be specific, the AMF decrypts the second network identifier information (ciphertext information) by using the shared key, to obtain the fourth network identifier information (plaintext information), and compares the fourth network identifier information with the first network identifier information (plaintext information) sent by the UDM.

Further, that the second network element verifies the first network identifier information by using the fourth network identifier information includes the following:

The second network element verifies whether the fourth network identifier information is consistent with the first network identifier information.

To be specific, the verification succeeds if the fourth network identifier information obtained by the AMF through decryption is the same as the first network identifier information sent by the UDM.

After verifying the deregistration message, the AMF needs to feed back a deregistration response message to the UDM. The deregistration response message is a deregistration success response message or a deregistration failure response message. Step 904 specifically includes the following:

If the verification succeeds, the second network element sends the deregistration success response message to the first network element; or if the verification fails, the second network element sends the deregistration failure response message to the first network element.

That the verification succeeds includes: the third network identifier information is consistent with the second network identifier information, or the fourth network identifier information is consistent with the first network identifier information: or that the verification fails includes: the third network identifier information is inconsistent with the second network identifier information, or the fourth network identifier information is inconsistent with the first network identifier information.

The AMF sends the deregistration response message to the UDM, where the message carries deregistration message success or failure, and optionally, carries a failure cause.

In conclusion, in this embodiment of this application, the AUSF/SEAF/AMF generates the shared key Kamf-udm between the AMF and the UDM by using Kausf/Kseaf/Kamf in an existing key architecture and a random number RAND, or the UDM generates the shared key Kamf-udm between the AMF and the UDM, thereby resolving a problem that there is no shared key between the AMF and the UDM in a current key architecture.

The UDM generates a key material of the UDM ID by using Kamf-udm, and the AMF verifies the UDM ID by using Kamf-udm and the key material, to avoid spoofed UDM deregistration.

In addition, functions of the AMF and the UDM may also be transferred to a security edge protection proxy SEPP Because the SEPP has different deployment forms, for the attack scenario 2, as shown in FIG. 7a, a detection point may be placed at a SEPP1 in a serving network, or as shown in FIG. 7b, a detection point may be placed at an IPX1 SEPP closest to a serving network, or as shown in FIG. 7c, a detection point may be placed at a roaming hub SEPP. Therefore, before performing detection, the SEPP1, the IPX1 SEPP, or the roaming hub SEPP needs to obtain Kamf-udm from the AMF.

Therefore, in the foregoing embodiment, the first network element may be a UDM, or may be a SEPP2 in FIG. 7a, or an IPX2 SEPP closest to a home network in FIG. 7b, or the roaming hub SEPP in FIG. 7c. The second network element may be an AMF, or may be the SEPP1 in FIG. 7a, or the IPX1 SEPP closest to the serving network in FIG. 7b, or the roaming hub SEPP in FIG. 7c.

According to the method for performing verification by using a shared key provided in this embodiment of this application, when receiving a deregistration message from a home network, a visited network verifies the deregistration message by using a shared key, to avoid a spoofing attack from the home network.

For generation of a shared key, an AUSF, an SEAF, an AMF, or a UDM may generate the shared key. The following provides detailed descriptions with reference to a specific procedure.

(1) The AUSF Generates the Shared Key Between the AMF and the UDM.

Figure 10A:
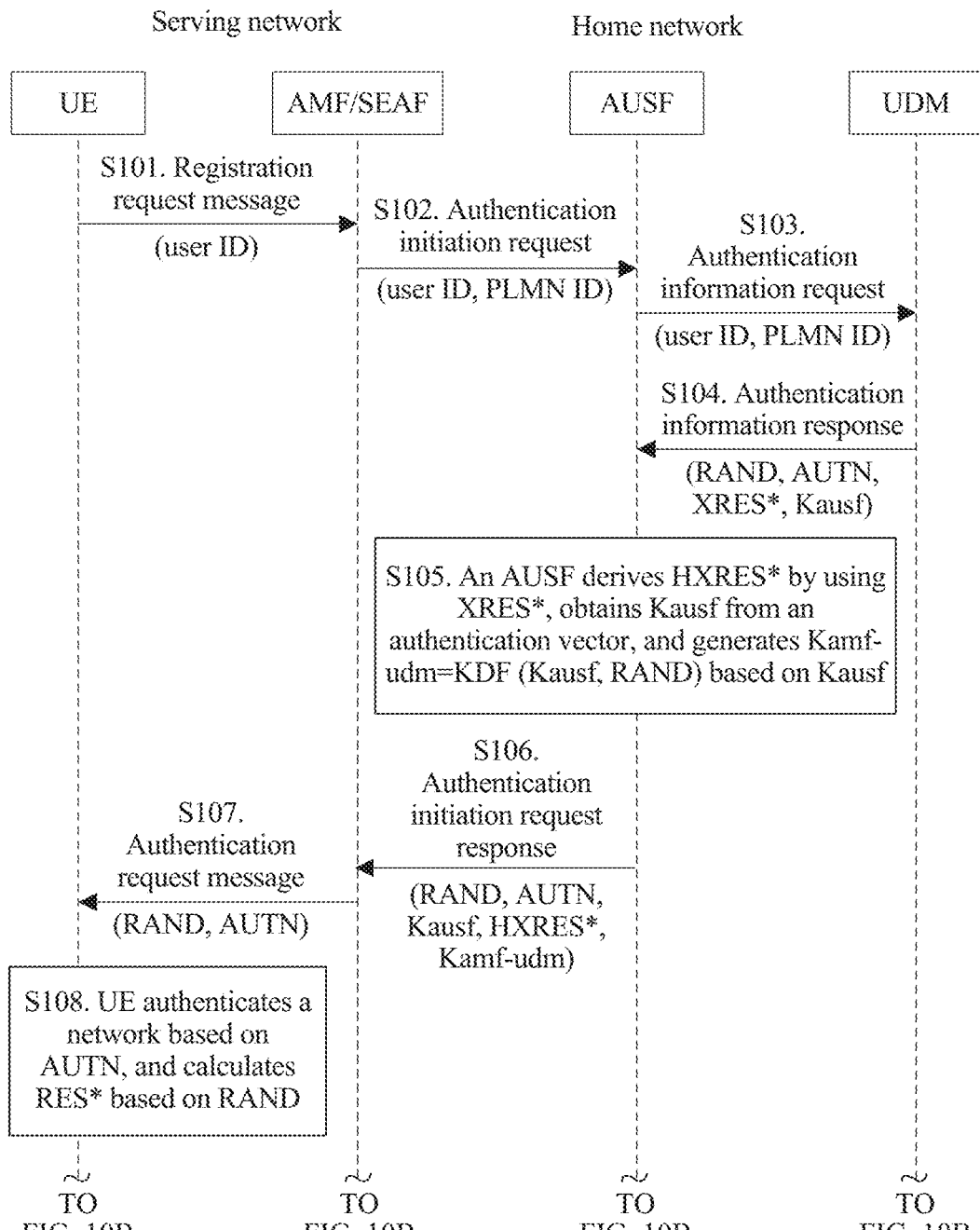
FIG. 10A and FIG. 10B are a schematic interaction flowchart of generating a shared key by an AUSF according to an embodiment of this application.
Figure 10B:
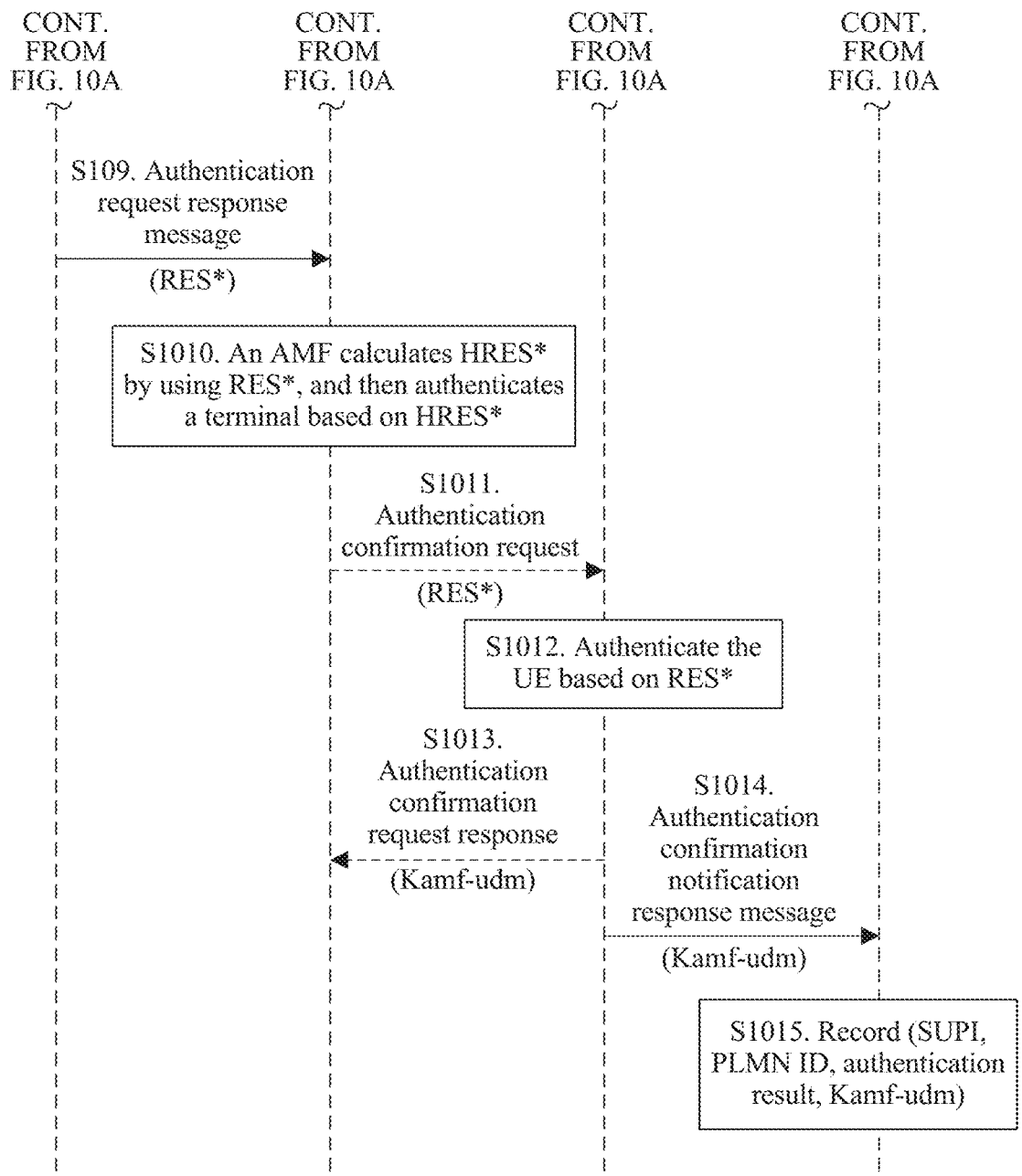

As shown in FIG. 10A and FIG. 10B, a procedure in which the AUSF generates the shared key may include the following steps.

S101. UE sends a registration request message (registration request) to the AMF, where the message includes a user identifier.

S102. After receiving the registration request message from the UE, the AMF sends an authentication initiation request (authentication initiation request) to the AUSF, where the authentication initiation request includes the user identifier and an identifier (for example, a PLMN ID) of a serving network. Optionally, if the AUSF previously generates the shared key Kamf-udm between the AMF and the UDM, the AUSF may determine whether the shared key has expired. If the shared key has expired, the AUSF returns an error code to the AMF, to request the AMF to perform an authentication and key agreement (AKA) procedure again.

S103. After receiving the authentication initiation request, the AUSF sends an authentication information request (authentication information request) to the UDM, where the authentication information request includes the user identifier and the PLMN ID.

S104. The UDM returns an authentication information response to the AUSF, where the response includes an authentication vector, and the authentication vector includes a random number (RAND), AUTN, XRES*, and Kausf.

S105. After receiving the authentication vector, the AUSF performs the following operations:

(a) calculating, based on RAND and XRES* in the authentication vector, HXRES* used by the AMF to authenticate the UE, replacing XRES* in the authentication vector with HXRES*, and calculating Kausf; and (b) generating the shared key Kamf-udm=KDF (Kausf, RAND) between the AMF and the UDM based on Kausf and the random number RAND in the authentication vector according to a KDF algorithm, where RAND may be alternatively a random number generated by the AUSF.

S106. The AUSF returns an authentication initiation request response to the AMF, where the response includes the authentication vector and the shared key Kamf-udm between the AMF and the UDM (the AUSF may alternatively send Kamf-udm to the SEAF/AMF by using an authentication confirmation response message in S1013).

S107. The AMF sends an authentication request message (authentication request) to the UE, where the message carries AUTN and RAND, and stores another information element in the authentication vector, for example, HXRES*.

S108. The UE authenticates a network based on AUTN, and calculates a response value RES* based on RAND.

S109. The UE returns an authentication request response message (authentication response) to the AMF, where the message carries RES*.

S1010. The AMF calculates HRES* by using RES* according to an algorithm defined in the 3GPP 33.501 specification, and compares HRES* with HXRES* delivered by the AUSF, to complete authentication on a terminal in the serving network.

S1011. After the authentication succeeds, if the response that is previously received by the AMF from the AUSF includes an authentication confirmation identifier, the AMF sends an authentication confirmation request (authentication confirmation request) to the AUSF, where the message carries RES*.

S1012. After receiving the authentication confirmation request, the AUSF compares RES* with XRES*, to complete authentication confirmation for the terminal in a home network.

S1013. The AUSF returns an authentication confirmation response to the AMF, where the response carries Kamf-udm.

S1014. After the authentication confirmation succeeds, the AUSF sends an authentication confirmation notification response message to the UDM, where the message carries the shared key Kamf-udm between the AMF and the UDM.

S1015. The UDM records a relationship among an SUPI, the PLMN ID, an authentication result, and Kamf-udm.

It should be noted that, the foregoing is described by using a 5G-AKA procedure as an example. For an improved extensible authentication protocol method for 3rd generation authentication and key agreement (improved extensible authentication protocol method for 3rd generation authentication and key agreement, EAP-AKA'), the message in S106 to S1013 have different names. For details, refer to 6.1.3.1 Authentication procedure for EAP-AKA' in 3GPP TS 33401. Kamf-udm may be delivered by using an EAP-Challenge message or by using an EAP-Success message.

(2) The SEAF Generates the Shared Key Between the AMF and the UDM.

Figure 11A:
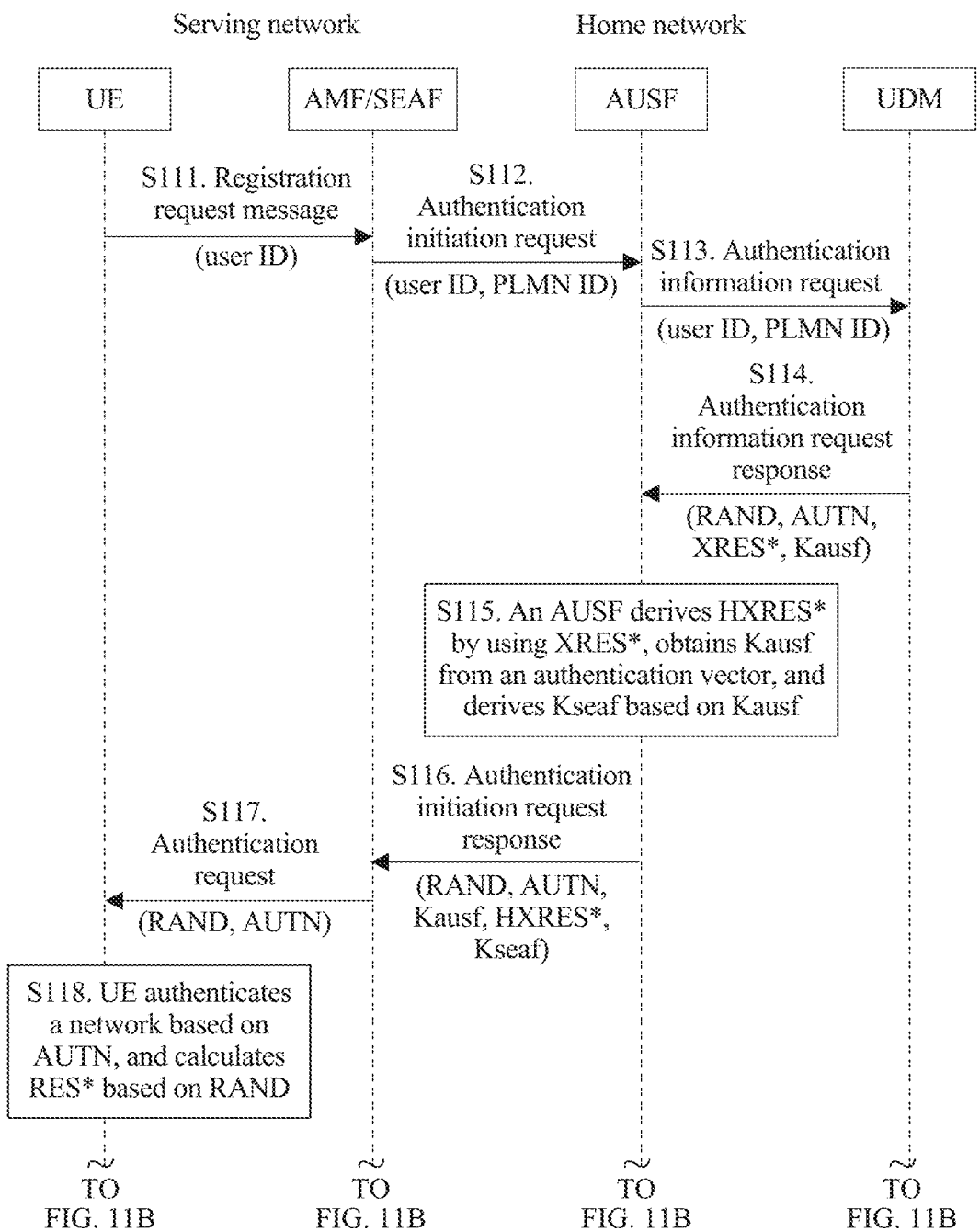
FIG. 11A and FIG. 11B are a schematic interaction flowchart of generating a shared key by an SEAF according to an embodiment of this application.
Figure 11B:
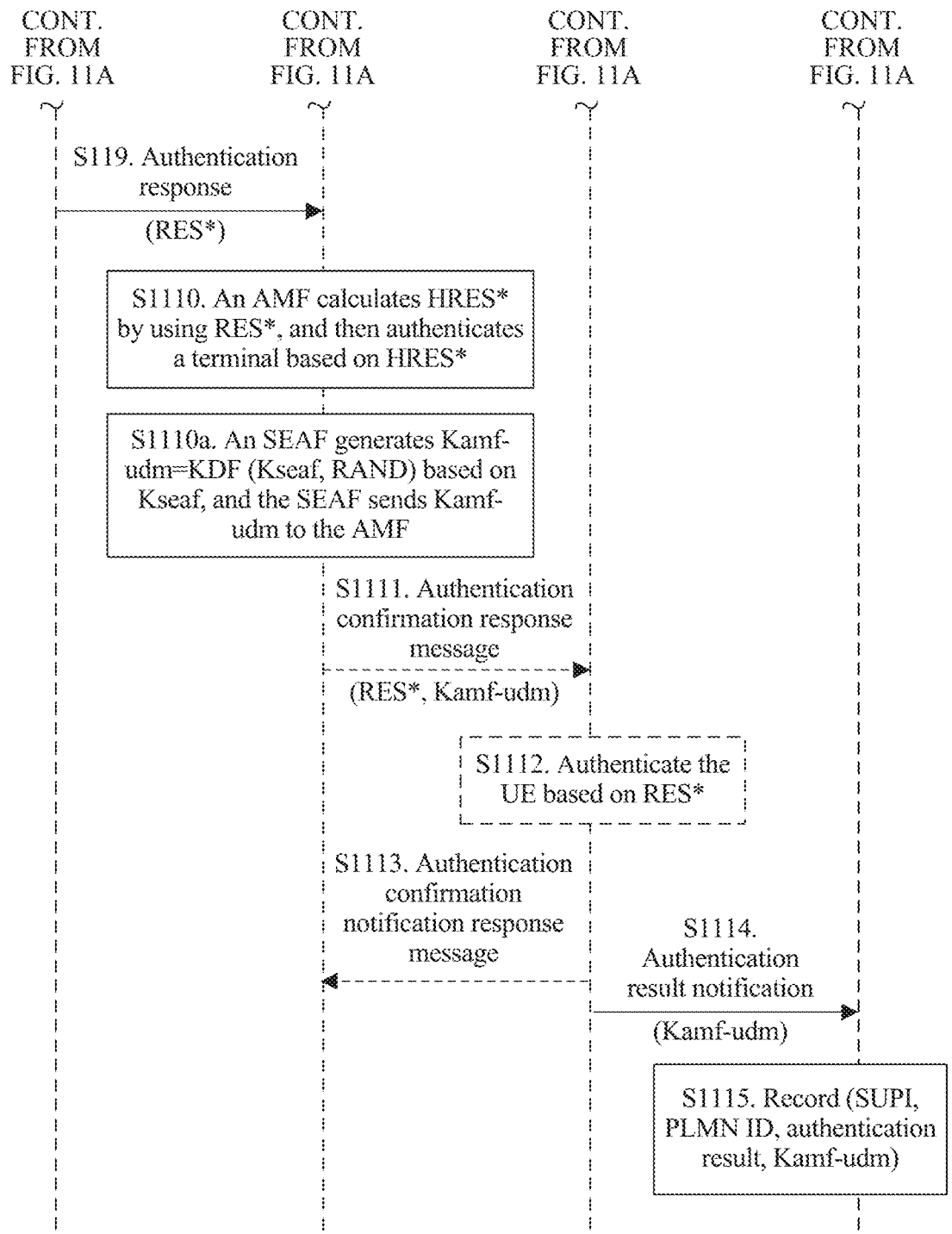

A procedure in which the SEAF generates the shared key is similar to the main procedure in which the AUSF generates the shared key. As shown in FIG. 11A and FIG. 11B, the procedure is as follows.

S111. UE sends a registration request message to the AMF, where the message includes a user identifier.

S112. After receiving the registration request message from the UE, the AMF sends an authentication initiation request to an AUSF, where the authentication initiation request includes the user identifier and an identifier (for example, a PLMN ID) of a serving network.

S113. After receiving the authentication initiation request, the AUSF sends an authentication information request to the UDM, where the authentication information request includes the user identifier and the PLMN ID.

S114. The UDM returns an authentication vector to the AUSF, where the authentication vector includes a random number (RAND), AUTN, XRES*, and Kausf.

S115. After receiving the authentication vector, the AUSF calculates, based on RAND and XRES* in the authentication vector, HXRES* used by the AMF to authenticate the UE, replaces XRES* in the authentication vector with HXRES*, calculates Kausf, and derives Kseaf based on Kausf.

S116. The AUSF returns the authentication vector to the AMF/SEAF, where the authentication vector includes RAND, AUTN, Kausf, HXRES*, and Kseaf.

S117. The AMF sends an authentication request message to the UE, where the message carries AUTN and RAND, and stores another information element in the authentication vector, for example, HXRES.

S118. The UE authenticates a network based on AUTN, and calculates a response value RES* based on RAND.

S119. The UE returns an authentication request response message to the AMF, where the message carries RES*.

S1110. The AMF calculates HRES* by using RES* according to an algorithm defined in the 3GPP 33.501 specification, and compares HRES* with HXRES* delivered by the AUSF, to complete authentication on a terminal in the serving network.

S1110a. The SEAF generates the shared key Kamf-udm=KDF (Kseaf, RAND) between the AMF and the UDM based on Kseaf and the random number RAND in the authentication vector according to a KDF algorithm, where RAND may be alternatively a random number generated by the SEAF. Step S1110a may be completed in any step between step S116 and step S1111.

S1111. After the authentication succeeds, if the response that is previously received by the AMF from the AUSF includes an authentication confirmation identifier, the AMF sends an authentication confirmation request to the AUSF, where the message carries RES* and Kamf-udm. In an alternative manner, the SEAF may not send Kamf-udm to the AUSF. Instead, the AUSF generates Kamf-udm based on Kseaf and RAND.

S1112. After receiving the authentication confirmation request, the AUSF compares RES* with XRES*, to complete authentication confirmation for the terminal in a home network.

S1113. The AUSF returns an authentication confirmation response to the AMF.

S1114. After the authentication confirmation succeeds, the AUSF sends an authentication confirmation notification response message to the UDM, where the message carries the shared key Kamf-udm between the AMF and the UDM.

S1115. The UDM records a relationship among an SUPI, the PLMN ID, an authentication result, and Kamf-udm.

In an alternative implementation, corresponding steps in the foregoing procedure in which the SEAF generates the shared key may be replaced with the following steps:

S116. The AUSF generates RAND1, and sends RAND1 to the SEAF.

S1110a. The SEAF generates Kamf-udm based on Kseaf and RAND1. Alternatively, the SEAF generates RAND2, and the SEAF generates Kamf-udm based on Kseaf and RAND1/RAND2.

S1111. The SEAF sends Kamf-udm to the AUSF.

In addition, in S1111, the SEAF may not send Kamf-udm to the AUSF. Instead, the AUSF generates Kamf-udm based on Kseaf and RAND/RAND2.

Compared with the previous implementation, in this alternative implementation, there are mainly three different methods for generating Kamf-udm:

Kamf-udm=KDF (Kseaf, RAND1, RAND2);

Kamf-udm=KDF (Kseaf, RAND1); and

Kamf-udm=KDF (Kseaf, RAND2).

It should be noted that, the foregoing is described by using a 5G-AKA procedure as an example. For an improved extensible authentication protocol method for 3rd generation authentication and key agreement (improved extensible authentication protocol method for 3rd generation authentication and key agreement, EAP-AKA'), the message in S116 to S1113 have different names. For details, refer to 6.1.3.1 Authentication procedure for EAP-AKA' in 3GPP TS 33401. In step S1111, Kamf-udm may be transferred to the AUSF by using an EAP-Response/AKA'-Challenge message.

(3) The AMF Generates the Shared Key Between the AMF and the UDM.

Figures 1A, 12:
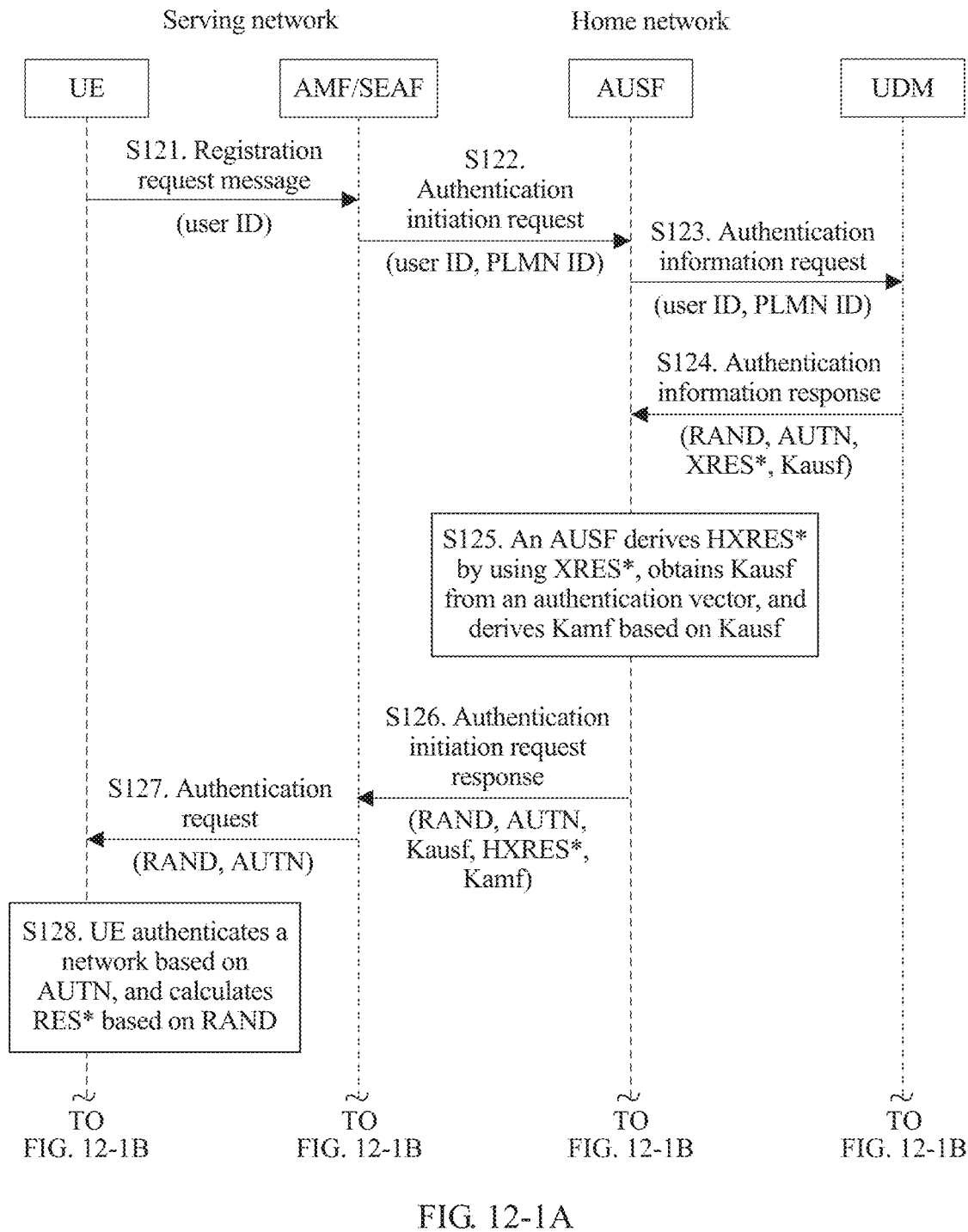
Figures 1B, 12:
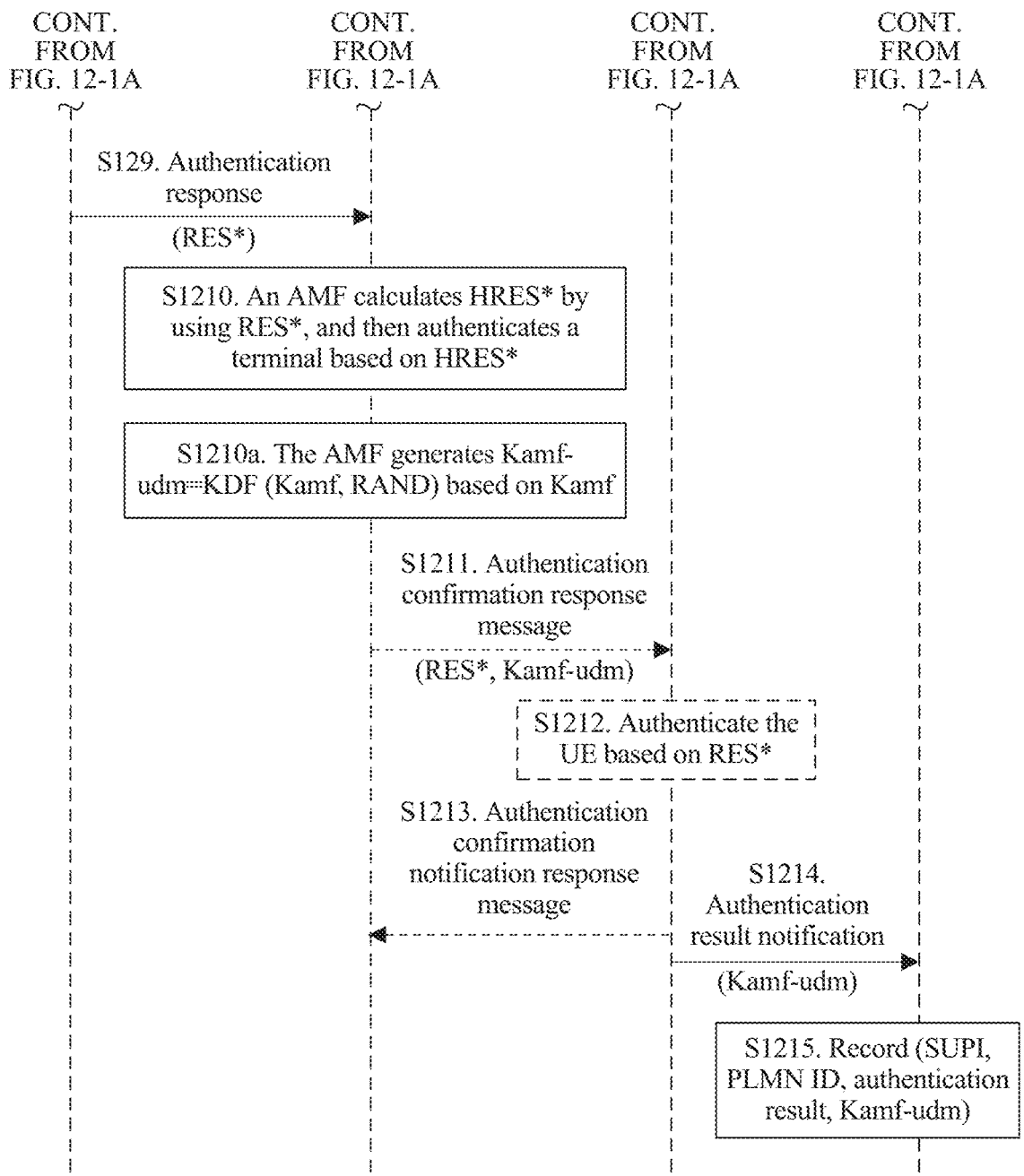

A procedure in which the AMF generates the shared key is similar to the main procedure in which the AUSF generates the shared key. As shown in FIG. 12-1A and FIG. 12-1B, the procedure is as follows.

S121. UE sends a registration request message to the AMF, where the message includes a user identifier.

S122. After receiving the registration request message from the UE, the AMF sends an authentication initiation request to an AUSF, where the authentication initiation request includes the user identifier and an identifier (for example, a PLMN ID) of a serving network.

S123. After receiving the authentication initiation request, the AUSF sends an authentication information request to the UDM, where the authentication information request includes the user identifier and the PLMN ID.

S124. The UDM returns an authentication vector to the AUSF, where the authentication vector includes a random number (RAND), AUTN, XRES*, and Kausf.

S125. After receiving the authentication vector, the AUSF calculates, based on RAND and XRES* in the authentication vector, HXRES* used by the AMF to authenticate the UE, replaces XRES* in the authentication vector with HXRES*, calculates Kausf, and derives Kamf based on Kausf.

S126. The AUSF returns the authentication vector to the AMF/SEAF, where the authentication vector includes RAND, AUTN, Kausf, HXRES*, and Kamf.

S127. The AMF sends an authentication request message to the UE, where the message carries AUTN and RAND, and stores another information element in the authentication vector, for example, HXRES.

S128. The UE authenticates a network based on AUTN, and calculates a response value RES* based on RAND.

S129. The UE returns an authentication request response message to the AMF, where the message carries RES*.

S1210. The AMF calculates HRES* by using RES* according to an algorithm defined in the 3GPP 33.501 specification, and compares HRES* with HXRES* delivered by the AUSF, to complete authentication on a terminal in the serving network.

S1210a. The AMF generates the shared key Kamf-udm=KDF (Kamf, RAND) between the AMF and the UDM based on Kamf and the random number RAND in the authentication vector according to a KDF algorithm, where RAND may be alternatively a random number generated by the AMF. Step S1210a may be completed in any step between step S126 and step S1211.

S1211. After the authentication succeeds, if the response that is previously received by the AMF from the AUSF includes an authentication confirmation identifier, the AMF sends an authentication confirmation request to the AUSF, where the message carries RES* and Kamf-udm. In an alternative manner, the AMF may not send Kamf-udm to the AUSF. Instead, the AUSF generates Kamf-udm based on Kseaf and RAND.

S1212. After receiving the authentication confirmation request, the AUSF compares RES* with XRES*, to complete authentication confirmation for the terminal in a home network.

S1213. The AUSF returns an authentication confirmation response to the AMF.

S1214. After the authentication confirmation succeeds, the AUSF sends an authentication confirmation notification response message to the UDM, where the message carries the shared key Kamf-udm between the AMF and the UDM.

S1215. The UDM records a relationship among an SUPI, the PLMN ID, an authentication result, and Kamf-udm.

In an alternative implementation, corresponding steps in the foregoing procedure in which the AMF generates the shared key may be replaced with the following steps:

S1210a. The SEAF and the AMF respectively generate RAND1 and RAND2. Then, the AMF generates Kamf-udm based on Kamf and RAND1/RAND2, and sends Kamf-udm to the SEAF, so that Kamf-udm is sent to the AUSF.

In addition, the AMF may not send Kamf-udm to the SEAF. Instead, the SEAF generates Kamf-udm based on Kamf and RAND1/RAND2, and then sends Kamf-udm to the AUSF.

Compared with the previous implementation, in this alternative implementation, there are mainly three different methods for generating Kamf-udm:

Kamf-udm=KDF (Kamf, RAND1, RAND2);
Kamf-udm=KDF (Kamf, RAND1); and
Kamf-udm=KDF (Kamf, RAND2).

In conclusion, in this embodiment of this application, the AUSF/SEAF/AMF generates the shared key Kamf-udm between the AMF and the UDM by using Kausf/Kseaf/Kamf in an existing key architecture and a random number RAND, thereby resolving a problem that there is no shared key between the AMF and the UDM in a current key architecture.

It should be noted that, the foregoing is described by using a 5G-AKA procedure as an example. For an improved extensible authentication protocol method for 3rd generation authentication and key agreement (improved extensible authentication protocol method for 3rd generation authentication and key agreement, EAP-AKA'), the message in S126 to S1213 have different names. For details, refer to 6.1.3.1 Authentication procedure for EAP-AKA' in 3GPP TS 33401. In step S1211, Kamf-udm may be transferred to the AUSF by using an EAP-Response/AKA'-Challenge message.

(4) The UDM Generates the Shared Key Between the AMF and the UDM.

Figures 2A, 12:
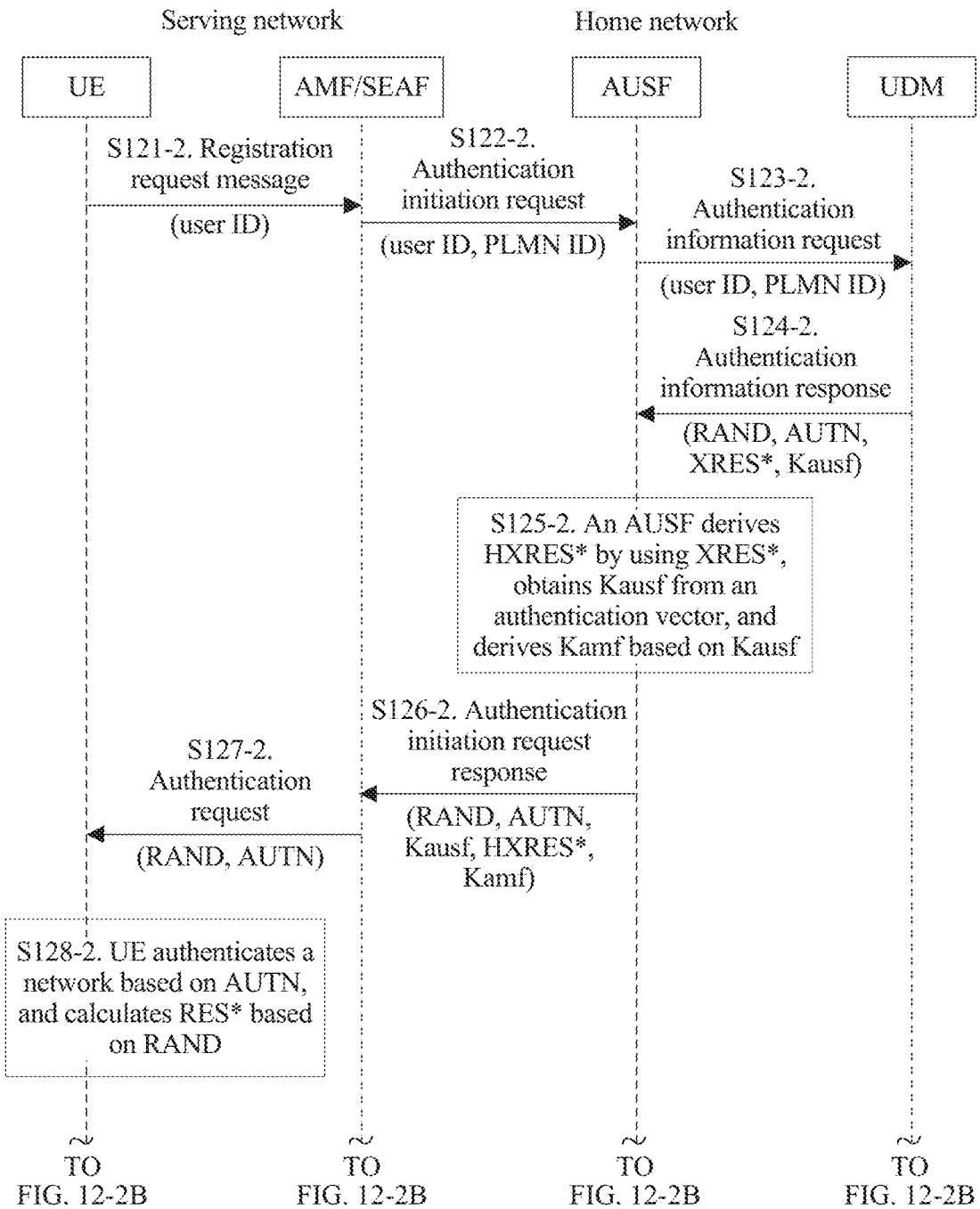
Figures 2B, 12:
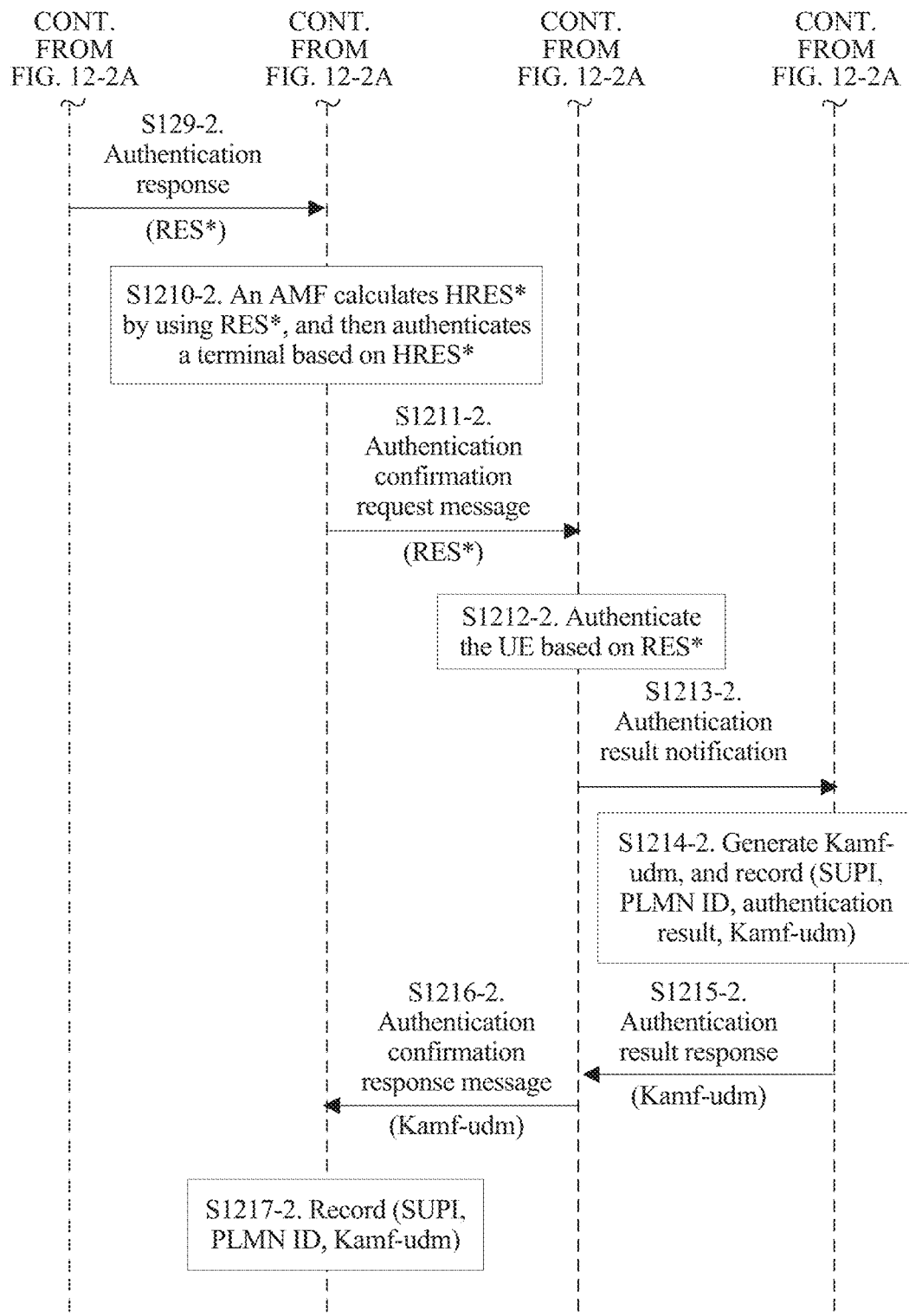
Figures 3A, 12:
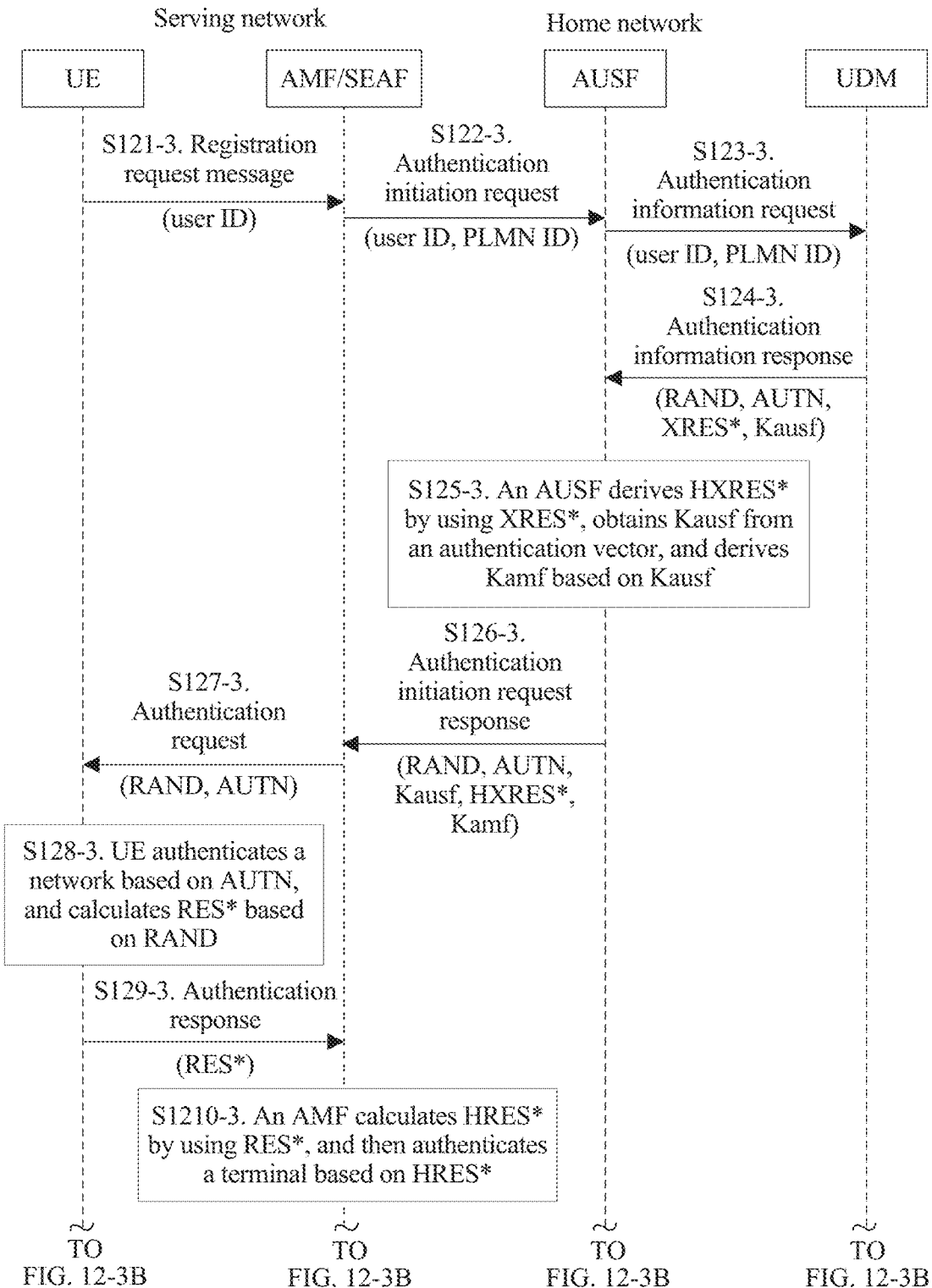
Figures 3B, 12:
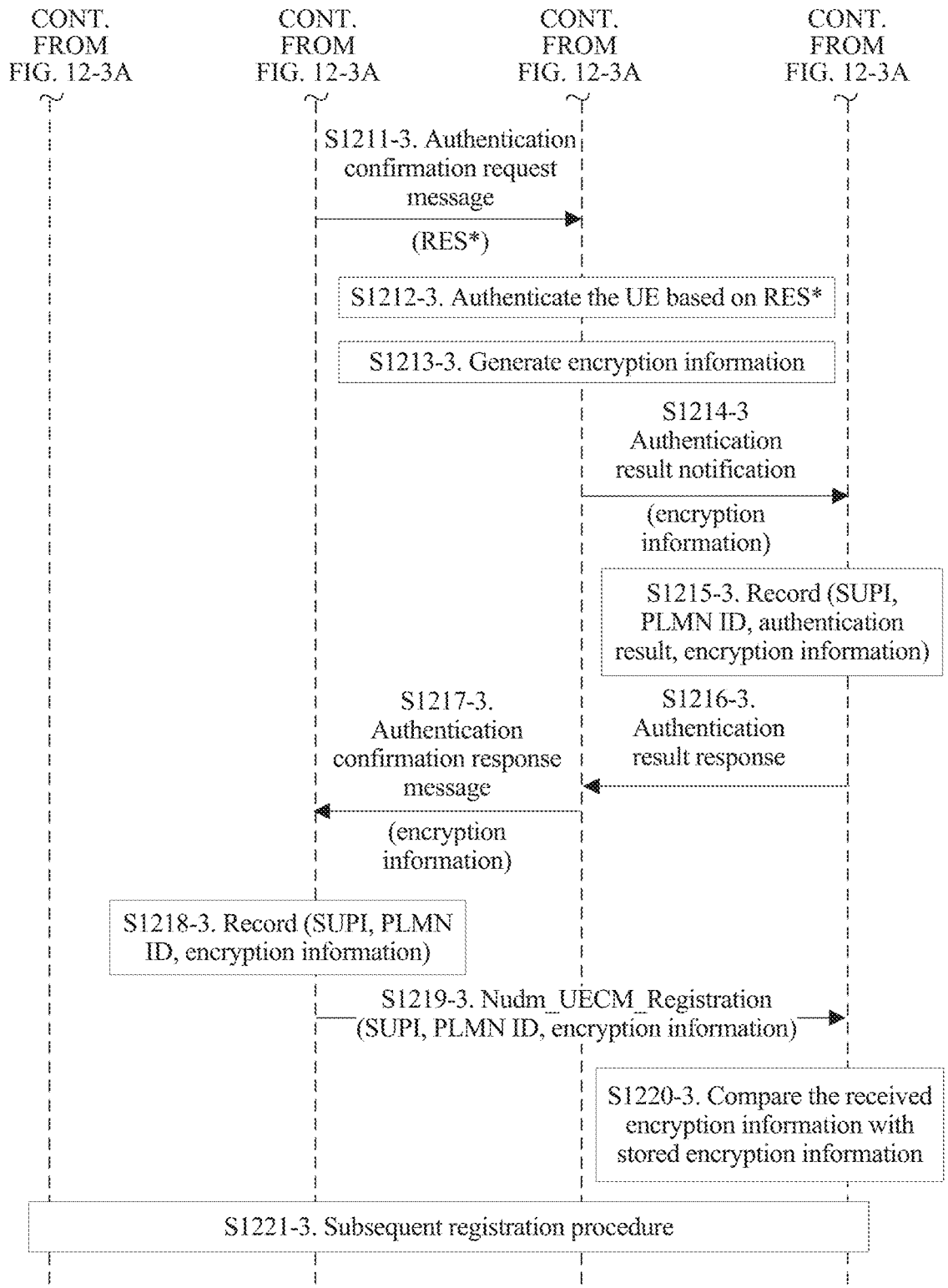

A procedure in which the UDM generates the shared key is similar to the main procedure in which the AUSF generates the shared key. As shown in FIG. 12-2A and FIG. 12-2B, the procedure is as follows.

S121-2. UE sends a registration request message to the AMF, where the message includes a user identifier.

S122-2. After receiving the registration request message from the UE, the AMF sends an authentication initiation request to an AUSF, where the authentication initiation request includes the user identifier and an identifier (for example, a PLMN ID) of a serving network.

S123-2. After receiving the authentication initiation request, the AUSF sends an authentication information request to the UDM, where the authentication information request includes the user identifier and the PLMN ID.

S124-2. The UDM returns an authentication vector to the AUSF, where the authentication vector includes a random number (RAND), AUTN, XRES*, and Kausf.

S125-2. After receiving the authentication vector, the AUSF calculates, based on RAND and XRES* in the authentication vector, HXRES* used by the AMF to authenticate the UE, replaces XRES* in the authentication vector with HXRES*, calculates Kausf, and derives Kamf based on Kausf.

S126-2. The AUSF returns the authentication vector to the AMF/SEAF, where the authentication vector includes RAND, AUTN, Kausf, HXRES*, and Kamf.

S127-2. The AMF sends an authentication request message to the UE, where the message carries AUTN and RAND, and stores another information element in the authentication vector, for example, HXRES.

S128-2. The UE authenticates a network based on AUTN, and calculates a response value RES* based on RAND.

S129-2. The UE returns an authentication request response message to the AMF, where the message carries RES*.

S1210-2. The AMF calculates HRES* by using RES* according to an algorithm defined in the 3GPP 33.501 specification, and compares HRES* with HXRES* delivered by the AUSF, to complete authentication on a terminal in the serving network.

S1211-2. After the authentication succeeds, if the response that is previously received by the AMF from the AUSF includes an authentication confirmation identifier, the AMF sends an authentication confirmation request to the AUSF, where the message carries RES*.

S1212-2. After receiving the authentication confirmation request, the AUSF compares RES* with XRES*, to complete authentication confirmation for the terminal in a home network.

S1213-2. After the authentication confirmation succeeds, the AUSF sends an authentication result notification message to the UDM.

S1214-2. The UDM generates Kamf-udm, and records a relationship among an SUPI, the PLMN ID, an authentication result, and Kamf-udm.

For example, the UDM may generate Kamf-udm based on at least one of RAND and Kausf in the authentication vector. Alternatively, the UDM may generate Kamf-udm based on at least one of another random number generated by the UDM and a configuration parameter on the UDM.

S1215-2. The UDM sends an authentication result response to the AUSF, where the authentication result response carries Kamf-udm.

S1216-2. The AUSF returns an authentication confirmation response to the AMF, where the authentication confirmation response carries Kamf-udm.

S1217-2. The AMF records a relationship among the SUPI, the PLMN ID, and Kamf-udm.

It should be noted that, the UDM may alternatively generate Kamf-udm in step S124-2 and send Kamf-udm to the AUSF. Correspondingly, the AUSF may send Kamf-udm to the AMF/SEAF in step S126-2.

It should be noted that, the foregoing is described by using a 5G-AKA procedure as an example. For an improved extensible authentication protocol method for 3rd generation authentication and key agreement (improved extensible authentication protocol method for 3rd generation authentication and key agreement, EAP-AKA'), the message in S126-2 to S1216-2 have different names. For details, refer to 6.1.3.1 Authentication procedure for EAP-AKA' in 3GPP TS 33401. Kamf-udm may be transferred to the AMF by using an EAP-success message in step S1216-2, or may be transferred to the AMF by using an EAP-Request/AKA'-Challenge message in step S126-2.

In conclusion, in this embodiment of this application, the UDM generates the shared key Kamf-udm between the AMF and the UDM, thereby resolving a problem that there is no shared key between the AMF and the UDM in a current key architecture.

The foregoing describes a solution for performing verification by using a shared key. In this application, the following further provides a solution for performing verification by using encryption information and a solution for generating encryption information.

This application provides a method for performing verification by using encryption information, and a first network element, a second network element, and a system that are based on the method. The method includes the following: The second network element obtains encryption information by encrypting, signing, performing MAC processing on, or performing hash processing on first network identifier information, or the second network element generates random information as encryption information; and the second network element sends a registration request message to the first network element, where the registration request message includes a user identifier, the first network identifier information, and the encryption information, the encryption information is information obtained by encrypting, signing, performing MAC processing on, or performing hash processing on the first network identifier information, or the encryption information is random information, the first network element is a data management network element or a first security edge protection proxy, and the second network element is a mobility management network element or a second security edge protection proxy. Correspondingly, the first network element receives the registration request message from the second network element; the first network element verifies the registration request message by using the encryption information; and the first network element sends a registration response message to the second network element. Correspondingly, the second network element receives the registration response message from the first network element.

This application provides another method for performing verification by using encryption information, and a first network element, a second network element, and a system that are based on the method. The method includes the following: The first network element obtains encryption information by encrypting, signing, performing MAC processing on, or performing hash processing on first network identifier information, or the first network element generates random information as encryption information; and the first network element sends a deregistration message to the second network element, where the deregistration message includes the first network identifier information and the encryption information, the first network element is a data management network element or a first security edge protection proxy, and the second network element is a mobility management network element or a second security edge protection proxy. Correspondingly, the second network element receives the deregistration message from the first network element; the second network element verifies the deregistration message by using the encryption information; and the second network element sends a deregistration response message to the first network element. Correspondingly, the first network element receives the deregistration response message from the second network element.

In this application, the encryption information may be information obtained by encrypting information that includes a serving PLMN ID, or may be information obtained by signing a serving PLMN ID by using a private key, or may be a MAC value or a hash value of information that includes a serving PLMN ID, or may be random information (such as a binary number or a string). It should be noted that, a name of the encryption information is not limited in this application, and the encryption information may also be referred to as token information or have another name.

For generation of the encryption information, an AUSF or a UDM may generate the encryption information. The following provides detailed descriptions with reference to a specific procedure.

(1) The AUSF Generates the Encryption Information.

As shown in FIG. 12-3A and FIG. 12-3B, a solution for performing verification by using encryption information and a solution for generating encryption information by the AUSF may include the following steps. The method in FIG. 12-3A and FIG. 12-3B may include S121-3 to S1218-3, or may include S1219-3 to S1221-3, or may include S121-3 to S1221-3.

S121-3. UE sends a registration request message to an AMF, where the message includes a user identifier.

S122-3. After receiving the registration request message from the UE, the AMF sends an authentication initiation request to the AUSF, where the authentication initiation request includes the user identifier and an identifier (for example, a serving PLMN ID) of a serving network.

S123-3. After receiving the authentication initiation request, the AUSF sends an authentication information request to a UDM, where the authentication information request includes the user identifier and the PLMN ID.

S124-3. The UDM returns an authentication vector to the AUSF, where the authentication vector includes a random number (RAND), AUTN, XRES*, and Kausf.

S125-3. After receiving the authentication vector, the AUSF calculates, based on RAND and XRES* in the authentication vector, HXRES* used by the AMF to authenticate the UE, replaces XRES* in the authentication vector with HXRES*, calculates Kausf, and derives Kamf based on Kausf.

S126-3. The AUSF returns the authentication vector to the AMF/SEAF, where the authentication vector includes RAND, AUTN, Kausf, HXRES*, and Kamf.

S127-3. The AMF sends an authentication request message to the UE, where the message carries AUTN and RAND, and stores another information element in the authentication vector, for example, HXRES.

S128-3. The UE authenticates a network based on AUTN, and calculates a response value RES* based on RAND.

S129-3. The UE returns an authentication request response message to the AMF, where the message carries RES*.

S1210-3. The AMF calculates HRES* by using RES* according to an algorithm defined in the 3GPP 33.501 specification, and compares HRES* with HXRES* delivered by the AUSF, to complete authentication on a terminal in the serving network.

S1211-3. After the authentication succeeds, if the response that is previously received by the AMF from the AUSF includes an authentication confirmation identifier, the AMF sends an authentication confirmation request to the AUSF, where the message carries RES*.

S1212-3. After receiving the authentication confirmation request, the AUSF compares RES* with XRES*, to complete authentication confirmation for the terminal in a home network.

S1213-3. After the authentication succeeds, the AUSF generates encryption information.

For example, the AUSF may obtain the encryption information by encrypting information that includes the serving PLMN ID, or the AUSF may obtain the encryption information by signing the serving PLMN ID by using a private key of the AUSF, or the AUSF may obtain the encryption information by performing MAC processing or hash processing on information that includes the serving PLMN ID, or the encryption information may be random information (such as a binary number or a string), and the AUSF may randomly generate the encryption information.

S1214-3. The AUSF sends an authentication result notification message to the UDM, where the message carries the encryption information.

S1215-3. The UDM records a relationship among an SUPI, the PLMN ID, an authentication result, and the encryption information.

S1216-3. The UDM sends an authentication result response to the AUSF.

S1217-3. The AUSF returns an authentication confirmation response to the AMF, where the authentication confirmation response carries the encryption information.

S1218-3. The AMF records a relationship among the SUPI, the PLMN ID, and the encryption information.

S1219-3. The AMF sends a Nudm_UECM_Registration message to the UDM, where the message carries the SUPI, the PLMN ID, and the encryption information.

The Nudm_UECM_Registration is a type of registration message, and may be another registration message in practice.

S1220-3. The UDM searches for corresponding encryption information based on the SUPI and the PLMN ID that are carried in the foregoing message, and compares the received encryption information with found stored encryption information.

If the received encryption information is consistent with the found stored encryption information, the verification performed by the UDM on the AMF succeeds.

S1221-3. After the verification on the AMF succeeds, proceed to a subsequent registration procedure.

It should be noted that, the action of generating the encryption information by the AUSF may be completed in any step between step S124-3 and step S1214-3. For example, if the AUSF generates the encryption information in step S125-3, the AUSF may send the encryption information to the AMF in step S126-3 or S1217-3.

It should be noted that, the foregoing is described by using a 5G-AKA procedure as an example. For an improved extensible authentication protocol method for 3rd generation authentication and key agreement (EAP-AKA'), the message in S126-3 to S1217-3 have different names. For details, refer to 6.1.3.1 Authentication procedure for EAP-AKA' in 3GPP TS 33401. The encryption information may be delivered in step S126-3 by using an EAP-Request/AKA'-Challenge message, or may be delivered in step S1217-3 by using an EAP-Success message.

In conclusion, in this embodiment, verification can be performed between the AMF and the UDM by using the encryption information.

(2) The UDM Generates the Encryption Information.

Figures 4A, 12:
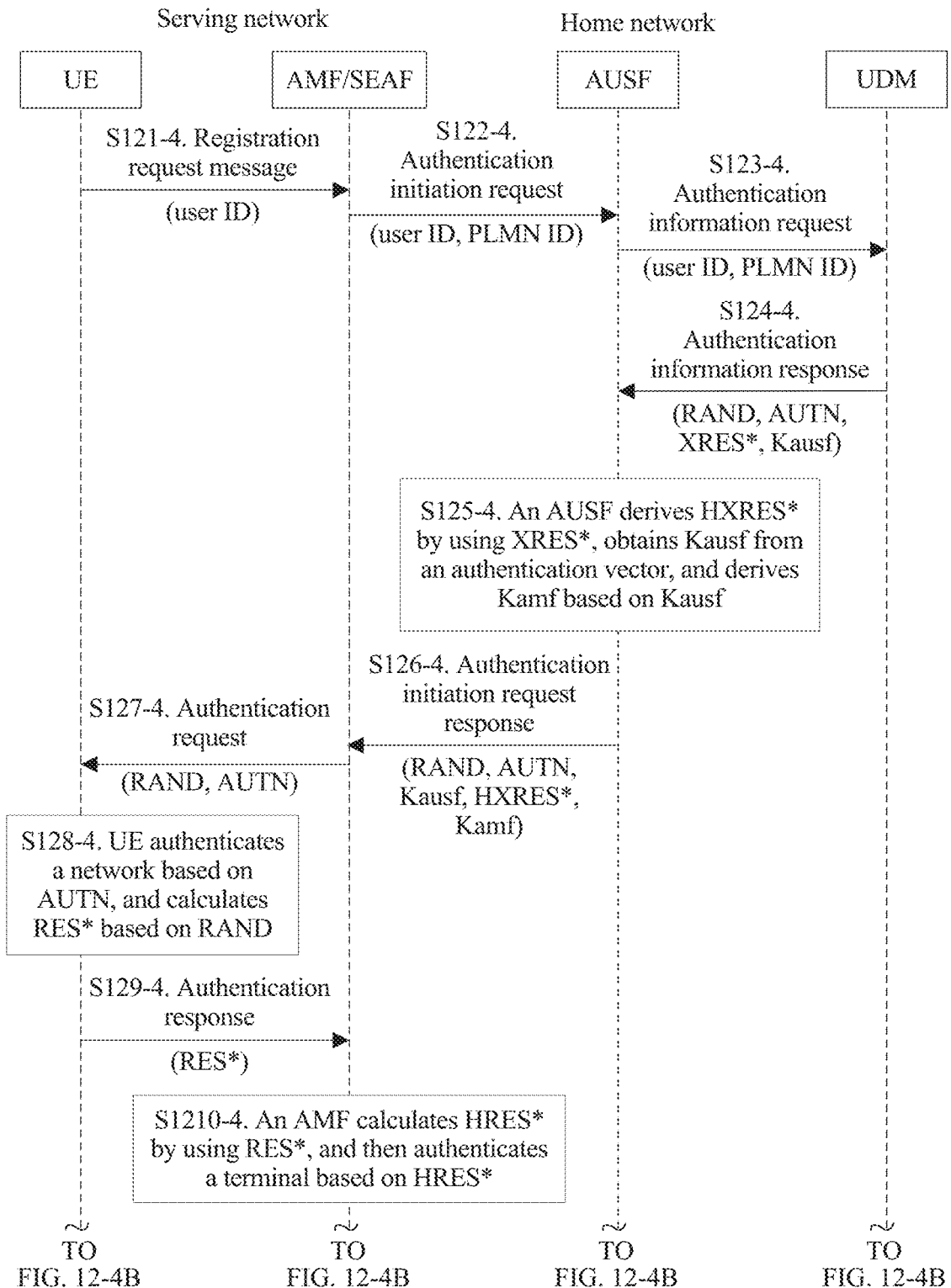
Figures 4B, 12:
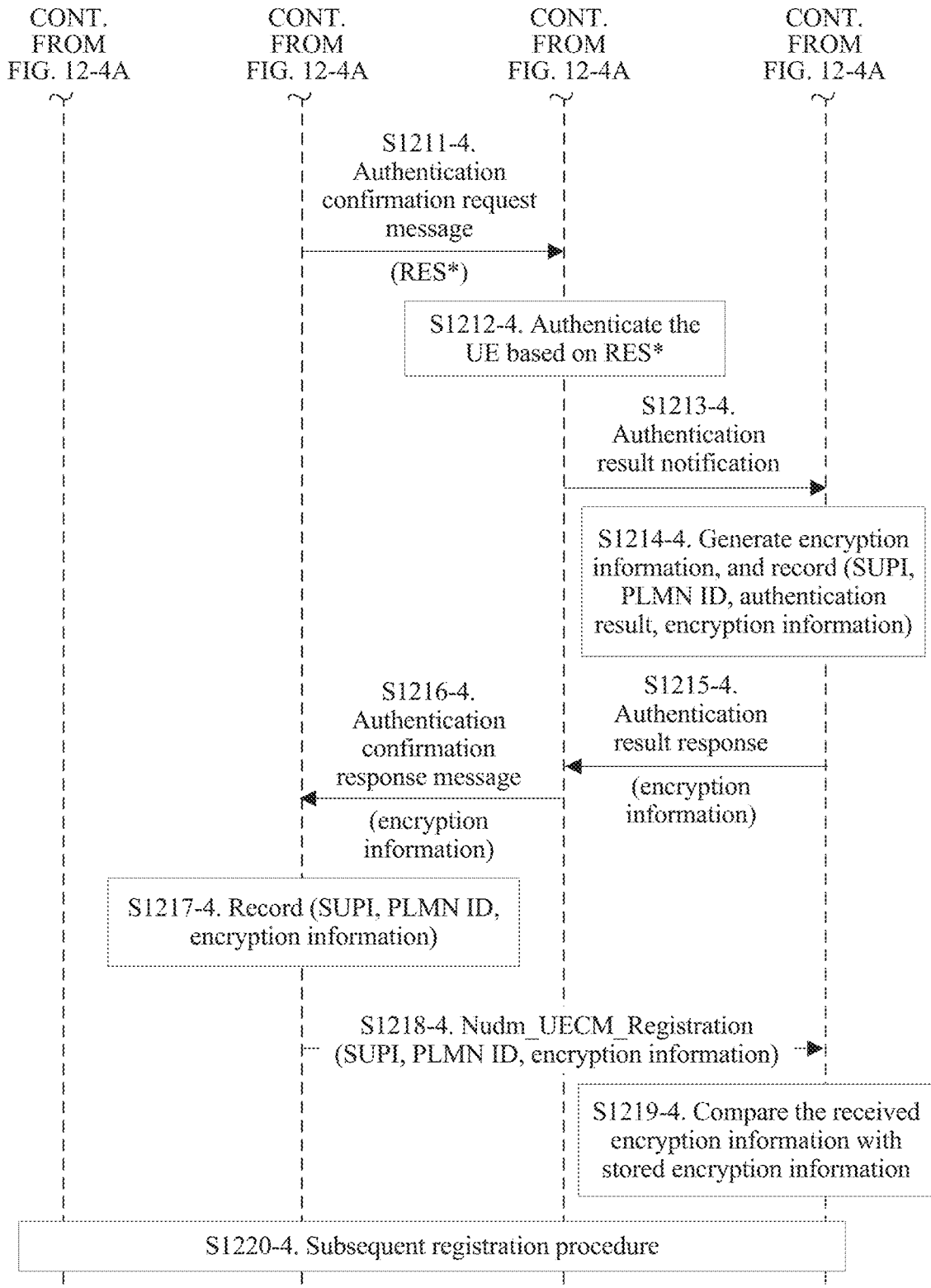

As shown in FIG. 12-4A and FIG. 12-4B, a solution for performing verification by using encryption information and a solution for generating encryption information by the UDM may include the following steps. The method in FIG. 12-4A and FIG. 12-4B may include S121-4 to S1217-4, or may include S1218-4 to S1220-4, or may include S121-4 to S1220-4.

S121-4. UE sends a registration request message to an AMF, where the message includes a user identifier.

S122-4. After receiving the registration request message from the UE, the AMF sends an authentication initiation request to an AUSF, where the authentication initiation request includes the user identifier and an identifier (for example, a PLMN ID) of a serving network.

S123-4. After receiving the authentication initiation request, the AUSF sends an authentication information request to the UDM, where the authentication information request includes the user identifier and the PLMN ID.

S124-4. The UDM returns an authentication vector to the AUSF, where the authentication vector includes a random number (RAND), AUTN, XRES*, and Kausf.

S125-4. After receiving the authentication vector, the AUSF calculates, based on RAND and XRES* in the authentication vector, HXRES* used by the AMF to authenticate the UE, replaces XRES* in the authentication vector with HXRES*, calculates Kausf, and derives Kamf based on Kausf.

S126-4. The AUSF returns the authentication vector to the AMF/SEAF, where the authentication vector includes RAND, AUTN, Kausf, HXRES*, and Kamf.

S127-4. The AMF sends an authentication request message to the UE, where the message carries AUTN and RAND, and stores another information element in the authentication vector, for example, HXRES.

S128-4. The UE authenticates a network based on AUTN, and calculates a response value RES* based on RAND.

S129-4. The UE returns an authentication request response message to the AMF, where the message carries RES*.

S1210-4. The AMF calculates HRES* by using RES* according to an algorithm defined in the 3GPP 33.501 specification, and compares HRES* with HXRES* delivered by the AUSF, to complete authentication on a terminal in the serving network.

S1211-4. After the authentication succeeds, if the response that is previously received by the AMF from the AUSF includes an authentication confirmation identifier, the AMF sends an authentication confirmation request to the AUSF, where the message carries RES*.

S1212-4. After receiving the authentication confirmation request, the AUSF compares RES* with XRES*, to complete authentication confirmation for the terminal in a home network.

S1213-4. After the authentication succeeds, the AUSF sends an authentication result notification message to the UDM.

S1214-4. The UDM generates encryption information, and records a relationship among an SUPI, the PLMN ID, an authentication result, and the encryption information.

For example, the UDM may obtain the encryption information by encrypting information that includes the serving PLMN ID, or the UDM may obtain the encryption information by signing the serving PLMN ID by using a private key of the UDM, or the UDM may obtain the encryption information by performing MAC processing or hash processing on information that includes the serving PLMN ID, or the encryption information may be random information (such as a binary number or a string), and the UDM may randomly generate the encryption information.

S1215-4. The UDM sends an authentication result response to the AUSF, where the response carries the encryption information.

S1216-4. The AUSF returns an authentication confirmation response to the AMF, where the authentication confirmation response carries the encryption information.

S1217-4. The AMF records a relationship among the SUPI, the PLMN ID, and the encryption information.

S1218-4. The AMF sends a Nudm_UECM_Registration message to the UDM, where the message carries the SUPI, the PLMN ID, and the encryption information.

S1219-4. The UDM searches for corresponding encryption information based on the SUPI and the PLMN ID that are carried in the foregoing message, and compares the received encryption information with found stored encryption information.

If the received encryption information is consistent with the found stored encryption information, the verification performed by the UDM on the AMF succeeds.

S1220-4. After the verification on the AMF succeeds, proceed to a subsequent registration procedure.

It should be noted that, the action of generating the encryption information by the UDM may be completed in any step between step S123-4 and step S1215-4. For example, if the UDM generates the encryption information in step S123-4, the UDM may send the encryption information to the AUSF in step S124-4, and the AUSF sends the encryption information to the AMF in S126-4 or S1216-4.

It should be noted that, the foregoing is described by using a 5G-AKA procedure as an example. For an improved extensible authentication protocol method for 3rd generation authentication and key agreement (EAP-AKA'), the message in S126-4 to S1216-4 have different names. For details, refer to 6.1.3.1 Authentication procedure for EAP-AKA' in 3GPP TS 33401. The encryption information may be delivered in step S126-4 by using an EAP-Request/AKA'-Challenge message, or may be delivered in step S1216-4 by using an EAP-Success message.

In conclusion, in this embodiment, verification can be performed between the AMF and the UDM by using the encryption information.

The foregoing describes the solution for performing verification by using a shared key and the solution for performing verification by using encryption information. The following describes a solution for performing verification by using a preset public key and a preset private key.

FIG. 3a-1 and FIG. 3a-2 are a schematic diagram of a spoofing attack from an AMF in a serving network. A malicious AMF in a serving network B may send a registration message to a UDM in a home network at any time (scenario 1). The message carries an SUPI and a PLMN ID A of a serving network A. The UDM finds, by using a table, that authentication on the SUPI succeeds in the serving network A corresponding to the PLMN ID A. Therefore, the UDM instructs an old AMF to deregister a user corresponding to the SUPI. The old AMF deletes an MM context of the user corresponding to the SUPI, and instructs a related SMF to release a PDU session. Consequently, the user is forced to be deregistered. This is equivalent to a denial of service DOS attack. Further, an attacker may send a large quantity of spoofed registration messages, to enable a large quantity of users to be deregistered.

Figure 13:
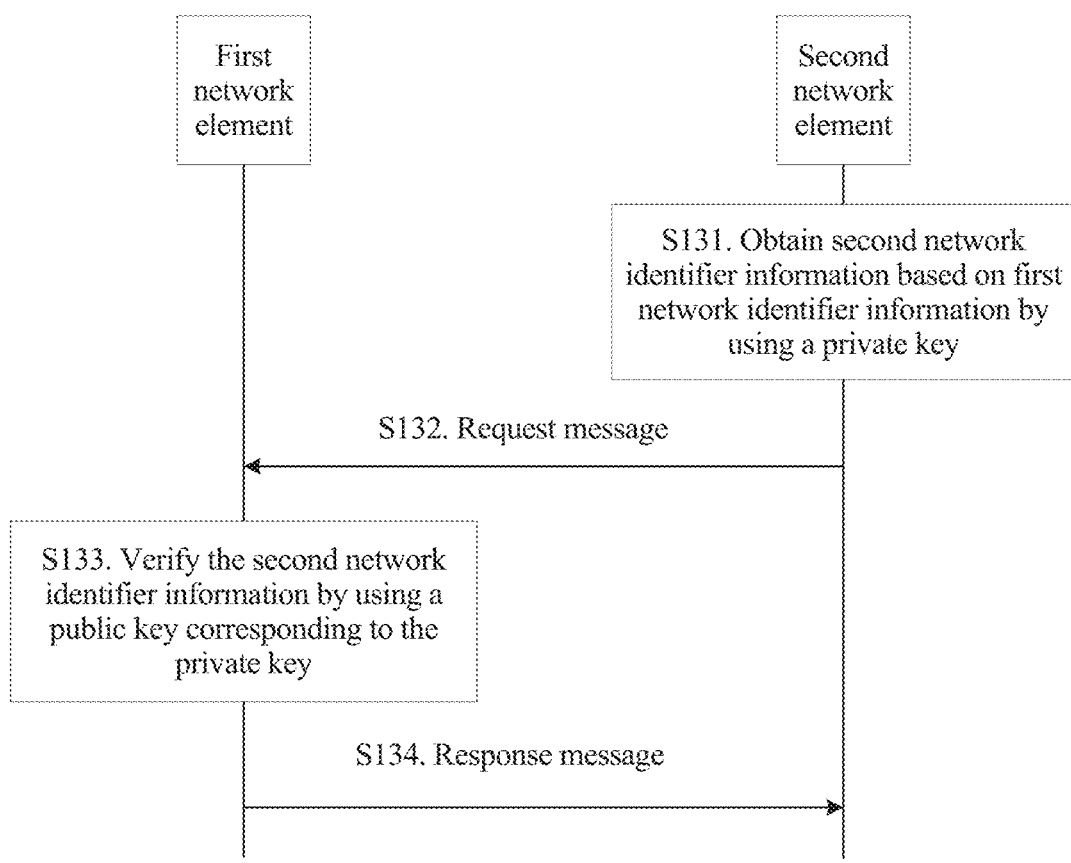
FIG. 13 is a schematic interaction flowchart of a method for performing verification by using a public key and a private key according to an embodiment of this application.

FIG. 13 is a schematic interaction flowchart of a method for performing verification by using a public key and a private key according to an embodiment of this application. The method is applied to the scenario 1, and may include the following steps.

S131. A second network element obtains second network identifier information based on first network identifier information by using a private key, where the second network element is a mobility management network element or a second security edge protection proxy.

S132. The second network element sends a request message to a first network element, and the first network element receives the request message from the second network element, where the request message includes the first network identifier information and the second network identifier information, the second network identifier information is obtained based on the first network identifier information by using the private key, the first network element is a data management network element or a first security edge protection proxy, and the second network element is a mobility management network element or a second security edge protection proxy.

S133. The first network element verifies the second network identifier information by using a public key corresponding to the private key.

S134. The first network element sends a response message to the second network element, and the second network element receives the response message from the first network element.

In this embodiment, the first network element is a UDM or a first security edge protection proxy, and the second network element is an AMF or a second security edge protection proxy. To be specific, the first network element may be a UDM, and the second network element may be an AMF; or the first network element may be a UDM, and the second network element may be a second security edge protection proxy; or the first network element may be a first security edge protection proxy, and the second network element may be an AMF; or the first network element may be a first security edge protection proxy, and the second network element may be a second security edge protection proxy. The security edge protection proxy is described in detail below. In descriptions of this embodiment, an example in which the first network element is a UDM and the second network element is an AMF is used for description.

In this embodiment, a private key is preset on the AMF, and a public key and a relationship between the public key and a PLMN ID are preset on the UDM.

Before the AMF sends the request message to the UDM, the AMF signs the first network identifier information (for example, a PLMN ID) by using the preset private key, to obtain the second network identifier information.

In addition, the AMF may further sign the first network identifier information and at least one of a random number and a session identifier by using the preset private key. In this case, further, S131 specifically includes the following:

The second network element obtains the second network identifier information by signing the first network identifier information and at least one of a random number and a session identifier by using the private key.

In a specific implementation, the random number may be a random number delivered by the UDM. In this case, further, the method further includes the following:

The second network element sends a registration request message to the first network element; and the second network element receives a registration response message from the first network element, where the registration response message includes the random number.

In S132, the AMF sends the request message to the UDM, where the request message may be a request message for obtaining user subscription data, a registration request message, or the like. After the UDM receives the request message, further, the method further includes the following:

The first network element searches for the public key based on the first network identifier information.

In this case, in S133, the UDM verifies the second network identifier information by using the found public key.

The second network identifier information is obtained by signing the first network identifier information and at least one of the random number and the session identifier by using the private key. The session identifier may be a <Session-Id> information element in a header of a Diameter message or a SessionID part in an http(s) message.

After verifying the request message, the UDM returns the response message to the AMF. If the verification fails, the response message may further include a failure cause.

It should be noted that, in the method shown in FIG. 13, that the second network identifier information is obtained based on the first network identifier information by using the private key includes one of the following cases:

Case 1: The second network identifier information is obtained based on the first network identifier information only by using the private key. For example, only the private key is used to sign, encrypt, or perform integrity protection on the first network identifier information, or to encrypt and perform integrity protection on the first network identifier information, so as to obtain the second network identifier information. For another example, only the private key is used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

Case 2: The second network identifier information is obtained based on the first network identifier information by using the private key and other content. For example, the private key and the other content are used to sign, encrypt, or perform integrity protection on the first network identifier information, or to encrypt and perform integrity protection on the first network identifier information, so as to obtain the second network identifier information. For another example, the private key and the other content are used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

In the foregoing case 2, the "other content" may be at least one of the following: a public key preset in the first network element, a public key in a private-public key pair generated by the first network element, and another parameter that is generated by the first network element and that participates in subsequent key calculation.

Figure 14:
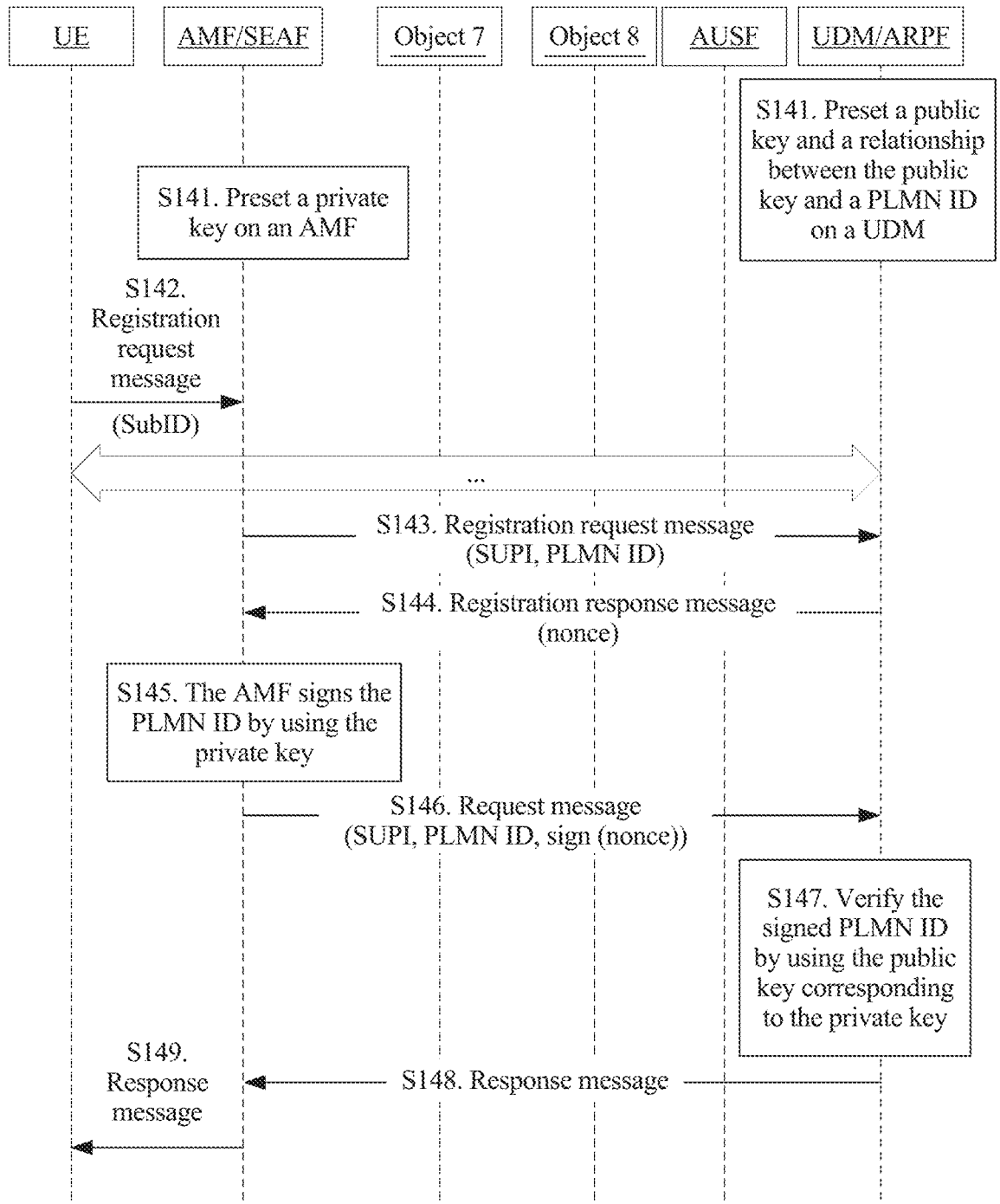
FIG. 14 is a schematic diagram of an example of a complete interaction procedure of protecting registration by using a preset public key and a preset private key in a scenario 1 according to an embodiment of this application.

With reference to FIG. 14, the following specifically describes a procedure of protecting registration by using a preset public key and a preset private key in the scenario 1. A main procedure is as follows.

S141. Preset a private key on an AMF, and preset a public key and a relationship between the public key and a PLMN ID on a UDM.

S142. UE initiates a registration request message (Registration Request) and a subsequent message to the AMF. For details, refer to S301 to S307 shown in FIG. 3a-1 or FIG. 3b-1.

S143. The AMF sends the registration request message to the UDM.

S144. The UDM sends a registration response message to the AMF, and adds a random number nonce into the registration response message.

S145. The AMF signs the PLMN ID by using the private key of the AMF.

Optionally, the AMF may sign (the PLMN ID, nonce, and/or a session identifier) by using the private key.

S146. The AMF sends a request message to the UDM, for example, sends a message for obtaining user subscription data, where the message carries the signature in S145.

S147. After receiving the message, the UDM searches for a public key of the PLMN ID based on the PLMN ID in the message; verifies the signature in the message by using the public key; and if the verification on the signature succeeds, proceeds to a subsequent procedure; or if the verification fails, returns a rejection message, where the message includes a specific error cause indicating that the verification on the signature fails.

S148. The UDM returns, to the AMF, a response to the message for obtaining user subscription data.

S149. The AMF completes registration of the UE.

Because the SEPP has different deployment forms, for the attack scenario 1, as shown in FIG. 7a, a detection point may be placed at a SEPP2 in a home network, or as shown in FIG. 7b, a detection point may be placed at an IPX2 SEPP closest to a home network, or as shown in FIG. 7c, a detection point may be placed at a roaming hub SEPP closest to a home network. Therefore, a public key corresponding to a serving network in which the AMF is located and a correspondence between the public key and a PLMN ID of the serving network in which the AMF is located need to be deployed on the SEPP2, the IPX2 SEPP, or the roaming hub SEPP in advance.

According to the method for performing verification by using a public key and a private key provided in this embodiment of this application, when a home network receives a request message sent by a visited network, where network identifier information in the request message is signed by a network element in the visited network by using a private key, a network element in the home network verifies the network identifier information in the request message by using a preset public key corresponding to the private key, to protect the network from an attack from the visited network.

FIG. 3b-1 and FIG. 3b-2 are a schematic diagram of a spoofing attack from a UDM in a home network. A malicious UDM in a network B directly sends a deregistration message to an AMF in a serving network (scenario 2). After the AMF receives the deregistration message, the AMF deletes an MM context of a user corresponding to an SUPI, and instructs a related SMF to release a PDU session. Consequently, the user is forced to be deregistered. This is equivalent to a denial of service DOS attack. Further, an attacker may send a large quantity of messages, to force a large quantity of users to be deregistered.

Figure 15:
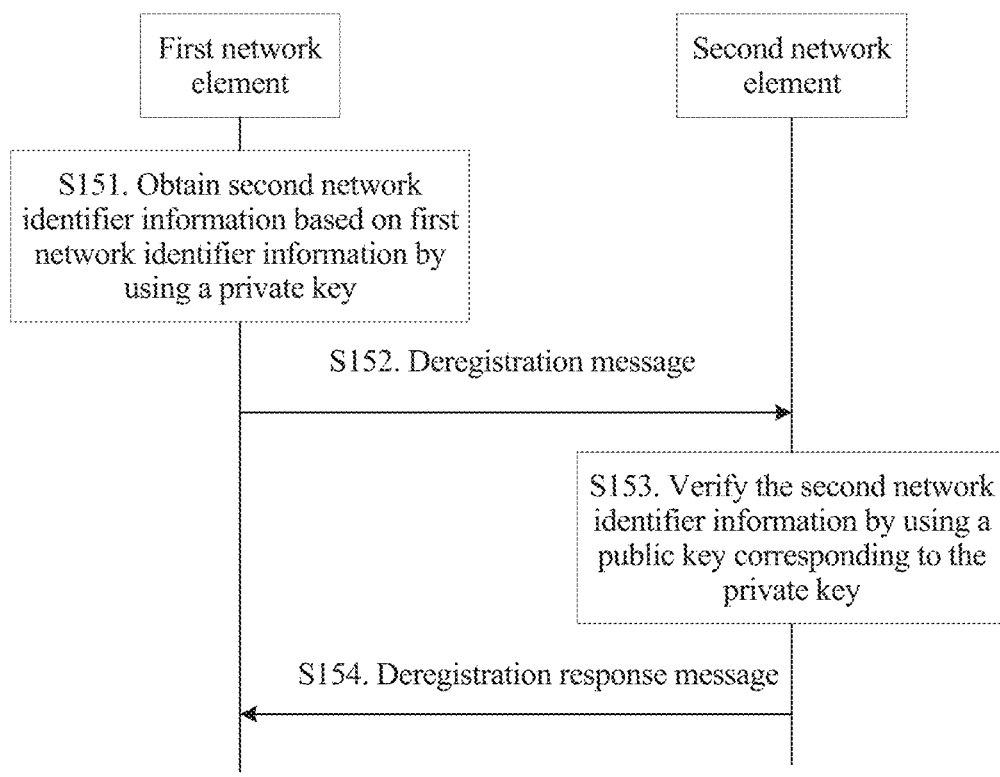
FIG. 15 is a schematic interaction flowchart of another method for performing verification by using a public key and a private key according to an embodiment of this application.

FIG. 15 is a schematic interaction flowchart of another method for performing verification by using a public key and a private key according to an embodiment of this application. The method is applied to the scenario 2, and may include the following steps.

S151. A first network element obtains second network identifier information based on first network identifier information by using a private key, where the first network element is a data management network element or a first security edge protection proxy.

S152. The first network element sends a deregistration message to a second network element, and the second network element receives the deregistration message from the first network element, where the deregistration message includes the second network identifier information, so that the second network element verifies the second network identifier information by using a public key corresponding to the private key, and the second network element is a mobility management network element or a second security edge protection proxy.

S153. The second network element verifies the second network identifier information by using the public key corresponding to the private key.

S154. The second network element sends a deregistration response message to the first network element based on a verification result of the second network identifier information, and the first network element receives the deregistration response message from the second network element.

In this embodiment, the first network element is a UDM or a first security edge protection proxy, and the second network element is an AMF or a second security edge protection proxy. To be specific, the first network element may be a UDM, and the second network element may be an AMF; or the first network element may be a UDM, and the second network element may be a second security edge protection proxy; or the first network element may be a first security edge protection proxy, and the second network element may be an AMF or the first network element may be a first security edge protection proxy, and the second network element may be a second security edge protection proxy. The security edge protection proxy is described in detail below. In descriptions of this embodiment, an example in which the first network element is a UDM and the second network element is an AMF is used for description.

In this embodiment, a public key is preset on the AMF, and a private key is preset on the UDM.

In S151, the first network element obtains the second network identifier information based on the first network identifier information by using the private key.

The UDM may sign the first network identifier information (for example, a UDM ID) by using the private key, or may sign the first network identifier information and at least one of a random number and a session identifier by using the private key. In this case, S151 specifically includes the following:

The first network element obtains the second network identifier information by signing the first network identifier information and at least one of a random number and a session identifier by using the private key.

It should be noted that, in the method shown in FIG. 15, that the second network identifier information is obtained based on the first network identifier information by using the private key includes one of the following cases:

Case 1: The second network identifier information is obtained based on the first network identifier information only by using the private key. For example, only the private key is used to sign, encrypt, or perform integrity protection on the first network identifier information, or to encrypt and perform integrity protection on the first network identifier information, so as to obtain the second network identifier information. For another example, only the private key is used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

Case 2: The second network identifier information is obtained based on the first network identifier information by using the private key and other content. For example, the private key and the other content are used to sign, encrypt, or perform integrity protection on the first network identifier information, or to encrypt and perform integrity protection on the first network identifier information, so as to obtain the second network identifier information. For another example, the private key and the other content are used to sign, encrypt, or perform integrity protection on the first network identifier information and at least one of the random number and the session identifier, or to encrypt and perform integrity protection on the first network identifier information and at least one of the random number and the session identifier, so as to obtain the second network identifier information.

In the foregoing case 2, the "other content" may be at least one of the following: a public key preset in the first network element, a public key in a private-public key pair generated by the first network element, and another parameter that is generated by the first network element and that participates in subsequent key calculation.

Figure 16:
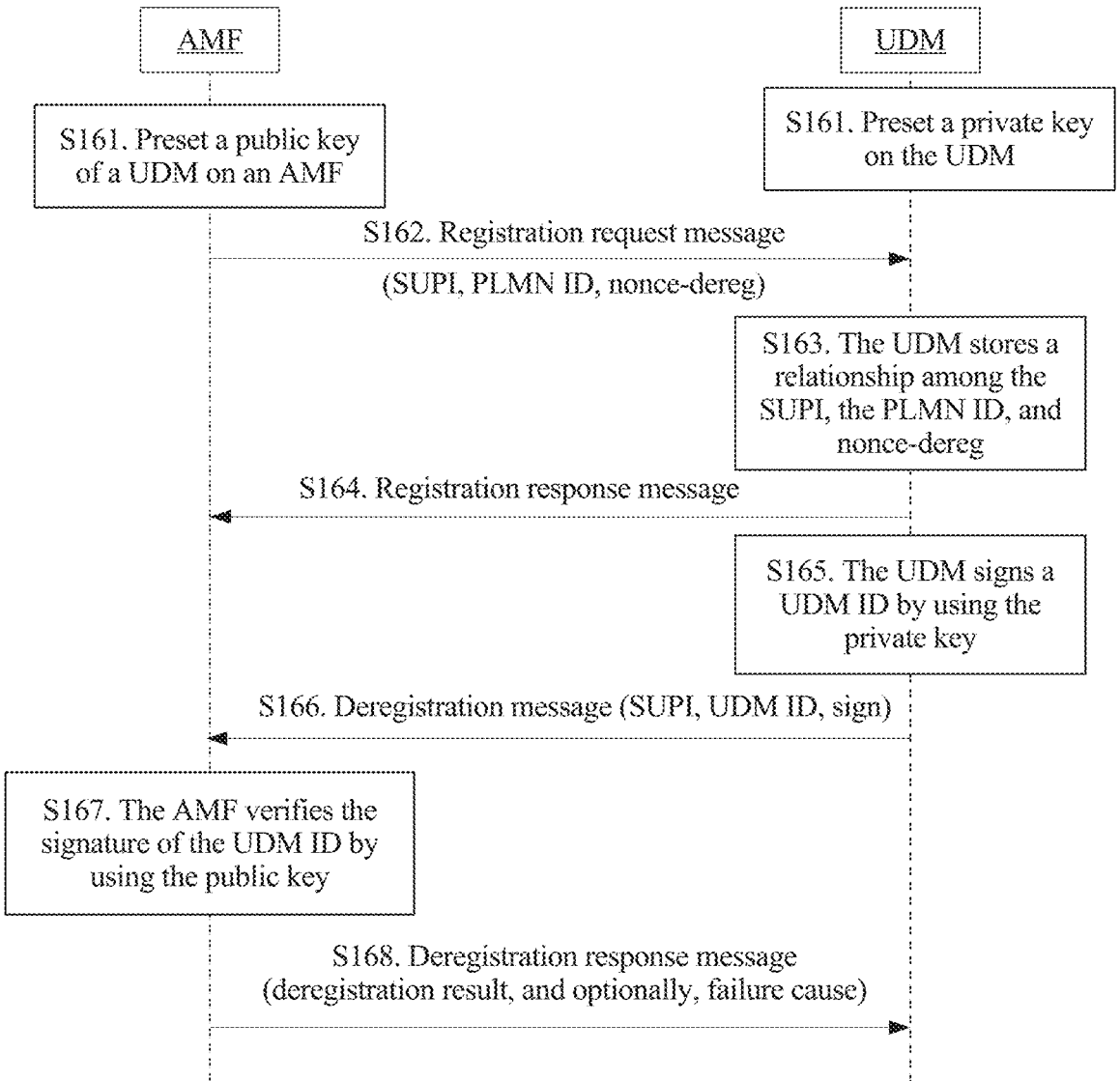
FIG. 16 is a schematic diagram of an example of a complete interaction procedure of protecting deregistration by using a preset public key and a preset private key in a scenario 2 according to an embodiment of this application.

With reference to FIG. 16, the following specifically describes a procedure of protecting deregistration by using a preset public key and a preset private key in the scenario 2. A main procedure is as follows:

S161. Preset a public key on an AMF, and preset a private key on a UDM.

S162. The AMF adds a random number nonce-dereg into a registration message to be sent to the UDM, to perform verification when a deregistration message from the UDM is received.

S163. The UDM stores a relationship among an SUPI, a PLMN ID, and nonce-dereg.

S164. The UDM returns a registration response message to the AMF.

S165. When the UDM is ready to initiate deregistration, the UDM signs a UDM ID by using the private key. Optionally, the UDM may further sign (the UDM ID, nonce-dereg, and/or a session identifier).

S166. When the UDM sends the deregistration message to the AMF, the UDM adds the foregoing signature into the deregistration message.

S167. After receiving the message, the AMF verifies the signature by using the public key; and if the verification on the signature succeeds, proceeds to a subsequent procedure; or if the verification fails, returns a rejection message, where the message includes a specific error cause indicating that the verification on the signature fails.

S168. The AMF returns a deregistration response message to the UDM.

Because the SEPP has different deployment forms, for the attack scenario 2, as shown in FIG. 7a, a detection point may be placed at a SEPP1 in a serving network, or as shown in FIG. 7b, a detection point may be placed at an IPX1 SEPP closest to a serving network, or as shown in FIG. 7c, a detection point may be placed at a roaming hub SEPP. Therefore, a public key corresponding to a network in which the UDM is located and a correspondence between the public key and a PLMN ID of the network in which the UDM is located need to be deployed on the SEPP1, the IPX1 SEPP, or the roaming hub SEPP in advance.

Therefore, in the foregoing embodiment, the first network element may be a UDM, or may be a SEPP2 in FIG. 7a, or an IPX2 SEPP closest to a home network in FIG. 7b, or the roaming hub SEPP in FIG. 7c. The second network element may be an AMF, or may be the SEPP1 in FIG. 7a, or the IPX1 SEPP closest to the serving network in FIG. 7b, or the roaming hub SEPP in FIG. 7c.

According to the method for performing verification by using a public key and a private key provided in this embodiment of this application, when a visited network receives a deregistration message sent by a home network, where network identifier information in the deregistration message is signed by a network element in the home network by using a private key, a network element in the visited network verifies the network identifier information in the deregistration message by using a preset public key corresponding to the private key, to protect the network from an attack from the home network.

The foregoing describes a solution for performing verification between the AMF and the UDM. In addition, this application further provides a solution for verifying a serving network identifier serving PLMN ID between an AMF in a serving network and an AUSF in a home network. Authentication initiation request message sent by the AMF in the serving network to the AUSF in the home network usually carries the serving PLMN ID. The solution in this application may provide a solution for performing verification between the AMF and the AUSF, to prevent a spoofed serving network identifier attack that may exist between the AMF and the AUSF.

Specifically, the solution for performing verification between the AMF and the AUSF may include the following cases:

(1) When a public key and a private key are used, a private key corresponding to an operator of the AMF may be deployed on the AMF, the serving PLMN ID is signed by using the private key, and then the serving PLMN ID is carried in an authentication initiation request message and sent to the AUSF. Correspondingly, a public key corresponding to the operator of the AMF is deployed on the AUSF, and the foregoing signature is verified by using the public key. If the verification fails, there is a spoofing attack.

(2) When a shared key is used, the AMF encrypts the serving PLMN ID by using the shared key, generates a MAC verification value, or generates a hash value, and then adds the serving PLMN ID, the MAC verification value, or the hash value into an authentication initiation request message to send the serving PLMN ID, the MAC verification value, or the hash value to the AUSF. The AUSF obtains a plaintext through decryption by using the shared key, and compares the plaintext with the serving PLMN ID; or the AUSF calculates a MAC check value, and then compares the calculated MAC check value with the received MAC check value; or the AUSF generates a hash value, and then compares the generated hash value with the received hash value. The verification succeeds if a comparison result is that the plaintext is consistent with the serving PLMN ID, the calculated MAC check value is consistent with the received MAC check value, or the generated hash value is consistent with the received hash value. Otherwise, the verification fails. If the verification fails, there is a spoofing attack.

The foregoing solution for performing verification between the AMF and the AUSF may be independently executed, or may coexist with the solution for performing verification between the AMF and the UDM. For example, the solution for performing verification between the AMF and the AUSF may be applied to S102 in FIG. 10A, S112 in FIG. 11A, S122 in FIG. 12-A, S122-2 in FIG. 12-2A, S122-3 in FIG. 12-3A, and S122-4 in FIG. 12-4.

In addition, this application further provides a solution for verifying a serving network identifier serving PLMN ID between a vSEPP in a serving network and an hSEPP in a home network, or between a vNRF in a serving network and an hNRF in a home network, or between a vSMF in a serving network and an hSMF in a home network, or between a vPCF in a serving network and an hPCF in a home network, or between any network element vNF1 in a serving network and any network element hNF2 in a home network, to prevent a spoofed serving network identifier attack that may exist between the serving network and the home network.

Specifically, the foregoing verification solution may include the following cases:

(1) When a public key and a private key are used, a private key corresponding to a serving operator of the vSEPP, the vNRF, the vSMF, the vPCF, or the any vNF1 in the serving network may be deployed on the vSEPP, the vNRF, the vSMF, the vPCF, or the any vNF1 in the serving network, the serving PLMN ID is signed by using the private key, and then the serving PLMN ID is sent to the hSEPP, the hNRF, the hSMF, the hPCF, or the any hNF2 in the home network. Correspondingly, a public key corresponding to the serving operator of the vSEPP, the vNRF, the vSMF, the vPCF, or the any vNF1 is deployed on the hSEPP, the hNRF, the hSMF, the hPCF, or the any hNF2 in the home network, and the foregoing signature is verified by using the public key. If the verification fails, there is a spoofing attack.

(2) When a shared key is used, the vSEPP, the vNRF, the vSMF, the vPCF, or the any vNF1 in the serving network encrypts the serving PLMN ID by using the shared key, generates a MAC verification value, or generates a hash value, and then sends the serving PLMN ID, the MAC verification value, or the hash value to the hSEPP, the hNRF, the hSMF, the hPCF, or the any hNF2 in the home network. The hSEPP, the hNRF, the hSMF, the hPCF, or the any hNF2 in the home network obtains a plaintext through decryption by using the shared key, and compares the plaintext with the serving PLMN ID; or the hSEPP, the hNRF, the hSMF, the hPCF, or the any hNF2 in the home network calculates a MAC check value, and then compares the calculated MAC check value with the received MAC check value; or the hSEPP, the hNRF, the hSMF, the hPCF, or the any hNF2 in the home network generates a hash value, and then compares the generated hash value with the received hash value. The verification succeeds if a comparison result is that the plaintext is consistent with the serving PLMN ID, the calculated MAC check value is consistent with the received MAC check value, or the generated hash value is consistent with the received hash value. Otherwise, the verification fails. If the verification fails, there is a spoofing attack.

Figure 19:
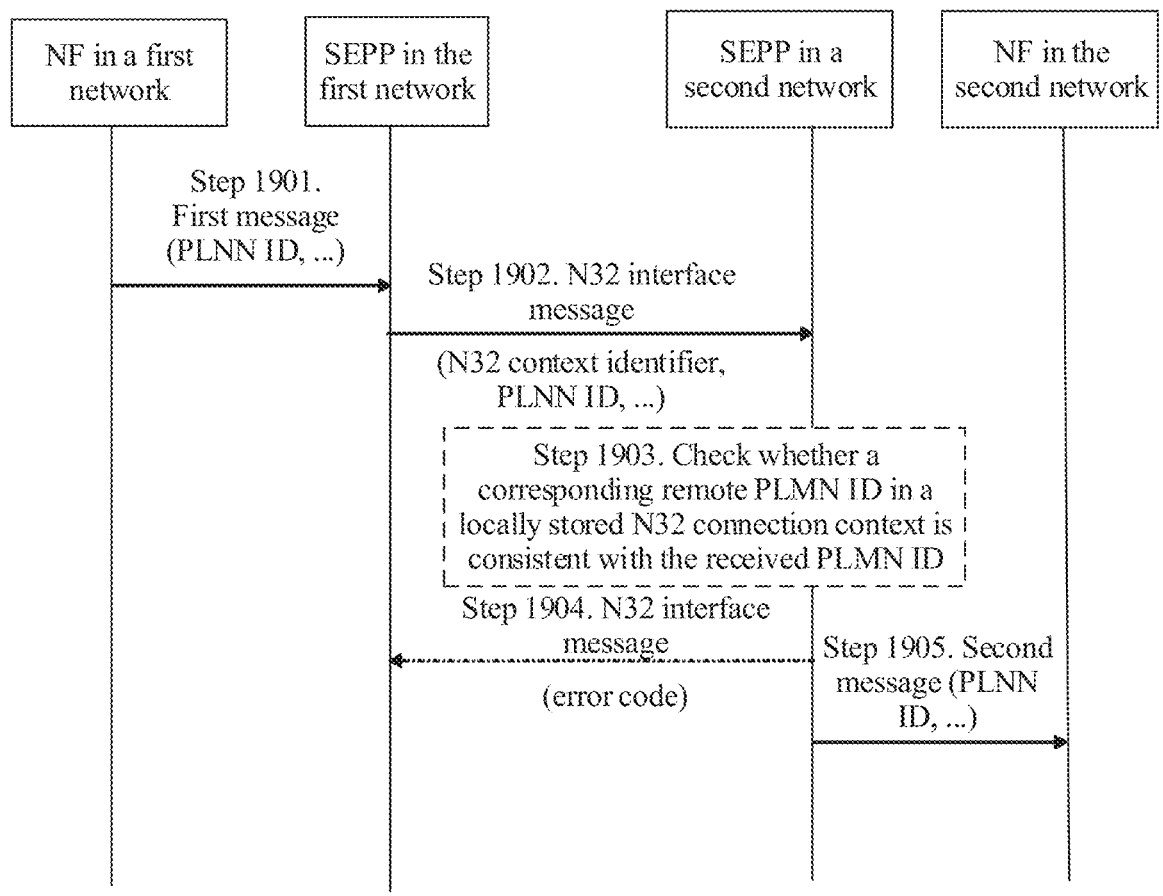
FIG. 19 is a schematic interaction flowchart of another method for performing verification by using a PLMN ID according to an embodiment of this application.

FIG. 19 is a schematic interaction flowchart of another method for performing verification by using a PLMN ID according to an embodiment of this application. In FIG. 19, when a function entity in a first network expects to use a service provided by a network function entity in a second network, the following method may be performed. The first network may be, for example, a serving network, and the second network is a home network. Alternatively, the first network may be, for example, a home network, and the second network is a serving network.

Step 1901. A function entity in a first network sends a first message to a SEPP in the first network, where the first message carries a PLMN ID.

The PLMN ID may be carried in a dedicated PLMN ID information element, or may be carried in a serving network name information element that includes a PLMN ID, or may be carried in a network function entity identifier that includes a PLMN ID, or may be carried in a terminal, user, or service identifier that includes a PLMN ID, or may be carried in another format. This is not specifically limited herein.

The function entity in the first network may be any network function node that requires a roaming service in the first network, for example, an AMF, an SMF, or another node. This is not specifically limited herein.

Optionally, when a function entity needs to use a service provided by a function entity in another network, the function entity may send a first message to a SEPP in a network in which the function entity is located. For example, when a function entity (for example, an AMF) in a serving network expects to use a service of a function entity (for example, an AUSF) in a home network, or when a function entity (for example, an AUSF) in a home network expects to use a service of a network function entity (for example, an AMF) in a serving network, the function entity sends a first message to a SEPP in a network in which the function entity is located. Optionally, the first message may be a message in an HTTP format.

Step 1902. After receiving the first message, the SEPP in the first network sends an N32 interface message to a SEPP in a second network, where the N32 interface message includes an N32 interface context identifier (N32 context id) and the PLMN ID carried in the first message, and the N32 context ID is used to instruct the SEPP in the second network to search for an N32 connection context (N32 connection context) corresponding to the SEPP in the first network.

Optionally, after receiving the first message, the SEPP in the first network may perform security processing on the first message to convert the first message into an N32 interface message. It should be noted that, the SEPP in the first network may directly send the N32 interface message to the SEPP in the second network, or may indirectly send the N32 interface message to the SEPP in the second network by using an intermediate node.

Optionally, the SEPP in the first network may perform integrity protection on the PLMN ID in the N32 interface message.

Step 1903. The SEPP in the second network receives the N32 interface message sent by the SEPP in the first network; obtains, based on the N32 interface context identifier in the N32 interface message, the N32 interface context corresponding to the SEPP in the first network; and determines whether a PLMN ID stored in the N32 interface context corresponding to the SEPP in the first network is the same as the PLMN ID in the N32 interface message.

The N32 interface context includes an N32 interface context identifier and a remote PLMN ID (remote PLMN id). In practice, generally, a PLMN ID corresponding to the SEPP in the first network is the same as a PLMN ID corresponding to the function entity in the first network.

If the PLMN ID stored in the N32 interface context corresponding to the SEPP in the first network is the same as the PLMN ID in the N32 interface message, it indicates that the PLMN ID is not modified, and step 1905 is performed. If the PLMN ID stored in the N32 interface context corresponding to the SEPP in the first network is different from the PLMN ID in the N32 interface message, step 1904 is performed.

Optionally, in addition to obtaining the stored PLMN ID from the N32 interface context corresponding to the SEPP in the first network, the SEPP in the second network may further obtain, by using another method, the PLMN ID corresponding to a PLMN in which the SEPP in the first network is located. Specifically, if the PLMN ID that is obtained by the SEPP in the second network and that is corresponding to the PLMN network in which the SEPP in the first network is located is the same as the PLMN ID in the N32 interface message, it indicates that the PLMN ID is not modified, and step 1905 is performed. If the PLMN ID that is obtained by the SEPP in the second network and that is corresponding to the PLMN network in which the SEPP in the first network is located is different from the PLMN ID in the N32 interface message, step 1904 is performed. For example, a manner in which the SEPP in the second network determines the PLMN ID corresponding to the PLMN network in which the SEPP in the first network is located specifically includes: determining the PLMN ID based on a correspondence between a PLMN ID and information in a certificate, an IP address, a port, and other information that are corresponding to the SEPP in the first network.

Optionally, if the SEPP in the first network performs integrity protection on the PLMN ID in step 1902, before it is determined whether the PLMN ID stored in the N32 interface context corresponding to the SEPP in the first network is the same as the PLMN ID in the N32 interface message, integrity verification may be performed first. After the integrity verification succeeds, it is determined whether the PLMN ID stored in the N32 interface context corresponding to the SEPP in the first network is the same as the PLMN ID in the N32 interface message.

Step 1904. If the PLMN ID stored in the N32 interface context corresponding to the SEPP in the first network is different from the PLMN ID in the N32 interface message, the SEPP in the second network performs the following processing:

The SEPP in the second network directly sends, to the SEPP in the first network, an N32 interface response message indicating a failure, or sends, to the SEPP in the first network by using an intermediate node, an N32 interface response message indicating a failure. The response message may or may not carry an error code. The error code may indicate a "PLMN ID error", or "unauthorized use of a PLMN ID", or another meaning. This is not specifically limited herein.

Alternatively, the SEPP in the second network may not send a response message, but directly discard the received N32 interface message.

Step 1905. If the PLMN ID stored in the N32 interface context corresponding to the SEPP in the first network is the same as the PLMN ID in the N32 interface message, the SEPP in the second network performs other security processing on the N32 interface message to obtain a second message, and sends the second message to a network function entity in the second network, where the second message and the first message include same content.

The network function entity in the second network may be any network function node that can provide a roaming service in the second network, for example, an AMF, an SMF, or another node. This is not specifically limited herein.

Optionally, the second message may be a message in the HTTP format.

It should be noted that, the NF in the first network, the SEPP in the first network, the SEPP in the second network, and the NF in the second network in this embodiment may be the first network element or the second network element in the foregoing embodiment. For related descriptions, refer to each other. Details are not described herein again.

The solutions provided in this application are mainly described above from a perspective of interaction between network elements. It may be understood that, to implement the foregoing functions, each network element includes a corresponding hardware structure and/or software module for implementing each function. A person of ordinary skill in the art should be easily aware that, in combination with the examples described in the embodiments disclosed in this specification, units and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first network element and the second network element each may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in the embodiments of this application, unit division is an example, is merely a logical function division, and may be other division in actual implementation.

Figure 17:
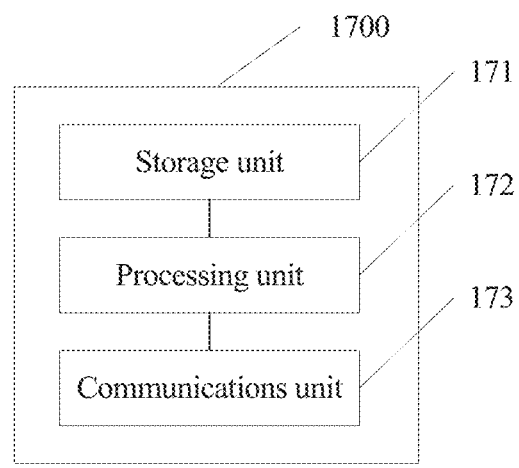
FIG. 17 is a possible example block diagram of an apparatus according to an embodiment of this application.

When an integrated unit is used, FIG. 17 is a possible example block diagram of an apparatus 1700 according to an embodiment of this application. The apparatus 1700 may exist in a form of software, or may be the foregoing first network element or second network element. The apparatus 1700 includes a processing unit 172 and a communications unit 173. The processing unit 172 is configured to control and manage an action of the apparatus 1700. The communications unit 173 is configured to support the apparatus 1700 in communicating with another network entity (for example, a base station or another mobility management network element). The apparatus 1700 may further include a storage unit 171, configured to store program code and data of the apparatus 1700.

The processing unit 172 may be a processor or a controller, for example, may be a general-purpose central processing unit (CPU), a general purpose processor, a digital signal processor (DSP), an application-specific integrated circuit ASIC), a field programmable gate array (FPGA) or another programmable logical device, a transistor logic device, a hardware component, or a combination thereof. The processing unit 172 may implement or execute various example logical blocks, modules, and circuits described with reference to content disclosed in this application. Alternatively, the processor may be a combination of processors that implements a computing function, for example, a combination of one or more microprocessors, or a combination of a DSP and a microprocessor. The communications unit 173 may be a communications interface, a transceiver, a transceiver circuit, or the like. The communications interface is a general term. In specific implementation, the communications interface may include a plurality of interfaces, for example, may include an interface between a mobility management network element and a base station, an interface between a mobility management network element and another mobility management network element, and/or another interface. The storage unit 171 may be a memory.

The foregoing first network element may be a data management network element, for example, may be the UDM in FIG. 1*a* or FIG. 1*b*, or may be a first security edge protection proxy, for example, may be the hSEPP in FIG. 1*b*, the SEPP1 in FIG. 7*a*, the IPX1 SEPP closest to the serving network in FIG. 7*b*, or the roaming hub SEPP in FIG. 7*c*.

When the apparatus 1700 is the data management network element, the processing unit 172 may support the apparatus 1700 in performing an action of the data management network element in the foregoing method examples. For example, the processing unit 172 is configured to support the apparatus 1700 in performing step S503 in the embodiment shown in FIG. 5, step S901 in the embodiment shown in FIG. 9, step S133 in the embodiment shown in FIG. 13, and step S151 in the embodiment shown in FIG. 15, and/or is configured to perform other technical processes described in this specification. The communications unit 173 may support communication between the apparatus 1700 and the second network element or another network element. For example, the communications unit 173 is configured to support the apparatus 1700 in performing steps S502 and S504 in the embodiment shown in FIG. 5, steps S902 and S904 in the embodiment shown in FIG. 9, steps S132 and S134 in the embodiment shown in FIG. 13, and steps S152 and S154 in the embodiment shown in FIG. 15.

When the apparatus 1700 is the first security edge protection proxy, the processing unit 172 may support the apparatus 1700 in performing an action of the first security edge protection proxy in the foregoing method examples, for example, performing step S806 in the embodiment shown in FIG. 8A and FIG. 8B. The communications unit 173 may support communication between the apparatus 1700 and the second network element or another network element. For example, the communications unit 173 may support the apparatus 1700 in performing steps S804, S805, S807, and S808 in the embodiment shown in FIG. 8A and FIG. 8B.

The foregoing second network element may be a mobility management network element, for example, may be the AMF in 1a or FIG. 1b, or may be a second security edge protection proxy, for example, may be the vSEPP in FIG. 1b, the SEPP2 in FIG. 7a, the IPX2 SEPP closest to the serving network in FIG. 7b, or the roaming hub SEPP in FIG. 7c.

When the apparatus 1700 is the mobility management network element, the processing unit 172 may support the apparatus 1700 in performing an action of the mobility management network element in the foregoing method examples. For example, the processing unit 172 is configured to support the apparatus 1700 in performing step S501 in the embodiment shown in FIG. 5, step S903 in the embodiment shown in FIG. 9, step S131 in the embodiment shown in FIG. 13, and step S153 in the embodiment shown in FIG. 15, and/or is configured to perform other technical processes described in this specification. The communications unit 173 may support communication between the apparatus 1700 and the first network element or another network element. For example, the communications unit 173 is configured to support the apparatus 1700 in performing steps S502 and S504 in the embodiment shown in FIG. 5, steps S902 and S904 in the embodiment shown in FIG. 9, steps S132 and S134 in the embodiment shown in FIG. 13, and steps S152 and S154 in the embodiment shown in FIG. 15.

When the apparatus 1700 is the second security edge protection proxy, the processing unit 172 may support the apparatus 1700 in performing an action of the second security edge protection proxy in the foregoing method examples.

Figure 18:
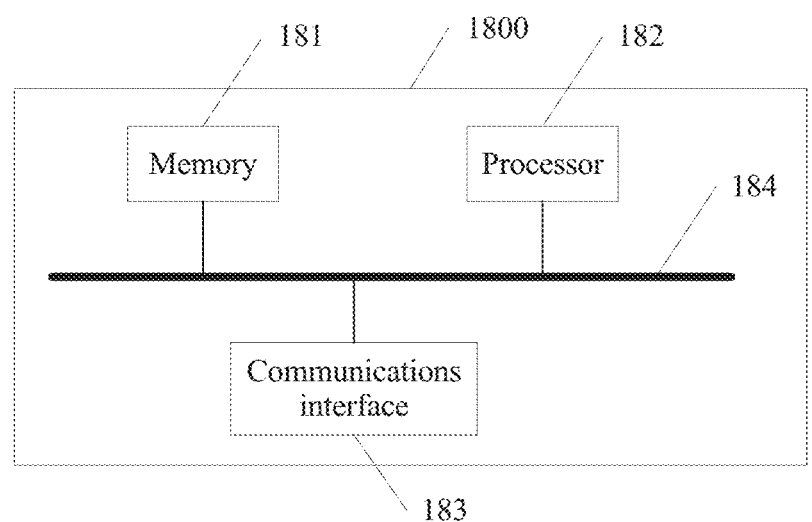
FIG. 18 is a possible example block diagram of another apparatus according to an embodiment of this application.

When the processing unit 172 is a processor, the communications unit 173 is a communications interface, and the storage unit 171 is a memory, the apparatus 1700 in this embodiment of this application may be an apparatus 1800 shown in FIG. 18.

As shown in FIG. 18, the apparatus 1800 includes a processor 182, a communications interface 183, and a memory 181. Optionally, the apparatus 1800 may further include a bus 184. The communications interface 183, the processor 182, and the memory 181 may be connected to each other by using the bus 184. The bus 184 may be a peripheral component interconnect (PCI) bus, an extended industry standard architecture (EISA) bus, or the like. The bus 184 may be classified into an address bus, a data bus, a control bus, and the like. For ease of representation, only one thick line is used to represent the bus in FIG. 18, but it does not indicate that there is only one bus or only one type of bus.

The foregoing embodiments may be all or partially implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

The various illustrative logical units and circuits described in the embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may be any conventional processor, controller, microcontroller, or state machine. The processor may be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable disk, a CD-ROM, or any other form of storage medium in the art. For example, the storage medium may be connected to a processor, so that the processor can read information from the storage medium and write information to the storage medium. Optionally, the storage medium may be integrated into a processor. The processor and the storage medium may be disposed in an ASIC, and the ASIC may be disposed in a terminal device. Optionally, the processor and the storage medium may be disposed in different components of a terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, apparently, various modifications and combinations may be made to this application without departing from the spirit and scope of this application. Correspondingly, the specification and accompanying drawings are merely example descriptions of this application defined by the accompanying claims, and are considered to cover any or all of modifications, variations, combinations, or equivalents within the scope of this application. Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for performing verification using a public land mobile network identifier (PLMN ID), comprising:
   receiving, by a security edge protection proxy (SEPP) in a second network, an N32 interface message from a SEPP in a first network, wherein the N32 interface message carries an N32 interface context identifier and a PLMN ID of the first network;
   determining, by the SEPP in the second network, whether a remote PLMN ID comprised in an N32 interface context corresponding to the N32 interface context identifier is the same as the PLMN ID carried in the N32 interface message; and
   in response to determining that the remote PLMN ID comprised in the N32 interface context is the same as the PLMN ID carried in the N32 interface message, sending, by the SEPP in the second network, a second message to a network function entity in the second network.

2. The method according to claim 1, wherein the method further comprises:
   in responding to determining that the remote PLMN ID comprised in the N32 interface context is different from the PLMN ID carried in the N32 interface message, sending, by the SEPP in the second network to the SEPP in the first network, an N32 interface response message indicating a failure.

3. The method according to claim 2, wherein the N32 interface response message comprises an error code indicating a PLMN ID failure.

4. The method according to claim 1, wherein the PLMN ID carried in the N32 interface message is a PLMN ID carried in a first message from a function entity in the first network to the SEPP in the first network.

5. The method according to claim 4, wherein the PLMN ID in the first message is carried in at least one of the following:
   a dedicated PLMN ID information element in the first message,
   a serving network name information element that comprises the PLMN ID,
   a network function entity identifier that comprises the PLMN ID, or
   a terminal identifier, a user identifier, or a service identifier, wherein the terminal identifier, the user identifier, or the service identifier comprises the PLMN ID.

6. The method according to claim 1, wherein the first network is a serving network, and the second network is a home network.

7. The method according to claim 4, wherein the function entity in the first network is a network function entity that requires a roaming service in the first network, and the network function entity in the second network is a network function entity that provides a roaming service in the second network.

8. A communications apparatus, comprising:
   at least one processor; and
   a memory coupled to the at least one processor and having program instructions stored thereon which, when executed by the at least one processor, cause the apparatus to:
      receive an N32 interface message from a SEPP in a first network, wherein the N32 interface message carries an N32 interface context identifier and a PLMN ID of the first network;
      determine whether a remote PLMN ID comprised in an N32 interface context corresponding to the N32 interface context identifier is the same as the PLMN ID carried in the N32 interface message; and
      in response to determining that the remote PLMN ID comprised in the N32 interface context is the same as the PLMN ID carried in the N32 interface message, send a second message to another network function entity in a second network.

9. The communications apparatus according to claim 8, wherein the instructions further cause the apparatus to:
   in response to determining that the remote PLMN ID comprised in the N32 interface context is different from the PLMN ID carried in the N32 interface message, send, to the SEPP in the first network, an N32 interface response message indicating a failure.

10. The communications apparatus according to claim 9, wherein the N32 interface response message comprises an error code indicating a PLMN ID failure.

11. The communications apparatus according to claim 8, wherein the PLMN ID carried in the N32 interface message is a PLMN ID carried in a first message from a function entity in the first network to the SEPP in the first network.

12. The communications apparatus according to claim 11, wherein the PLMN ID in the first message is carried in a dedicated PLMN ID information element in the first message, is carried in at least one of the following:
   a dedicated PLMN ID information element in the first message,
   a serving network name information element that comprises the PLMN ID,
   a network function entity identifier that comprises the PLMN ID, or
   a terminal identifier, a user identifier, or a service identifier, wherein the terminal identifier, the user identifier, or the service identifier comprises the PLMN ID.

13. The communications apparatus according to claim 8, wherein the first network is a serving network, and the second network is a home network.

14. The communications apparatus according to claim 11, wherein the function entity in the first network is a network function entity that requires a roaming service in the first network, and the network function entity in the second network is a network function entity that provides a roaming service in the second network.

15. A communications system, comprising a security edge protection proxy (SEPP) in a first network and a SEPP in a second network, wherein
   the SEPP in the first network is configured to: send an N32 interface message to the SEPP in the second network, wherein the N32 interface message carries an N32 interface context identifier and a PLMN ID of the first network; and
   the SEPP in the second network is configured to: receive the N32 interface message from the SEPP in the first network; determine whether a remote PLMN ID comprised in an N32 interface context corresponding to the N32 interface context identifier is the same as the PLMN ID carried in the N32 interface message; and in response to determining that the remote PLMN ID comprised in the N32 interface context is the same as the PLMN ID carried in the N32 interface message, send a second message to a network function entity in the second network.

16. The communications system according to claim 15, wherein the SEPP in the second network is further configured to: in responding to determining that the remote PLMN ID comprised in the N32 interface context is different from the PLMN ID carried in the N32 interface message, send, to the SEPP in the first network, an N32 interface response message indicating a failure.

17. The communications system according to claim 16, wherein the N32 interface response message comprises an error code indicating a PLMN ID failure.

18. The communications system according to claim 15, wherein the SEPP in the first network is further configured to: receive a first message sent by a function entity in the first network, wherein the first message comprises the PLMN ID carried in the N32 interface message.

19. The communications system according to claim 18, wherein the PLMN ID in the first message is carried in at least one of the following:

a dedicated PLMN ID information element in the first message, a serving network name information element that comprises the PLMN ID, a network function entity identifier that comprises the PLMN ID, or a terminal identifier, a user identifier, or a service identifier, wherein the terminal identifier, the user identifier, or the service identifier comprises the PLMN ID.

20. The communications system according to claim 18, wherein the first network is a serving network, and the second network is a home network; wherein the function entity in the first network is a network function entity that requires a roaming service in the serving network, and the network function entity in the second network is a network function entity that provides a roaming service in the home network.

* * * * *